(12) United States Patent
Bodishbaugh et al.

(10) Patent No.: US 11,644,014 B2
(45) Date of Patent: *May 9, 2023

(54) SYSTEMS AND METHODS FOR GENERATION OF ELECTRICAL POWER IN AN ORGANIC RANKINE CYCLE OPERATION

(71) Applicant: ICE Thermal Harvesting, LLC, Houston, TX (US)

(72) Inventors: Adrian Benjamin Bodishbaugh, Houston, TX (US); Carrie Jeanne Murtland, Houston, TX (US)

(73) Assignee: ICE Thermal Harvesting, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,956

(22) Filed: Apr. 27, 2022

(65) Prior Publication Data

US 2022/0316451 A1 Oct. 6, 2022

Related U.S. Application Data

(63) Continuation of application No. 17/682,126, filed on Feb. 28, 2022, now Pat. No. 11,359,612, which is a (Continued)

(51) Int. Cl.
*F03G 4/00* (2006.01)
*E21B 41/00* (2006.01)
(Continued)

(52) U.S. Cl.
CPC .......... *F03G 4/035* (2021.08); *E21B 41/0085* (2013.01); *E21B 47/07* (2020.05);
(Continued)

(58) Field of Classification Search
CPC ...... F03G 4/035; F03G 4/072; E21B 41/0085; E21B 47/07; F01K 25/08; F24T 10/00; F24T 50/00
(Continued)

(56) References Cited

U.S. PATENT DOCUMENTS 3,517,208 A 6/1970 Williams et al.
3,757,516 A 9/1973 McCabe
(Continued)

FOREIGN PATENT DOCUMENTS

AU 2007204830 A1 7/2007
AU 2009238733 B2 8/2013
(Continued)

OTHER PUBLICATIONS

International Search Report and Written Opinion for PCT/US2022/071472, dated May 9, 2022.
(Continued)

*Primary Examiner* — Hoang M Nguyen
(74) *Attorney, Agent, or Firm* — Womble Bond Dickinson (US) LLP

(57) ABSTRACT

Systems and methods for generating and a controller for controlling generation of geothermal power in an organic Rankine cycle (ORC) operation to thereby supply electrical power to one or more of in-field operational equipment, a grid power structure, and an energy storage device. In an embodiment, during hydrocarbon production, a temperature of a flow of heated fluid from a source or working fluid may be determined. If the temperature is above a vaporous phase change threshold of the working fluid, heat exchanger valves may be opened to divert flow of heated fluid to heat exchangers to facilitate heat transfer from the flow of wellhead fluid to working fluid through the heat exchangers, thereby to cause the working fluid to change from a liquid
(Continued)

to vapor, the vapor to cause a generator to generate electrical power via rotation of an expander.

23 Claims, 32 Drawing Sheets

Related U.S. Application Data continuation of application No. 17/494,936, filed on Oct. 6, 2021, now Pat. No. 11,293,414, which is a continuation-in-part of application No. 17/305,296, filed on Jul. 2, 2021, now Pat. No. 11,255,315.

(60) Provisional application No. 63/200,908, filed on Apr. 2, 2021.

(51) Int. Cl.
  *E21B 47/07* (2012.01)
  *F01K 25/08* (2006.01)
  *F24T 50/00* (2018.01)
  *F24T 10/00* (2018.01)

(52) U.S. Cl.
  CPC .............. *F01K 25/08* (2013.01); *F03G 4/072* (2021.08); *F24T 10/00* (2018.05); *F24T 50/00* (2018.05)

(58) Field of Classification Search
  USPC .............................................. 60/641.2–641.4
  See application file for complete search history.

(56) References Cited

U.S. PATENT DOCUMENTS

| | | |
|---|---|---|
| 3,808,794 A | 5/1974 | Wood |
| 3,875,749 A | 4/1975 | Baciu |
| 3,908,381 A | 9/1975 | Barber et al. |
| 3,988,895 A | 11/1976 | Sheinbaum |
| 4,063,417 A | 12/1977 | Shields |
| 4,079,590 A | 3/1978 | Sheinbaum |
| 4,112,687 A | 9/1978 | Dixon |
| 4,112,745 A | 9/1978 | McCabe |
| 4,149,385 A | 4/1979 | Sheinbaum |
| 4,157,730 A | 6/1979 | Despois et al. |
| 4,224,796 A | 9/1980 | Stiel et al. |
| 4,228,657 A | 10/1980 | Leo |
| 4,356,401 A | 10/1982 | Santi |
| 4,369,373 A | 1/1983 | Wiseman |
| 4,484,446 A | 11/1984 | Goldsberry |
| 4,542,625 A | 9/1985 | Bronicki |
| 4,558,568 A | 12/1985 | Hoshino et al. |
| 4,576,005 A | 3/1986 | Force |
| 4,590,384 A | 5/1986 | Bronicki |
| 4,982,568 A | 1/1991 | Kalina |
| 4,996,846 A | 3/1991 | Bronicki |
| 5,038,567 A | 8/1991 | Mortiz |
| 5,117,908 A | 6/1992 | Hofmann |
| 5,199,507 A | 4/1993 | Westmoreland |
| 5,311,741 A | 5/1994 | Blaize |
| 5,421,157 A | 6/1995 | Rosenblatt |
| 5,440,882 A | 8/1995 | Kalina |
| 5,483,797 A | 1/1996 | Rigal et al. |
| 5,497,624 A | 3/1996 | Amir et al. |
| 5,517,822 A | 5/1996 | Haws et al. |
| 5,526,646 A | 6/1996 | Bronicki et al. |
| 5,555,731 A | 9/1996 | Rosenblatt |
| 5,570,579 A | 11/1996 | Larjola |
| 5,598,706 A | 2/1997 | Bronicki et al. |
| 5,660,042 A | 8/1997 | Bronicki et al. |
| 5,661,977 A | 9/1997 | Shnell |
| 5,671,601 A | 9/1997 | Bronicki et al. |
| 5,685,362 A | 11/1997 | Brown |
| 5,816,048 A | 10/1998 | Bronicki et al. |
| 5,839,282 A | 11/1998 | Bronicki et al. |
| 5,860,279 A | 1/1999 | Bronicki et al. |
| RE36,282 E | 8/1999 | Nitschke |
| 5,970,714 A | 10/1999 | Bronicki et al. |
| 5,974,804 A | 11/1999 | Sterling |
| 6,212,890 B1 | 4/2001 | Amir |
| 6,536,360 B2 | 3/2003 | O'Connor |
| 6,585,047 B2 | 7/2003 | McClung |
| 6,695,061 B2 | 2/2004 | Fripp et al. |
| 6,724,687 B1 | 4/2004 | Stephenson et al. |
| 6,853,798 B1 | 2/2005 | Weiss |
| 6,857,268 B2 | 2/2005 | Stinger et al. |
| 6,857,486 B2 | 2/2005 | Chitwood et al. |
| 6,989,989 B2 | 1/2006 | Brasz et al. |
| 7,096,665 B2 | 8/2006 | Stinger et al. |
| 7,174,716 B2 | 2/2007 | Brasz et al. |
| 7,224,080 B2 | 5/2007 | Smedstad |
| 7,225,621 B2 | 6/2007 | Zimron et al. |
| 7,234,314 B1 | 6/2007 | Wiggs |
| 7,237,383 B2 | 7/2007 | Ahrens-Botzong et al. |
| 7,254,949 B2 | 8/2007 | Brasz et al. |
| 7,281,379 B2 | 10/2007 | Brasz |
| 7,287,381 B1 | 10/2007 | Pierson et al. |
| 7,289,325 B2 | 10/2007 | Brasz et al. |
| 7,313,926 B2 | 1/2008 | Gurin |
| 7,320,221 B2 | 1/2008 | Bronicki |
| 7,334,410 B2 | 2/2008 | Creighton et al. |
| 7,337,842 B2 | 3/2008 | Roddy et al. |
| 7,353,653 B2 | 4/2008 | Bronicki |
| 7,428,816 B2 | 9/2008 | Singh et al. |
| 7,472,548 B2 | 1/2009 | Meksvanh |
| 7,493,768 B2 | 2/2009 | Klaus et al. |
| 7,753,122 B2 | 7/2010 | Curlett |
| 7,823,386 B2 | 11/2010 | Zimron et al. |
| 7,891,187 B2 | 2/2011 | Mohr |
| 7,891,189 B2 | 2/2011 | Bottger et al. |
| 7,900,450 B2 | 3/2011 | Gurin |
| 7,934,383 B2 | 5/2011 | Gutierrez et al. |
| 7,942,001 B2 | 5/2011 | Radcliff et al. |
| 7,950,230 B2 | 5/2011 | Nishikawa et al. |
| 8,046,999 B2 | 11/2011 | Doty |
| 8,096,128 B2 | 1/2012 | Held et al. |
| 8,099,198 B2 | 1/2012 | Gurin |
| 8,146,360 B2 | 4/2012 | Myers et al. |
| 8,166,761 B2 | 5/2012 | Moghtader et al. |
| 8,193,659 B2 | 6/2012 | Bronicki et al. |
| 8,272,217 B2 | 9/2012 | Lengert |
| 8,309,498 B2 | 11/2012 | Funkhouser et al. |
| 8,371,099 B2 | 2/2013 | Gutierrez et al. |
| 8,381,523 B2 | 2/2013 | Zadok |
| 8,430,166 B2 | 4/2013 | Danko |
| 8,438,849 B2 | 5/2013 | Kaplan et al. |
| 8,459,029 B2 | 6/2013 | Lehar |
| 8,511,085 B2 | 8/2013 | Frey et al. |
| 8,528,333 B2 | 9/2013 | Juchymenko |
| 8,534,069 B2 | 9/2013 | Parrella |
| 8,555,643 B2 | 10/2013 | Kalina |
| 8,555,912 B2 | 10/2013 | Woolley et al. |
| 8,572,970 B2 | 11/2013 | Matteson et al. |
| 8,578,714 B2 | 11/2013 | Nagurny et al. |
| 8,596,066 B2 | 12/2013 | Zimron et al. |
| 8,616,000 B2 | 12/2013 | Parrella |
| 8,616,001 B2 | 12/2013 | Held et al. |
| 8,616,323 B1 | 12/2013 | Gurin |
| 8,656,720 B1 | 2/2014 | Hardgrave |
| 8,667,799 B2 | 3/2014 | Batscha |
| 8,674,525 B2 | 3/2014 | Van den Bossche et al. |
| 8,680,704 B1 | 3/2014 | Rooney |
| 8,707,697 B2 | 4/2014 | Nitschke |
| 8,707,698 B2 | 4/2014 | Conry |
| 8,708,046 B2 | 4/2014 | Montgomery et al. |
| 8,720,563 B2 | 5/2014 | Joseph et al. |
| 8,752,382 B2 | 6/2014 | Lehar |
| 8,756,908 B2 | 6/2014 | Sheridan et al. |
| 8,771,603 B2 | 7/2014 | Harless et al. |
| 8,783,034 B2 | 7/2014 | Held |
| 8,791,054 B2 | 7/2014 | Deville |
| 8,820,075 B2 | 9/2014 | Kaminsky |
| 8,820,079 B2 | 9/2014 | Zyhowski et al. |
| 8,839,857 B2 | 9/2014 | Schultz et al. |

(56) References Cited

U.S. PATENT DOCUMENTS

| | | |
|---|---|---|
| 8,841,041 B2 | 9/2014 | Biederman et al. |
| 8,850,814 B2 | 10/2014 | Kaplan et al. |
| 8,857,186 B2 | 10/2014 | Held |
| 8,869,531 B2 | 10/2014 | Held |
| 8,881,805 B2 | 11/2014 | Klemencic |
| 8,959,914 B2 | 2/2015 | Kasuya et al. |
| 8,984,883 B2 | 3/2015 | Riley |
| 8,984,884 B2 | 3/2015 | Xu et al. |
| 9,003,798 B2 | 4/2015 | Yanagi |
| 9,014,791 B2 | 4/2015 | Held |
| 9,062,898 B2 | 6/2015 | Held et al. |
| 9,077,220 B2 | 7/2015 | Kyle et al. |
| 9,080,789 B2 | 7/2015 | Hamstra et al. |
| 9,091,278 B2 | 7/2015 | Vermeersch |
| 9,109,398 B2 | 8/2015 | Harris et al. |
| 9,115,604 B2 | 8/2015 | Bronicki |
| 9,118,226 B2 | 8/2015 | Kacludis et al. |
| 9,121,259 B2 | 9/2015 | Bryant et al. |
| 9,150,774 B2 | 10/2015 | Reddy et al. |
| 9,181,930 B2 | 11/2015 | Klemencic |
| 9,217,370 B2 | 12/2015 | Wang et al. |
| 9,234,522 B2 | 1/2016 | Jonsson et al. |
| 9,243,616 B2 | 1/2016 | Lee et al. |
| 9,297,367 B2 | 3/2016 | Ramaswamy et al. |
| 9,316,404 B2 | 4/2016 | Gurin |
| 9,322,300 B2 | 4/2016 | Mirmobin et al. |
| 9,331,547 B2 | 5/2016 | Bronicki |
| 9,341,084 B2 | 5/2016 | Xie et al. |
| 9,341,086 B2 | 5/2016 | Batscha et al. |
| 9,376,937 B2 | 6/2016 | Goswami et al. |
| 9,394,764 B2 | 7/2016 | Favilli et al. |
| 9,394,771 B2 | 7/2016 | Wiggs |
| 9,403,102 B2 | 8/2016 | Wu et al. |
| 9,441,504 B2 | 9/2016 | Held |
| 9,458,738 B2 | 10/2016 | Held et al. |
| 9,488,160 B2 | 11/2016 | Fisher et al. |
| 9,499,732 B2 | 11/2016 | Reddy et al. |
| 9,512,348 B2 | 12/2016 | Reyes et al. |
| 9,512,741 B2 | 12/2016 | Myogan et al. |
| 9,574,551 B2 | 2/2017 | Parrella, Sr. et al. |
| 9,587,161 B2 | 3/2017 | Fisk, Jr. |
| 9,587,162 B2 | 3/2017 | Fisk, Jr. |
| 9,638,065 B2 | 5/2017 | Vermeersch et al. |
| 9,649,582 B2 | 5/2017 | Shnell |
| 9,671,138 B2 | 6/2017 | Batscha et al. |
| 9,683,463 B2 | 6/2017 | Juchymenko |
| 9,726,157 B2 | 8/2017 | Sweatman et al. |
| 9,726,441 B2 | 8/2017 | Reissner et al. |
| 9,732,634 B2 | 8/2017 | Hikichi et al. |
| 9,745,870 B2 | 8/2017 | Johnson et al. |
| 9,759,096 B2 | 9/2017 | Vermeersch |
| 9,762,460 B2 | 9/2017 | Pawlowski et al. |
| 9,777,602 B2 | 10/2017 | Juchymenko |
| 9,784,140 B2 | 10/2017 | Huntington et al. |
| 9,784,248 B2 | 10/2017 | Batscha et al. |
| 9,797,273 B2 | 10/2017 | Nishiguchi et al. |
| 9,816,402 B2 | 11/2017 | Kauffman et al. |
| 9,816,443 B2 | 11/2017 | Sheridan et al. |
| 9,829,194 B2 | 11/2017 | Aumann et al. |
| 9,840,662 B2 | 12/2017 | Pascarella et al. |
| 9,845,423 B2 | 12/2017 | Frantz et al. |
| 9,863,282 B2 | 1/2018 | Hart et al. |
| 9,874,112 B2 | 1/2018 | Giegel |
| 9,932,861 B2 | 4/2018 | Preuss et al. |
| 9,932,970 B1 | 4/2018 | Jeter |
| 9,957,432 B2 | 5/2018 | Galindo et al. |
| 9,994,751 B2 | 6/2018 | Hulse et al. |
| 10,005,950 B2 | 6/2018 | Smith et al. |
| 10,024,198 B2 | 7/2018 | Held et al. |
| 10,059,870 B2 | 8/2018 | Joseph et al. |
| 10,060,283 B2 | 8/2018 | Tomigashi et al. |
| 10,060,302 B2 | 8/2018 | Weng et al. |
| 10,060,652 B2 | 8/2018 | Tahara |
| 10,077,683 B2 | 9/2018 | Close |
| 10,082,030 B2 | 9/2018 | Genrup et al. |
| 10,113,389 B2 | 10/2018 | Pandey et al. |
| 10,113,535 B2 | 10/2018 | Conlon |
| 10,138,405 B2 | 11/2018 | Kulkarni et al. |
| 10,138,560 B2 | 11/2018 | Reyes et al. |
| 10,221,770 B2 | 3/2019 | Sheridan |
| 10,227,893 B2 | 3/2019 | McCune et al. |
| 10,247,044 B2 | 4/2019 | Barmeier et al. |
| 10,247,046 B2 | 4/2019 | Schuster et al. |
| 10,267,184 B2 | 4/2019 | Bowan et al. |
| 10,323,545 B2 | 6/2019 | Johnson |
| 10,352,197 B2 | 7/2019 | Grill et al. |
| 10,357,726 B2 | 7/2019 | Qin et al. |
| 10,400,635 B2 | 9/2019 | Johnson et al. |
| 10,435,604 B2 | 10/2019 | Kontomaris et al. |
| 10,458,206 B2 | 10/2019 | Al-Dossary et al. |
| 10,465,104 B2 | 11/2019 | Ravi et al. |
| 10,465,491 B2 | 11/2019 | Moore |
| 10,472,994 B2 | 11/2019 | Avadhanula et al. |
| 10,494,897 B2 | 12/2019 | Pandey et al. |
| 10,495,098 B2 | 12/2019 | Preuss et al. |
| 10,519,814 B2 | 12/2019 | Quoilin |
| 10,527,026 B2 | 1/2020 | Muir et al. |
| 10,563,927 B2 | 2/2020 | Papadopoulos et al. |
| 10,570,777 B2 | 2/2020 | Bowan |
| 10,570,782 B2 | 2/2020 | Lintl et al. |
| 10,584,660 B2 | 3/2020 | Sheridan et al. |
| 10,590,324 B2 | 3/2020 | Kulkarni et al. |
| 10,590,802 B2 | 3/2020 | McCune et al. |
| 10,598,160 B2 | 3/2020 | Sumrall |
| 10,612,423 B2 | 4/2020 | Ohman |
| 10,619,520 B2 | 4/2020 | Juchymenko |
| 10,626,709 B2 | 4/2020 | Al-Dossary |
| 10,670,340 B2 | 6/2020 | Batscha et al. |
| 10,704,426 B2 | 7/2020 | Goethals et al. |
| 10,724,805 B2 | 7/2020 | Barmeier et al. |
| 10,767,904 B2 | 9/2020 | During |
| 10,788,267 B2 | 9/2020 | Dokic et al. |
| 10,794,292 B2 | 10/2020 | Kupratis et al. |
| 10,883,388 B2 | 1/2021 | Held |
| 10,934,895 B2 | 3/2021 | Held et al. |
| 10,947,626 B2 | 3/2021 | Pinder et al. |
| 10,947,839 B2 | 3/2021 | Cuthbert et al. |
| 10,975,279 B2 | 4/2021 | Kontomaris et al. |
| 11,022,070 B2 | 6/2021 | Aumann et al. |
| 11,137,169 B2 | 10/2021 | Buscheck et al. |
| 11,168,673 B2 | 11/2021 | Younes et al. |
| 11,174,715 B2 | 11/2021 | Atisele |
| 11,187,112 B2 | 11/2021 | Held |
| 11,187,212 B1* | 11/2021 | Bodishbaugh ........ E21B 34/066 |
| 11,220,932 B2 | 1/2022 | Kontomaris et al. |
| 11,255,315 B1* | 2/2022 | Bodishbaugh .......... E21B 47/07 |
| 11,255,576 B2 | 2/2022 | Higgins et al. |
| 11,274,660 B2 | 3/2022 | Radke |
| 11,274,663 B1* | 3/2022 | Bodishbaugh ...... E21B 41/0085 |
| 11,280,226 B2 | 3/2022 | Duffney |
| 11,293,414 B1* | 4/2022 | Bodishbaugh .......... F03G 4/035 |
| 11,326,479 B2 | 5/2022 | Radke |
| 11,326,550 B1 | 5/2022 | Bodishbaugh et al. |
| 11,359,612 B1* | 6/2022 | Bodishbaugh ...... E21B 41/0085 |
| 11,365,652 B2 | 6/2022 | Gaia et al. |
| 11,396,828 B2 | 7/2022 | Chase |
| 11,486,370 B2 | 11/2022 | Bodishbaugh et al. |
| 2003/0010652 A1 | 1/2003 | Hunt |
| 2003/0029169 A1 | 2/2003 | Hanna et al. |
| 2004/0011038 A1 | 1/2004 | Stinger et al. |
| 2004/0011039 A1 | 1/2004 | Stinger et al. |
| 2004/0237890 A1 | 12/2004 | Bour |
| 2005/0034467 A1 | 2/2005 | Varney |
| 2005/0247056 A1 | 11/2005 | Cogswell et al. |
| 2005/0247059 A1 | 11/2005 | Cogswell et al. |
| 2006/0026961 A1 | 2/2006 | Bronicki |
| 2006/0130480 A1 | 6/2006 | Lovelace |
| 2007/0025854 A1 | 2/2007 | Moore et al. |
| 2008/0168772 A1 | 7/2008 | Radcliff et al. |
| 2008/0217523 A1 | 9/2008 | O'Sullivan |
| 2009/0211253 A1 | 8/2009 | Radcliff et al. |
| 2009/0217664 A1 | 9/2009 | Rapp et al. |
| 2009/0257902 A1 | 10/2009 | Ernens |
| 2009/0320477 A1 | 12/2009 | Juchymenko |

(56) References Cited

U.S. PATENT DOCUMENTS

| | | |
|---|---|---|
| 2010/0018207 A1 | 1/2010 | Juchymenko |
| 2010/0077752 A1 | 4/2010 | Papile |
| 2010/0077792 A1 | 4/2010 | Gurin |
| 2010/0187319 A1 | 7/2010 | Isom et al. |
| 2010/0194111 A1 | 8/2010 | Van den Bossche et al. |
| 2010/0218930 A1 | 9/2010 | Proeschel |
| 2010/0300093 A1 | 12/2010 | Doty |
| 2011/0000210 A1 | 1/2011 | Miles |
| 2011/0030404 A1 | 2/2011 | Gurin et al. |
| 2011/0041502 A1 | 2/2011 | Zimron et al. |
| 2011/0041505 A1 | 2/2011 | Kasuya et al. |
| 2011/0083620 A1 | 4/2011 | Yoon |
| 2011/0100003 A1 | 5/2011 | McLeod et al. |
| 2011/0126539 A1 | 6/2011 | Ramaswamy et al. |
| 2011/0138809 A1 | 6/2011 | Ramaswamy et al. |
| 2011/0272166 A1 | 11/2011 | Hunt |
| 2011/0314818 A1 | 12/2011 | Breen et al. |
| 2012/0001429 A1 | 1/2012 | Saar et al. |
| 2012/0042650 A1 | 2/2012 | Ernst et al. |
| 2012/0111004 A1 | 5/2012 | Conry |
| 2012/0131918 A1 | 5/2012 | Held |
| 2012/0145397 A1 | 6/2012 | Schultz et al. |
| 2012/0174581 A1 | 7/2012 | Vaughan et al. |
| 2012/0192560 A1 | 8/2012 | Ernst et al. |
| 2012/0198844 A1 | 8/2012 | Kaminsky |
| 2012/0261092 A1 | 10/2012 | Heath et al. |
| 2012/0291433 A1 | 11/2012 | Meng et al. |
| 2012/0292112 A1 | 11/2012 | Lakic |
| 2012/0292909 A1 | 11/2012 | Erikson |
| 2012/0315158 A1 | 12/2012 | Klaus |
| 2013/0041068 A1 | 2/2013 | Reddy et al. |
| 2013/0067910 A1 | 3/2013 | Ishiguro et al. |
| 2013/0091843 A1 | 4/2013 | Zyhowski et al. |
| 2013/0168089 A1 | 7/2013 | Berg et al. |
| 2013/0168964 A1 | 7/2013 | Xu et al. |
| 2013/0217604 A1 | 8/2013 | Fisk, Jr. |
| 2013/0247569 A1 | 9/2013 | Suter |
| 2013/0298568 A1 | 11/2013 | Pierson et al. |
| 2013/0299123 A1 | 11/2013 | Matula |
| 2013/0299170 A1 | 11/2013 | Joseph et al. |
| 2014/0011908 A1 | 1/2014 | Reddy et al. |
| 2014/0026574 A1 | 1/2014 | Leibowitz et al. |
| 2014/0033713 A1 | 2/2014 | Juchymenko |
| 2014/0057810 A1 | 2/2014 | Fisk, Jr. |
| 2014/0087978 A1 | 3/2014 | Deville |
| 2014/0102098 A1 | 4/2014 | Bowan et al. |
| 2014/0123643 A1 | 5/2014 | Ming |
| 2014/0130498 A1 | 5/2014 | Randolph |
| 2014/0158429 A1 | 6/2014 | Kader et al. |
| 2014/0178180 A1 | 6/2014 | Sheridan |
| 2014/0206912 A1 | 7/2014 | Iglesias |
| 2014/0224469 A1 | 8/2014 | Mirmobin et al. |
| 2014/0296113 A1 | 10/2014 | Reyes et al. |
| 2014/0305125 A1 | 10/2014 | Wang et al. |
| 2014/0366540 A1 | 12/2014 | Zyhowski et al. |
| 2015/0021924 A1 | 1/2015 | Parella |
| 2015/0047351 A1 | 2/2015 | Ishikawa et al. |
| 2015/0135708 A1 | 5/2015 | Lutz et al. |
| 2015/0226500 A1 | 8/2015 | Reissner et al. |
| 2015/0252653 A1 | 9/2015 | Shelton, Jr. |
| 2015/0300327 A1 | 10/2015 | Sweatman et al. |
| 2015/0330261 A1 | 11/2015 | Held |
| 2015/0345341 A1 | 12/2015 | Kacludis et al. |
| 2015/0345482 A1 | 12/2015 | Klitzing et al. |
| 2015/0361831 A1 | 12/2015 | Myers |
| 2016/0003108 A1 | 1/2016 | Held et al. |
| 2016/0010512 A1 | 1/2016 | Close |
| 2016/0017758 A1 | 1/2016 | Vermeersch et al. |
| 2016/0017759 A1 | 1/2016 | Gayawal et al. |
| 2016/0040557 A1 | 2/2016 | Vermeersch et al. |
| 2016/0047540 A1 | 2/2016 | Aumann et al. |
| 2016/0061055 A1 | 3/2016 | Bowan |
| 2016/0076405 A1 | 3/2016 | Hashimoto et al. |
| 2016/0084115 A1 | 3/2016 | Ludewig et al. |
| 2016/0130985 A1 | 5/2016 | O'Connor et al. |
| 2016/0160111 A1 | 6/2016 | Smith et al. |
| 2016/0177887 A1 | 6/2016 | Fischer |
| 2016/0201521 A1 | 7/2016 | Karthauser |
| 2016/0222275 A1 | 8/2016 | Galindo et al. |
| 2016/0257869 A1 | 9/2016 | Kulkarni et al. |
| 2016/0312646 A1 | 10/2016 | Juano |
| 2016/0340572 A1 | 11/2016 | Pascarella et al. |
| 2016/0369408 A1 | 12/2016 | Reyes et al. |
| 2017/0058181 A1 | 3/2017 | Frantz et al. |
| 2017/0058722 A1 | 3/2017 | Noureldin et al. |
| 2017/0130614 A1 | 5/2017 | Held et al. |
| 2017/0145815 A1 | 5/2017 | Cuthbert et al. |
| 2017/0159504 A1 | 6/2017 | Ostrom et al. |
| 2017/0175582 A1 | 6/2017 | McCune et al. |
| 2017/0175583 A1 | 6/2017 | McCune et al. |
| 2017/0226402 A1 | 8/2017 | Patil et al. |
| 2017/0233635 A1 | 8/2017 | Pandey et al. |
| 2017/0240794 A1 | 8/2017 | Iverson et al. |
| 2017/0254223 A1 | 9/2017 | Goethals et al. |
| 2017/0254226 A1 | 9/2017 | Heber et al. |
| 2017/0261268 A1 | 9/2017 | Barmeier et al. |
| 2017/0276026 A1 | 9/2017 | Barmeier et al. |
| 2017/0276435 A1 | 9/2017 | Papadopoulos et al. |
| 2017/0362963 A1 | 9/2017 | Hostler et al. |
| 2017/0284230 A1 | 10/2017 | Juchymenko |
| 2017/0314420 A1 | 11/2017 | Bowan et al. |
| 2017/0321104 A1 | 11/2017 | Ravi et al. |
| 2017/0321107 A1 | 11/2017 | Joseph et al. |
| 2018/0094548 A1 | 4/2018 | Jeter |
| 2018/0128131 A1 | 5/2018 | Zyhowski et al. |
| 2018/0224164 A1 | 8/2018 | Lakic |
| 2018/0274524 A1 | 9/2018 | Moncarz et al. |
| 2018/0313340 A1 | 11/2018 | Spadacini et al. |
| 2018/0328138 A1 | 11/2018 | Pandey et al. |
| 2018/0340450 A1 | 11/2018 | Avadhanula et al. |
| 2018/0355703 A1 | 12/2018 | Al-Dossary |
| 2018/0356044 A1 | 12/2018 | Monti et al. |
| 2019/0048759 A1 | 2/2019 | Noureldin et al. |
| 2019/0055445 A1 | 2/2019 | Kulkarni et al. |
| 2019/0128147 A1 | 5/2019 | Liu et al. |
| 2019/0128567 A1 | 5/2019 | Redfern |
| 2019/0390660 A1 | 12/2019 | McBay |
| 2020/0011426 A1 | 1/2020 | Juchymenko |
| 2020/0025032 A1 | 1/2020 | McCune et al. |
| 2020/0095899 A1 | 3/2020 | Merswolke et al. |
| 2020/0200123 A1 | 6/2020 | Aumann et al. |
| 2020/0200483 A1 | 6/2020 | Ahlbom |
| 2020/0217304 A1 | 7/2020 | Sumrall |
| 2020/0232342 A1 | 7/2020 | McCune et al. |
| 2020/0248063 A1 | 8/2020 | Stone |
| 2020/0292240 A1 | 9/2020 | Chase |
| 2020/0308992 A1 | 10/2020 | Juchymenko |
| 2020/0309101 A1 | 10/2020 | Muir et al. |
| 2020/0354839 A1 | 11/2020 | Pinder et al. |
| 2020/0386212 A1 | 12/2020 | Atisele |
| 2020/0399524 A1 | 12/2020 | Pisklak et al. |
| 2021/0017439 A1 | 1/2021 | Ramirez Angulo et al. |
| 2021/0062682 A1 | 3/2021 | Higgins et al. |
| 2021/0071063 A1 | 3/2021 | Stone |
| 2021/0140684 A1 | 5/2021 | Younes et al. |
| 2021/0172344 A1 | 6/2021 | Juchymenko |
| 2021/0205738 A1 | 7/2021 | Blomqvist et al. |
| 2021/0372668 A1 | 12/2021 | Buscheck et al. |
| 2022/0090521 A1 | 3/2022 | Kontomaris et al. |
| 2022/0154603 A1 | 5/2022 | Duffney |
| 2022/0186636 A1 | 6/2022 | Ohman et al. |
| 2022/0186984 A1 | 6/2022 | Gaia et al. |

FOREIGN PATENT DOCUMENTS

| | | |
|---|---|---|
| AU | 2011336831 B2 | 12/2016 |
| AU | 2012306439 B2 | 3/2017 |
| AU | 2014225990 B2 | 7/2018 |
| CA | 2692629 | 1/2009 |
| CA | 2698334 | 4/2009 |
| CA | 2676502 A1 | 2/2011 |
| CA | 2679612 | 5/2018 |
| CA | 2676502 | 12/2018 |
| CA | 29523790 | 4/2019 |

(56) References Cited

FOREIGN PATENT DOCUMENTS

| | | |
|---|---|---|
| CN | 20466161 | 9/2015 |
| CN | 103174473 | 10/2015 |
| CN | 102812212 | 4/2016 |
| CN | 103174475 | 8/2016 |
| CN | 106517718 | 3/2017 |
| CN | 107246550 | 10/2017 |
| CN | 108302946 A | 7/2018 |
| CN | 108457609 A | 8/2018 |
| CN | 207761721 U | 8/2018 |
| CN | 209457990 U | 10/2019 |
| CN | 111837006 | 10/2020 |
| CN | 111911255 | 11/2020 |
| CN | 113266815 A | 8/2021 |
| CN | 113983844 A | 1/2022 |
| DE | 10337240 A1 | 3/2005 |
| DE | 102011006066 A1 | 9/2012 |
| DE | 102012214907 A1 | 10/2013 |
| DE | 102012014443 | 1/2014 |
| DE | 102013009351 | 1/2014 |
| DE | 102018201172 A1 | 7/2019 |
| EP | 0652368 | 5/1995 |
| EP | 1507069 A1 | 2/2005 |
| EP | 2530255 A2 | 12/2012 |
| EP | 2201666 | 3/2013 |
| EP | 1573173 | 4/2013 |
| EP | 1713877 | 5/2013 |
| EP | 1869293 | 5/2013 |
| EP | 2222939 | 11/2013 |
| EP | 1706667 B1 | 10/2014 |
| EP | 2167872 | 2/2016 |
| EP | 2446122 B1 | 8/2017 |
| EP | 2478201 B1 | 8/2017 |
| EP | 3102796 B1 | 1/2018 |
| EP | 3514339 A1 | 7/2019 |
| EP | 2550436 B1 | 8/2019 |
| EP | 3464836 | 4/2020 |
| EP | 3631173 A1 | 4/2020 |
| EP | 2948649 B1 | 12/2020 |
| EP | 3540331 B1 | 12/2020 |
| FR | 2738872 | 3/1997 |
| GB | 2336943 | 6/2003 |
| IN | 247090 | 12/2003 |
| IN | 256000 | 1/2005 |
| IN | 202111000822 | 10/2021 |
| JP | 08192150 | 7/1996 |
| JP | 2001183030 | 7/2001 |
| JP | 2009127627 A | 6/2009 |
| JP | 2010166805 A | 7/2010 |
| JP | 2010249501 A | 11/2010 |
| JP | 2010249502 A | 11/2010 |
| JP | 2011064451 A | 3/2011 |
| JP | 4668189 B2 | 4/2011 |
| JP | 2011069370 A | 4/2011 |
| JP | 2011106459 A | 6/2011 |
| JP | 2011137449 A | 7/2011 |
| JP | 2013151931 A | 8/2013 |
| JP | 2013238228 A | 11/2013 |
| JP | 2014016124 A | 1/2014 |
| JP | 2014080975 A | 5/2014 |
| JP | 2014109279 A | 6/2014 |
| JP | 2015149885 A | 8/2015 |
| JP | 2016006323 A | 1/2016 |
| JP | 2016105687 A | 6/2016 |
| JP | 2016188640 A | 11/2016 |
| JP | 2021167601 A | 10/2021 |
| KR | 101126833 | 3/2012 |
| KR | 20120067710 | 6/2012 |
| KR | 20130023578 A | 3/2013 |
| KR | 1691908 | 1/2017 |
| KR | 2075550 | 2/2020 |
| KR | 2185002 | 12/2020 |
| NZ | 581457 | 11/2011 |
| RU | 2006142350 | 6/2008 |
| SG | 191467 | 7/2013 |
| SG | 191468 | 7/2013 |
| SG | 192327 | 8/2013 |
| WO | 1993/001397 | 1/1993 |
| WO | 1994028298 | 12/1994 |
| WO | 2005014981 A1 | 2/2005 |
| WO | 2005019606 A1 | 3/2005 |
| WO | 2005049975 | 6/2005 |
| WO | 2005100755 A1 | 10/2005 |
| WO | 2006/014609 | 2/2006 |
| WO | 2006/027770 | 3/2006 |
| WO | 2006060253 | 6/2006 |
| WO | 2006/092786 | 9/2006 |
| WO | 2006138459 | 12/2006 |
| WO | 2007048999 | 5/2007 |
| WO | 20070079245 | 7/2007 |
| WO | 2007137373 | 12/2007 |
| WO | 2008052809 | 5/2008 |
| WO | 2008106774 A1 | 9/2008 |
| WO | 2009017471 | 2/2009 |
| WO | 2009017474 | 2/2009 |
| WO | 2009027302 A2 | 3/2009 |
| WO | 2009030283 A2 | 3/2009 |
| WO | 2009/058112 | 5/2009 |
| WO | 2009095127 A2 | 8/2009 |
| WO | 2009/142608 | 11/2009 |
| WO | 2010021618 | 2/2010 |
| WO | 2010/039448 | 4/2010 |
| WO | 2010/065895 | 6/2010 |
| WO | 2009017473 | 8/2010 |
| WO | 2010106089 A2 | 9/2010 |
| WO | 2010127932 A2 | 11/2010 |
| WO | 2010/143046 | 12/2010 |
| WO | 2010/143049 | 12/2010 |
| WO | 2011012047 A1 | 2/2011 |
| WO | 2011/066032 | 6/2011 |
| WO | 2011073469 | 6/2011 |
| WO | 2011/061601 | 8/2011 |
| WO | 2011/103560 | 8/2011 |
| WO | 2011093854 | 8/2011 |
| WO | 2011/137980 | 11/2011 |
| WO | 2012060510 | 5/2012 |
| WO | 2012/079694 | 6/2012 |
| WO | 2012074940 A2 | 6/2012 |
| WO | 2012/112889 | 8/2012 |
| WO | 2012/142765 | 10/2012 |
| WO | 2012/151447 | 11/2012 |
| WO | 2013/014509 | 1/2013 |
| WO | 2013059695 | 4/2013 |
| WO | 2013/082575 | 6/2013 |
| WO | 2013103592 | 7/2013 |
| WO | 2013110375 A2 | 8/2013 |
| WO | 2013115668 A1 | 8/2013 |
| WO | 2013/136131 | 9/2013 |
| WO | 2014019755 A1 | 2/2014 |
| WO | 2014042580 | 3/2014 |
| WO | 2014053292 A2 | 4/2014 |
| WO | 2014059235 A1 | 4/2014 |
| WO | 2014065977 | 5/2014 |
| WO | 2014/124061 | 8/2014 |
| WO | 2014/167795 | 10/2014 |
| WO | 2014154405 A1 | 10/2014 |
| WO | 2014159520 A1 | 10/2014 |
| WO | 2014159587 A1 | 10/2014 |
| WO | 2014160257 A1 | 10/2014 |
| WO | 2014164620 | 10/2014 |
| WO | 2014164620 A1 | 10/2014 |
| WO | 2014165053 | 10/2014 |
| WO | 2014165053 A1 | 10/2014 |
| WO | 2014165144 A1 | 10/2014 |
| WO | 2014191157 A2 | 12/2014 |
| WO | 2015/040279 | 3/2015 |
| WO | 2015034987 A1 | 3/2015 |
| WO | 2015/059069 | 4/2015 |
| WO | 2015078829 A1 | 6/2015 |
| WO | 2015/135796 | 9/2015 |
| WO | 2015131940 A1 | 9/2015 |
| WO | 2015/158600 | 10/2015 |
| WO | 2015192005 A1 | 12/2015 |
| WO | 2016039655 A1 | 3/2016 |
| WO | 2016049712 | 4/2016 |

(56) References Cited

FOREIGN PATENT DOCUMENTS

| | | |
|---|---|---|
| WO | 2016050365 A1 | 4/2016 |
| WO | 2016050366 A1 | 4/2016 |
| WO | 2016050367 A1 | 4/2016 |
| WO | 2016050368 A1 | 4/2016 |
| WO | 2016050369 A1 | 4/2016 |
| WO | 2016/069242 | 5/2016 |
| WO | 2013103631 | 5/2016 |
| WO | 2016073245 A1 | 5/2016 |
| WO | 2016/087920 | 6/2016 |
| WO | 2016099975 A1 | 6/2016 |
| WO | 2016147419 | 9/2016 |
| WO | 2016/196144 | 12/2016 |
| WO | 2016204287 | 12/2016 |
| WO | 2017041147 | 3/2017 |
| WO | 2017065683 | 4/2017 |
| WO | 2017123132 | 7/2017 |
| WO | 2017/146712 | 8/2017 |
| WO | 2017/147400 | 8/2017 |
| WO | 2017203447 | 11/2017 |
| WO | 2018/044690 | 3/2018 |
| WO | 2018/107279 | 6/2018 |
| WO | 2018106528 | 6/2018 |
| WO | 2018/210528 | 11/2018 |
| WO | 2018217969 A1 | 11/2018 |
| WO | 2018227068 A1 | 12/2018 |
| WO | 2019004910 | 1/2019 |
| WO | 2019060844 | 3/2019 |
| WO | 2019067618 | 4/2019 |
| WO | 2019086960 A1 | 5/2019 |
| WO | 2019/157341 | 8/2019 |
| WO | 2019155240 | 8/2019 |
| WO | 2019/178447 | 9/2019 |
| WO | 2020152485 | 7/2020 |
| WO | 2020153896 | 7/2020 |
| WO | 2020/186044 | 9/2020 |
| WO | 2020201843 | 10/2020 |
| WO | 2020/229901 | 11/2020 |
| WO | 2020/097714 | 12/2020 |
| WO | 2020239067 | 12/2020 |
| WO | 2020239068 | 12/2020 |
| WO | 2020239069 | 12/2020 |
| WO | 2020251980 A1 | 12/2020 |
| WO | 2021004882 | 1/2021 |
| WO | 20210134651 | 1/2021 |
| WO | 2021096696 A1 | 5/2021 |
| WO | 2021107834 | 6/2021 |
| WO | 2022/061320 | 3/2022 |

OTHER PUBLICATIONS

International Search Report and Written Opinion for PCT/US2022/071475, dated May 17, 2022.
International Search Report and Written Opinion for PCT/US2022/071480, dated Aug. 3, 2022.
International Search Report and Written Opinion for PCT/US2022/071482, dated Aug. 2, 2022.
"From Waste Heat to High Performance", PBOG (Permian Basin Oil and Gas Magazine), Apr. 26, 2013.
"Turning Waste Heat Into Clean Power; GNP's Expander System", Great Northern Power Corporation, 2022.
Ng et al., "Thermo-Economic Performance of an Organic Rankine Cycle System Recovering Waste Heat Onboard an Offshore Service Vessel", Journal of Marine Science and Engineering, May 14, 2020.
"First Flare Elimination Demonstration", ElectraTherm, 2022.
International Search Report and Written Opinion for PCT/US2022/071313, dated Jul. 5, 2022.
International Search Report and Written Opinion for PCT/US2022/071517, dated Jun. 27, 2022.
Richter, Alexander, GreenFire Energy and MItsui Oil Exploration Co. are partnering on a closed-loop geothermal pilot project in Japan, Think GeoEnergy, Apr. 6, 2021.
Edwards, Alex, Dallas Innovates, Hunt Energy Network's New Venture Will Put 50 Batteries Across Texas, Giving ERCOT a Portfolio of Energy Generation, Apr. 1, 2021.
Guo, Boyun, Petroleum Enginnering, A Computer-Assisted Approach, Dec. 21, 2006.
Li, Tailu et al., Cascade utilization of low temperature geothermal water in oilfield combined power generation, gathering heat tracing and oil recovery, Applied Thermal Engineering 40 (2012).
Sherven, Bob, Automation Maximizes performance for shale wells, Oil&Gas Journal, 2013.
Hu, Kaiyong et al., A case study of an ORC geothermal power demonstration system under partial load conditions in Huabei Oilfield, China, ScientDirect, 2017.
Liu, Xiaolei et al., A systematic study of harnessing low-temperature geothermal energy from oil and gas reservoirs, Elsevier, ScienceDirect, Energy, 2017.
Wang, Kai, et al., A comprehensive review of geothermal energy extraction and utilization in oilfields, Elsevier, ScienceDirect, Journal of Petroleum Science and Engineering, 2017.
Cutright, Bruce L., The Transformation of Tight Shale Gas Reservoirs to Geothermal Energy Production, Bureau of Economic Geology University of Texas, Austin Texas, Jun. 14, 2011.
Khennich, Mohammed et al., Optimal Design of ORC Systems with a Low-Temperature Heat Source, Entropy 2012, 14, 370-389; doi:10.3390/e14020370.
Dambly, Benjamin W., et al., The Organic Rankine Cycle for Geothermal Power Generation, Geothermal Energy, 2007.
Obi, John Besong, State of art on ORC applications for waste heat recovery and micro-cogeneration for installations up to 100kWe, Elsevier, Energy Procedia 82 (2015) 994-1001.
Obafunmi, Jaiyejeje Sunday, Thermodynamic Analysis of Organic Rankine Cycles, Eastern Mediterranean University Jul. 2014, Gazimağusa, North Cyprus.
Dong, Bensi et al., Potential of low temperature organic Rankine cycle with zeotropic mixtures as working fluid, Elsevier, ScienceDirect, Energy Procedia 105 (2017) 1489-1494.
Iqbal, MdArbab et al., Trilateral Flash Cycle (TFC): a promising thermodynamic cycle for low grade heat to power generation, Elsevier, ScienceDirect, Energy Procedia 160 (2019) 208-214.
Bao, Junjiang et al., A review of working fluid and expander selections for organic Rankine cycle, Elsevier, ScienceDirect, Renewable and Sustainable Energy Reviews 24 (2013) 325-342.
Ajimotokan, Habeeb A. et al., Trilateral Flash Cycle for Recovery of Power from a Finite Low-Grade Heat Source, Proceedings of the 24th European Symposium on Computer Aided Process Engineering—ESCAPE 24 Jun. 15-18, 2014, Budapest, Hungary. Copyright © 2014 Elsevier B.V.
Hung Tzu-Chen, et al., The Development and Application of a Small-Scale Organic Rankine Cycle for Waste Heat Recovery, IntechOpen, 2019.
Kong, Rithy et al., Thermodynamic performance analysis of a R245fa organic Rankine cycle (ORC) with different kinds of heat sources at evaporator, Elsevier, ScienceDirect, Case Studies in Thermal Engineering 13 (2019) 100385.
Lukawski, Maciej Z. et al., Impact of molecular structure of working fluids on performance of organic Rankine cycles (ORCs), Sustainable Energy Fuels, 2017, 1, 1098.
Saleh, Bahaa et al., Working fluids for low-temperature organic Rankine cycles, Elsevier, ScienceDirect, Energy 32 (2007) 1210-1221.
Brasz, Lars J. et al., Ranking of Working Fluids for Organic Rankine Cycle Applications, Purdue University, Purdue e-Pubs, (2004). International Refrigeration and Air Conditioning Conference. Paper 722.
Miller, Patrick C., Research uses landfill gas tech for Bakken flaring solution, The Bakken magazine, Sep. 16, 2015.
ElectraTherm, Inc., Power+ Generator 4400B & 4400B+, Nov. 24, 2020.
ElectraTherm, Inc., Heat to Power Generation Base Load Renewable Energy, Mar. 2020.
ElectraTherm, Inc., Power+ Generator, Nov. 25, 2020.
ElectraTherm, Inc., Generating Clean Power From Waste Heat, Nov. 2020.
ElectraTherm, Inc., Power+ Generator, May 19, 2020.

(56) References Cited

OTHER PUBLICATIONS

Sneary, Loy et al., Gulf Coast Green Energy, Flare Gas Reduction Trial Using an Organic Rankine Cycle Generator, Jan. 11, 2016.
Enertime, ORC for Industrial Waste Heat Recovery, Aug. 2017.
Enogia, Generate power from your waste heat thanks to our ORC, 2019.
UTC Power, PureCycle, 200 Heat-to-Electricity Power System, 2004.
Rank, MT3 machine, Dec. 17, 2018.
Heat Recovery Solutions, Clean Cycle Containerized Solution, 2009.
Friogen BV, Specification: E-Box Engine Application, Feb. 15, 2019.
International Search Report and Written Opinion for PCT/US2022/071486, dated Jun. 14, 2022.
International Search Report and Written Opinion for PCT/US2022/071474, dated Jun. 10, 2022.
International Search Report and Written Opinion for PCT/US2022/071484, dated Jun. 27, 2022.
International Search Report and Written Opinion for PCT/US2022/071319, dated Jul. 12, 2022.
Invitation to Pay Additional Fees and Communication Relating to Results of Partial International Search for PCT/US2022/071329, dated Jun. 27, 2022.
Invitation to Pay Additional Fees and Communication Relating to Results of Partial International Search for PCT/US2022/071327, dated Jul. 4, 2022.
International Search Report and Written Opinion for PCT/US2022/071323, dated Jun. 28, 2022.
International Search Report and Written Opinion for PCT/US2022/071325, dated Jun. 28, 2022.
International Search Report and Written Opinion for PCT/US2022/071327, dated Aug. 29, 2022.
International Search Report and Written Opinion for PCT/US2022/071328, dated Sep. 9, 2022.
International Search Report and Written Opinion for PCT/US2022/071329, dated Aug. 25, 2022.

* cited by examiner

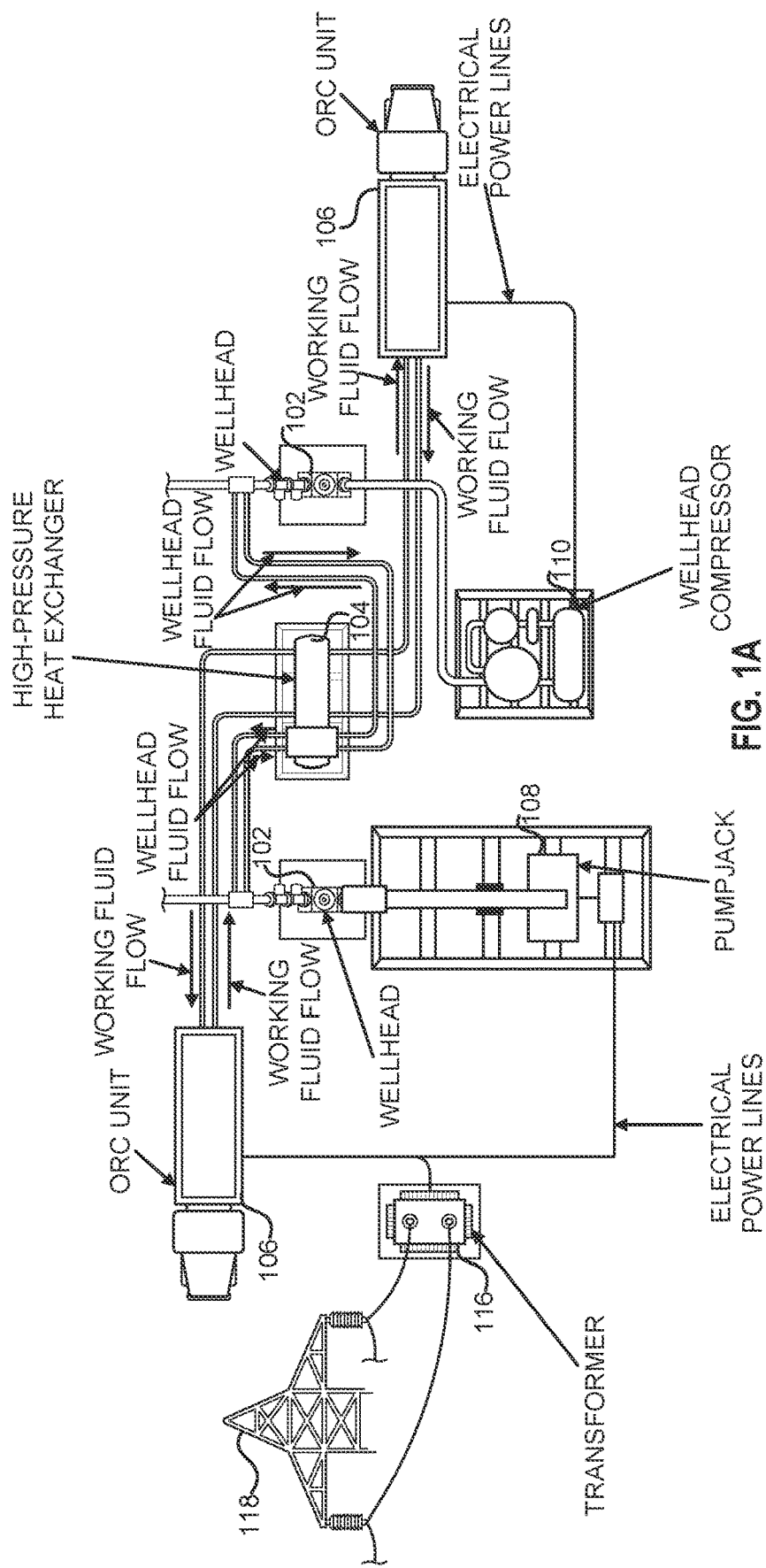

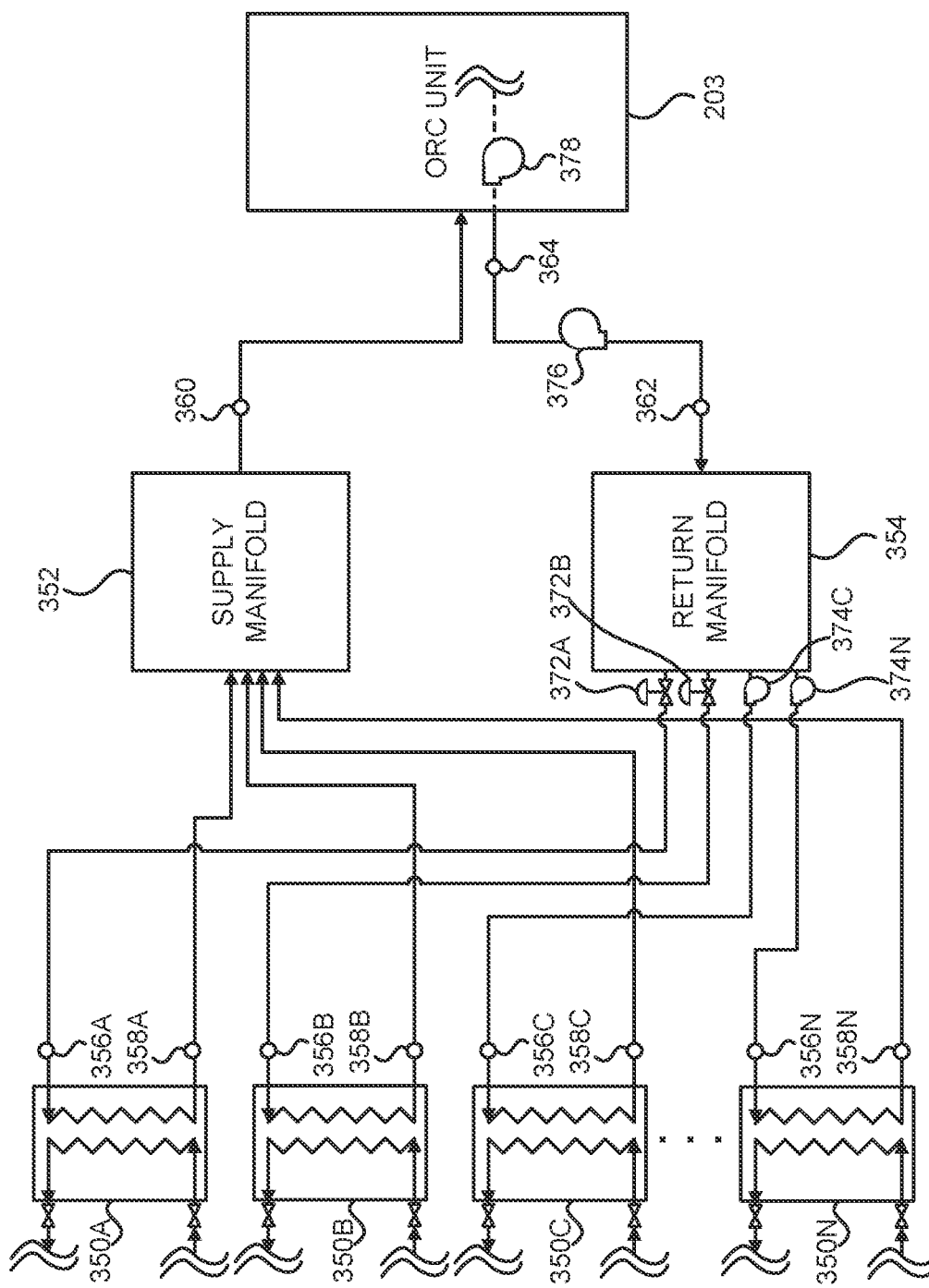

SYSTEMS AND METHODS FOR GENERATION OF ELECTRICAL POWER IN AN ORGANIC RANKINE CYCLE OPERATION

CROSS REFERENCE TO RELATED APPLICATIONS

This application is a continuation of U.S. Non-Provisional application Ser. No. 17/682,126, filed Feb. 28, 2022, titled "SYSTEMS AND METHODS FOR GENERATION OF ELECTRICAL POWER IN AN ORGANIC RANKINE CYCLE OPERATION," which is a continuation of U.S. Non-Provisional application Ser. No. 17/494,936, filed Oct. 6, 2021, titled "SYSTEMS AND METHODS FOR GENERATION OF ELECTRICAL POWER IN AN ORGANIC RANKINE CYCLE OPERATION," now U.S. Pat. No. 11,293,414, issued Apr. 5, 2022, which is a continuation-in-part of U.S. Non-Provisional application Ser. No. 17/305,296, filed Jul. 2, 2021, titled "CONTROLLER FOR CONTROLLING GENERATION OF GEOTHERMAL POWER IN AN ORGANIC RANKINE CYCLE OPERATION DURING HYDROCARBON PRODUCTION," now U.S. Pat. No. 11,255,315, issued Feb. 22, 2022, which claims priority to and the benefit of U.S. Provisional Application No. 63/200,908, filed Apr. 2, 2021, titled "SYSTEMS AND METHODS FOR GENERATING GEOTHERMAL POWER DURING HYDROCARBON PRODUCTION," the disclosures of which are incorporated herein by reference in their entirety.

FIELD OF DISCLOSURE

Embodiments of this disclosure relate to generating electrical power during hydrocarbon production, and more particularly, to systems and methods for generating and controllers for controlling generation of electrical power in an organic Rankine cycle (ORC) operation in the vicinity of a wellhead during hydrocarbon production to thereby supply electrical power to one or more of in-field operational equipment, a grid power structure, and an energy storage device.

BACKGROUND

Typically, geothermal generators include a working fluid loop that flows to varying depths underground, such that underground heat causes the working fluid in the loop to change phases from a liquid to a vapor. The vaporous working fluid may then flow to a gas expander, causing the gas expander to rotate. The rotation of the gas expander may cause a generator to generate electrical power. The vaporous working fluid may then flow to a condenser or heat sink. The condenser or heat sink may cool the working fluid, causing the working fluid to change phase from the vapor to the liquid. The working fluid may circulate through the loop in such a continuous manner, thus the geothermal generator may generate electrical power.

Heat exchangers within geothermal generators are not built to withstand high pressures. Typically, the working fluid does not flow through the loop under high pressure. Further, rather than including heat exchangers, typically, geothermal generators utilize geothermal heat from varying depths underground, the heat being transferred to the working fluid. For example, a geothermal generator may simply include a conduit or pipe buried deep underground. As working fluid flows through the conduit or pipe, the heat at such depths causes the working fluid to change to a vapor and the vapor may flow up to the gas expander. As the vapor is cooled, the vapor flows back underground, the cycle repeating. While old or non-producing wells have been utilized for geothermal power generation, no such solution is known to exist for generating geothermal power at a well during hydrocarbon production.

Accordingly, Applicants have recognized a need for systems and methods to generate geothermal power in an organic Rankine cycle (ORC) operation in the vicinity of a wellhead during hydrocarbon production to thereby supply electrical power to one or more of in-field operational equipment, a grid power structure, and an energy storage device. The present disclosure is directed to embodiments of such systems and methods.

SUMMARY

The present disclosure is generally directed to systems and methods for generating and controlling generation of geothermal power in an organic Rankine cycle (ORC) operation to thereby supply electrical power to one or more of in-field operational equipment, a grid power structure, and an energy storage device. Such operations may occur in the vicinity of a wellhead during hydrocarbon production or in the vicinity of another production site or facility where heated fluid is produced or processed. The wellhead may produce a wellhead fluid. The wellhead fluid, as it exits the wellhead, may be under high-pressure and at a high temperature. As noted, another production site or facility may produce heated, high-pressure fluid. The fluid's (e.g., wellhead fluid or other fluid) temperature may be determined, as well as the pressure, and based on such determinations, one or more heat exchanger valves may be actuated to partially open or completely open, thereby diverting a portion or all of the flow of fluid to the heat exchanger. The heat exchanger may be a high-pressure heat exchanger configured to withstand the high-pressure of the fluid from a source. The heat exchanger may indirectly transfer heat from the flow of the fluid to the flow of a working fluid. As heat is transferred from the flow of the fluid to the flow of a working fluid, such a heat transfer may cause the working fluid to change phases from a liquid to a vapor. The vaporous working fluid may then flow through an ORC unit to cause a generator to generate electrical power via rotation of a gas expander of the ORC unit. Such an operation may be defined as or may be an ORC operation or process. The ORC unit may be an off-the-shelf unit, while the high-pressure heat exchanger may be a stand-alone component or device. In another embodiment, the ORC unit may be a high-pressure ORC unit and may include the high-pressure heat exchanger apparatus.

Accordingly, an embodiment of the disclosure is directed to a method for generating geothermal power in an organic Rankin cycle operation to thereby supply electrical power to one or more of in-field operational equipment, a grid power structure, and an energy storage device. The method may include connecting one or more high-pressure heat exchangers to a heated fluid flow line of one or more sources at a well thereby defining a fluid path from the heated fluid flow line of one or more sources through the one or more high pressure heat exchangers. The method may include connecting a supply manifold to (a) an intermediate working fluid output of each of the one or more high-pressure heat exchangers and (b) an intermediate working fluid input of an ORC unit. The method may include connecting a return manifold to (a) an intermediate working fluid input of each of the one or more high-pressure heat exchangers and (b) an intermediate working fluid output of the ORC unit. The method may include opening one or more heat exchanger valves positioned between the one or more heat exchangers and heated fluid flow line of one or more sources, to allow continuous diversion of the flow of the one or more heated fluids during hydrocarbon production to the one or more high-pressure heat exchangers to facilitate transfer of heat from a flow of the one or more heated fluids from the one or more sources to a flow of intermediate working fluid through the one or more high-pressure heat exchangers. The flow of the intermediate working fluid may flow to the ORC unit via the supply manifold and to flow from the ORC unit to one of the one or more heat exchangers via the return manifold. The method may include, during hydrocarbon production at one or more of the one or more sources, determining, based on feedback from one or more temperature sensors corresponding to the flow of the intermediate working fluid exiting one of the one or more high-pressure heat exchangers to the supply manifold, a temperature of the flow of the intermediate working fluid. The method may include, in response to a determination that the temperature of the intermediate working fluid is above a threshold, maintaining at least a partially opened position of the one or more heat exchanger valves.

In an embodiment, the ORC unit may include an internal heat exchanger and an internal working fluid. The heat from the intermediate working fluid may be transferred to the internal working fluid, thereby to cause the ORC unit to generate electrical power. The threshold may be defined by a vaporous phase change temperature of the internal working fluid.

In an embodiment, the method may include, in response to a determination that the temperature of the working fluid is below the threshold, adjusting a position of the one or more heat exchanger valves. Further, the method may include, in response to a determination that the temperature of the working fluid is below the threshold, adjusting a rate of the flow of intermediate working fluid from a flow control device positioned between the return manifold and each of the one or more high-pressure heat exchangers. The flow control device may control the rate of flow of the intermediate working fluid from the return manifold to one of the one or more high-pressure heat exchangers. The flow control device may include one or more of a fixed speed pump, a variable speed drive pump, a control valve, or an actuated valve. In another embodiment, an increase in the rate of flow of the intermediate working fluid may increase an amount of heat transferred from the heated fluid to the intermediate working fluid. In another embodiment, an adjustment of the rate of flow of the intermediate working fluid may further based on a temperature of the heated fluid.

Another embodiment of the disclosure is directed to a system for generating geothermal power in an organic Rankin cycle (ORC) operation to thereby supply electrical power to one or more of in-field equipment, a grid power structure, and energy storage devices. The system may include a temperature sensor to provide a temperature of a flow of intermediate working fluid. The system may include a heat exchanger valve to divert flow of heated fluid from one or more sources based on the temperature. The system may include a high-pressure heat exchanger including a first fluid path to accept and output the flow of heated fluid from the heat exchanger valve and a second fluid path to accept and output the flow of the intermediate working fluid. The high-pressure heat exchanger may indirectly transfer heat from the flow of heated fluid to the flow of the intermediate working fluid. The system may include a supply manifold to connect to an output of the second fluid path of the high pressure heat exchanger. The system may include a return manifold to connect to an input of the second fluid path of the high pressure heat exchanger. The system may include an ORC unit including a generator, a gas expander, an intermediate working fluid input, an intermediate working fluid output, an internal heat exchanger including a first fluid path and a second fluid path, and a loop for a flow of internal working fluid. The loop may be defined by a fluid path through the second fluid path of the internal heat exchanger, condenser, generator, and pump. The intermediate working fluid input may connect the supply manifold to the ORC unit thereby to allow the flow of the intermediate working fluid to flow from the high-pressure heat exchanger to the supply manifold to the internal heat exchanger to facilitate transfer of heat from the intermediate working fluid to the internal working fluid. The intermediate working fluid output may connect the return manifold to the ORC unit thereby to allow the flow of the intermediate working fluid to flow from the internal heat exchanger to the return manifold to the high-pressure heat exchanger to facilitate transfer of heat from the heated fluid to the intermediate working fluid. The internal working fluid may cause the generator to generate electrical power via rotation of a gas expander as defined by an ORC operation.

In an embodiment, the system may include a return manifold valve to control the flow of intermediate working fluid from the return manifold to the high-pressure heat exchanger. The position of the return manifold valve may be adjusted based on the temperature of the working fluid. The adjustment of the position of the return manifold valve may further be based on the temperature of the heated fluid. The return manifold and the supply manifold may be connected to one or more additional high-pressure heat exchangers. In an embodiment, the flow control devices corresponding to the high-pressure heat exchanger and each one or more additional high-pressure heat exchangers may control the flow of intermediate working fluid flowing from the return manifold to each of the high-pressure heat exchanger and the one or more additional high-pressure heat exchangers.

In an embodiment, a first flow control device may control the flow of intermediate working fluid from the high-pressure heat exchanger to the supply manifold. A second flow control device may control the flow of intermediate working fluid from the return manifold to the high-pressure heat exchanger. The position of the first flow control device may be adjusted based on the temperature of the heated fluid and the temperature of the intermediate working fluid.

Another embodiment of the disclosure is directed to a controller to control an organic Rankine cycle (ORC) process having an ORC unit when the ORC unit is positioned. The controller may include an input in signal communication with a working fluid temperature sensor. The working fluid temperature sensor may be positioned to provide a temperature measurement of a flow of a working fluid from one or more heat exchangers to a supply manifold. The controller may include an input/output in signal communication with a heated fluid valve, a heat exchanger valve, and a flow control device. The controller may be operable to transmit a signal to the heat exchanger valve to cause the heat exchanger valve to open so as to allow continuous diversion of the flow of the heated fluid to one or more heat exchangers and facilitate transfer of heat from the flow of the heated fluid to the working fluid through the one or more heat exchangers, the heat transferred to the working fluid causing generation of electrical power in an ORC unit.

The controller may be operable to, in response to a temperature measurement of the working fluid from the first input being less than a threshold, transmit a signal to the heated fluid valve to cause a position of the heated fluid valve to adjust. Further, the controller may be operable to transmit a signal to the heat exchanger valve to cause a position of the heat exchanger valve to adjust. Finally, the controller may be operable to transmit a signal to the flow control device to cause a rate of the flow of the working fluid to adjust.

In an embodiment, the rate of the flow of the working fluid may adjust the temperature of the heated fluid. An increase in the rate of the working fluid may decreases the temperature of the heated fluid. A decrease in the rate of the working fluid may increase the temperature of the heated fluid. The working fluid may be an intermediate working fluid.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 1A and FIG. 1B are schematic top-down perspectives of novel implementations of a geothermal power generation enabled well, according to one or more embodiment of the disclosure.

FIG. 4A, FIG. 4B, FIG. 4C, FIG. 4D, and FIG. 4E are block diagrams illustrating novel implementations of an organic Rankin cycle (ORC) unit receiving warm and/or hot fluid from one or more heat exchangers via a supply manifold and a return manifold, according to one or more embodiments of the disclosure.

DETAILED DESCRIPTION

Figure 1B:
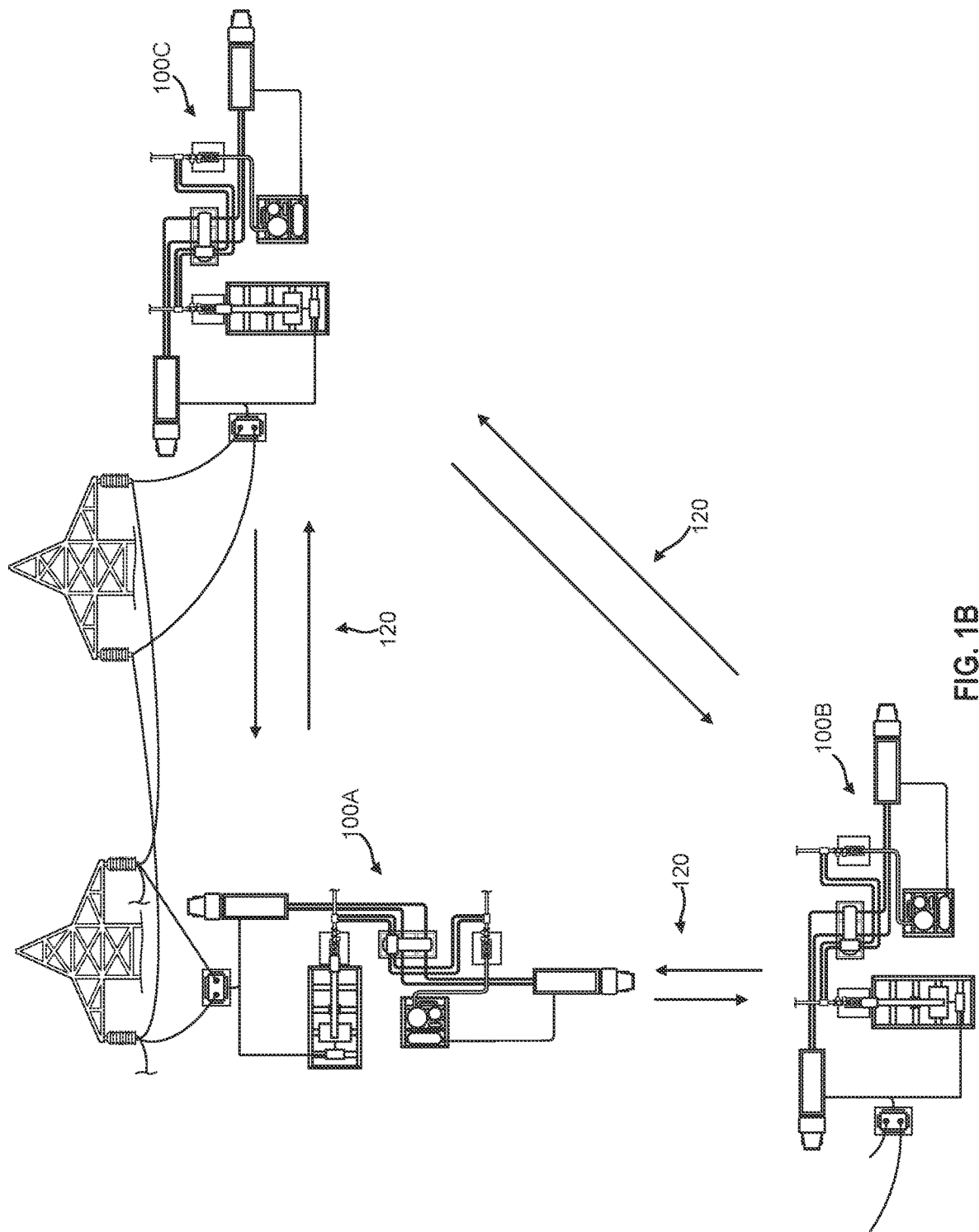

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to systems and methods for generating geothermal power in an organic Rankine cycle (ORC) operation in the vicinity of a wellhead during hydrocarbon production to thereby supply electrical power to one or more of in-field equipment or operational equipment, a grid power structure, other equipment, and an energy storage device. Wellhead fluids flowing from a wellhead at a well are typically under high-pressure. In-field equipment at the well is not rated for such high pressures. Prior to further processing or transport, the pressure of the flow of the wellhead fluid may be reduced, e.g., from 15,000 PSI to 200 PSI, from 10,000 PSI to 200 PSI, from 2,000 PSI to 200 PSI, or any other range from 20,000 PSI to 100 PSI, based on the pressure rating of the in-field equipment at the well. As the wellhead fluid flows from the wellhead, the temperature of the flow of the wellhead fluid may be at a high temperature, at least partially due to the high pressure of the flow of the wellhead fluid. As the pressure is reduced, the wellhead fluid temperature may also be reduced, as result of the pressure drop. Typically, the heat of the flow of wellhead fluid from the wellhead is not utilized and may be considered heat waste.

Geothermal power generators typically use a looping pipe or pipeline buried at depths with sufficient temperature to allow a working fluid to change phase from liquid to vapor. As the working fluid changes phase from a liquid to a vaporous state, the vaporous state working fluid may flow up the pipe or pipeline to a gas expander. The vaporous state working fluid may flow through and cause the gas expander to rotate. The rotation of the gas expander may cause a generator to generate electrical power, as will be described below. The vaporous state working fluid may flow through the gas expander to a heat sink, condenser, or other cooling apparatus. The heat sink, condenser, or other cooling apparatus may cool the working fluid thereby causing the working fluid to change phases from a vapor to a liquid. Heat exchangers of typical geothermal generators are not rated for high-pressure operations and usually geothermal generators obtain heat from varying underground depths.

In the present disclosure, a high-pressure heat exchanger may be placed or disposed at the well and/or in the vicinity of one or more wellheads. The high-pressure heat exchanger may be connected to the wellhead and may accept a high temperature or heated flow of wellhead fluid. A working fluid may flow through the heat exchanger. As the wellhead fluid and working fluid flows through the high-pressure heat exchanger, the high-pressure heat exchanger may facilitate transfer of heat from the wellhead fluid to the working fluid. A heat exchanger may include two fluidic paths, one for a heated fluid and another for a cool fluid. The fluidic paths may be in close proximity, allowing heat to transfer from the heated fluid to the cool fluid. The fluidic paths may be loops, coils, densely packed piping, tubes, chambers, some other type of path to allow for fluid to flow therethrough, and/or a combination thereof, as will be understood by those skilled in the art. As fluids flow through the heat exchanger, the cool liquid's temperature may increase, while the heated liquid's temperature may decrease.

Additionally, a geothermal generator unit or ORC unit may be disposed, positioned, or placed at the wellhead. The geothermal generator unit or ORC unit may directly connect to the high-pressure heat exchanger, include the high-pressure heat exchanger, or may connect to the high-pressure heat exchanger via an intermediary heat exchanger. As the hot wellhead fluid heats the working fluid, either via direct connection or through an intermediary heat exchanger, the working fluid may change phases from a liquid to a vapor. In such examples, the working fluid utilized may be chosen based on a low boiling point and/or high condensing point. The vaporous state working fluid may flow through the geothermal generator unit or ORC unit to a generator, e.g., a gas expander and generator. The vaporous state working fluid may then flow to a condenser or heat sink, thereby changing state from the vapor to the liquid. Finally, the liquid may be pumped back to the high-pressure heat exchanger. Such a cycle, process, or operation may be considered a Rankine cycle or ORC.

Such systems may include various components, devices, or apparatuses, such as temperature sensors, pressure sensors or transducers, flow meters, control valves, smart valves, valves actuated via control signal, controllers, a master or supervisory controller, other computing devices, computing systems, user interfaces, in-field equipment, and/or other equipment. The controller may monitor and adjust various aspects of the system to ensure that hydrocarbon production continues at a specified rate, that downtime is limited or negligible, and that electrical power is generated efficiently, optimally, economically, and/or to meet or exceed a preselected electrical power output threshold.

FIGS. 1A and 1B are schematic top-down perspectives of novel implementations of a geothermal power generation enabled well, according to one or more embodiment of the disclosure. As illustrated in FIG. 1A, a well 100 may include various components or equipment, also referred to as in-field equipment. Such in-field equipment may include fracturing equipment, field compressors, pump stations, artificial lift equipment, drilling rigs, data vans, and/or any other equipment utilized or used at a well 100. For example, the well 100 may include one or more pumpjacks 108, one or more wellhead compressors 110, various other pumps, various valves, and/or other equipment that may use electrical power or other type of power to operate. To generate power from otherwise wasted heat, the well 100 may additionally include a high-pressure heat exchanger 104, one or more geothermal generators, one or more ORC units 106, a high-pressure geothermal generator, a high-pressure ORC unit, and/or some combination thereof. As wellhead fluid flows from one of the one or more wellheads 102, a portion of the flow of wellhead fluid or all of the flow of wellhead fluid may flow through the high-pressure heat exchanger 104, high-pressure geothermal generator, a high-pressure ORC unit, or some combination thereof. As the hot and high-pressure wellhead fluid flows through, for example, the high-pressure heat exchanger 104, the high-pressure heat exchanger 104 may facilitate a transfer of heat from the wellhead fluid to a working fluid flowing through the high-pressure heat exchanger 104. In other words, the wellhead fluid may heat the working fluid. Such a heat transfer may cause the working fluid to change phases from a liquid to a vapor. The vaporous state working fluid may flow from the high-pressure heat exchanger to the one or more ORC units 106. The one or more ORC units 106 may then generate power using the vaporous state working fluid. The electrical power may be transferred to the in-field equipment at the well 100, to an energy storage device (e.g., if excess power is available), to equipment at other wells, to the grid or grid power structure (e.g., via a transformer 116 through power lines 118), or some combination thereof.

As illustrated in FIG. 1B, one or more wells 100A, 100B, 100C may be nearby or in close proximity to each of the other one or more wells 100A, 100B, 100C. Further, each of the one or more wells 100A, 100B, 100C may utilize different amounts of electrical power, in addition to generating different amounts of electrical power. As such, one well (e.g., well 100A, well 100B, and/or well 100C) of the one or more wells 100A, 100B, 100C may generate a surplus of electrical power or utilize electrical power from other sources. In an example, a controller may determine if a well (e.g., well 100A, well 100B, and/or well 100C) of the one or more wells 100A, 100B, 100C generates a surplus. If a surplus is generated, the controller may determine which, if any, of the other one or more wells 100A, 100B, 100C may have a deficit of electrical power. The controller may then transmit signals to equipment at the one or more wells 100A, 100B, 100C to enable electrical power transfer between the one or more wells 100A, 100B, 100C with excess and deficits, e.g., a well with a deficit may receive electrical power from a well with a surplus (see 120). In another example, the one or more wells 100A, 100B, 100C may include energy storage devices e.g., batteries, battery banks, or other solutions to store energy for short or long term time periods. The energy storage devices may be placed, disposed, or installed at one or more of the one or more wells 100A, 100B, 100C or at points in between the one or more wells 100A, 100B, 100C. As surplus electrical power is generated, that surplus electrical power may be transmitted and stored in the energy storage devices. The energy storage devices may be accessible by the in-field equipment of each of the one or more wells 100.

As illustrated in FIGS. 1A and 1B, the one or more wells 100A, 100B, 100C may include a high-pressure heat exchanger 104 and ORC units 106. In an example, the ORC units 106 may be modular and/or mobile. The ORC units 106 may be mounted to a vehicle, such as a truck or other vehicle type, or skid and transported to the well 100. Further, the high-pressure heat exchanger 104 may be modular and/or mobile. The high-pressure heat exchanger 104 may be mounted to a vehicle and/or skid. Upon arrival at one of the one or more wells 100A, 100B, 100C, the high-pressure heat exchanger 104 may be removed from the vehicle or the vehicle may be left on-site or at least while the one or more wells 100A, 100B, 100C are producing hydrocarbons. In an example, during hydrocarbon production, operation of the high-pressure heat exchanger 104 and ORC unit 106 may occur. After hydrocarbon production has ceased, none, some, or all of the equipment may be removed from the well 100. For example, the well 100 may be re-used for generating geothermal energy via a different method. In such examples the ORC units 106 and high-pressure heat exchanger 104 may remain on-site.

In another embodiment, rather than utilizing wellhead fluid from a well 100, another heated fluid may be utilized. For example, various production fluids at a refinery may be utilized in the high-pressure heat exchanger 104 and/or ORC unit 106. In another example, various heated fluids at an ethanol plant or facility or a renewable diesel or bio-diesel plant or facility may be utilized. For example, at an ethanol plant or facility a mixture of sugar and/or starch and water is typically heated then cooled to a specified temperature prior to fermentation. In such an example, the high-pressure heat exchanger 104 may be utilized to transfer heat from the heated mixture to the working fluid, thus cooling the heated mixture to a specified temperature. As will be understood by a person skilled in the art, any heated and/or high pressure fluid that is cooled prior to further use or processing may be utilized in the systems and methods described herein.

Figure 2A:
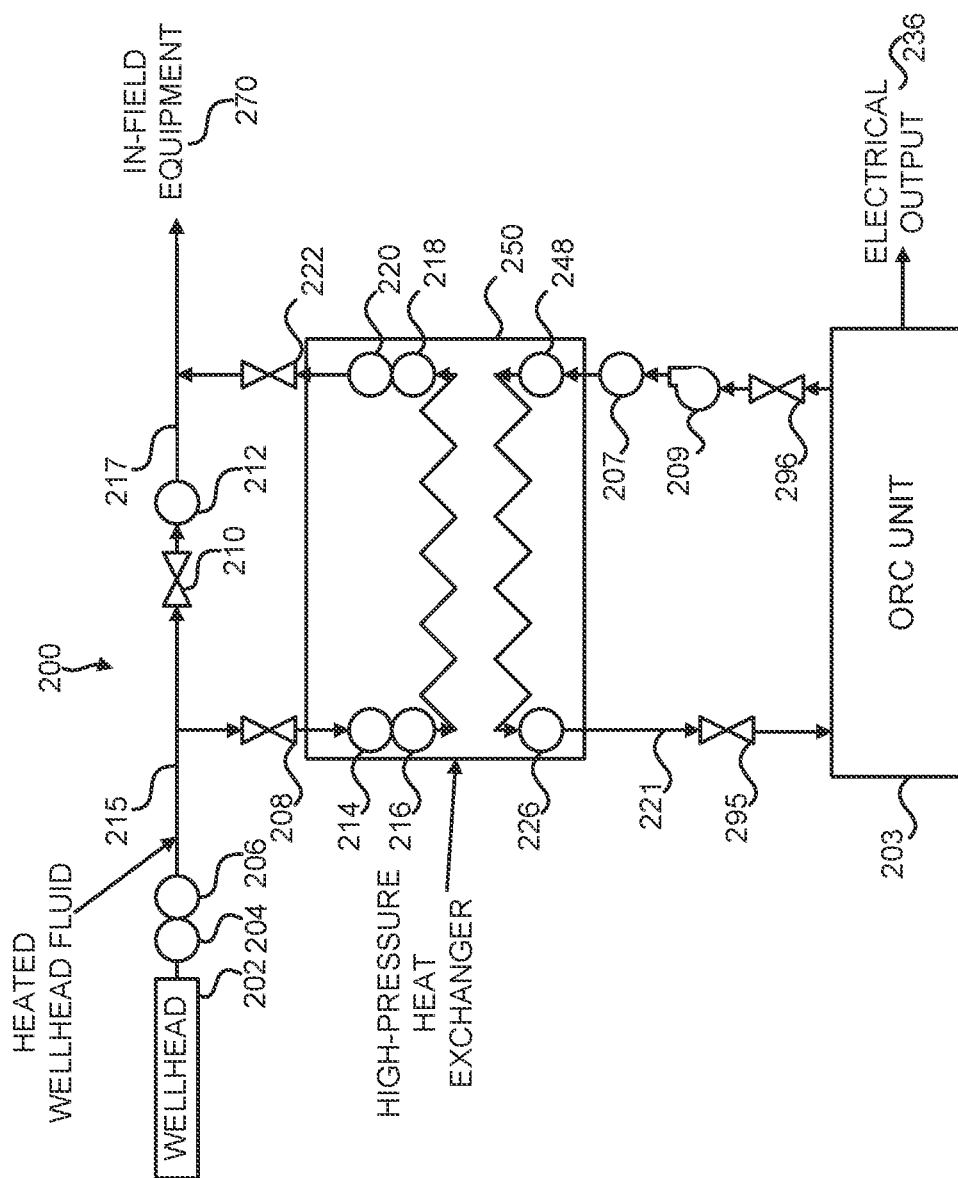
FIG. 2A, FIG. 2B, FIG. 2C, FIG. 2D, FIG. 2E, FIG. 2F, FIG. 2G, and FIG. 2H are block diagrams illustrating novel implementations of a geothermal power generation enabled well to provide electrical power to one or more of in-field equipment, equipment at other wells, energy storage devices, and the grid power structure, according to one or more embodiment of the disclosure.

FIG. 2A, FIG. 2B, FIG. 2C, FIG. 2D, FIG. 2E, FIG. 2F, FIG. 2G, and FIG. 2H are block diagrams illustrating novel implementations of a geothermal power generation enabled well to provide electrical power to one or more of in-field equipment, equipment at other wells, energy storage devices, and the grid power structure, according to one or more embodiment of the disclosure. As illustrated in the FIGS. 2A through 2H, different embodiments may be utilized for geothermal power generation at the surface of a well during hydrocarbon production. As illustrated in FIG. 2A, a well 200 may include a wellhead 202. The wellhead 202 may produce a stream or flow of wellhead fluid. The wellhead fluid may flow from a first pipe 215. The first pipe 215 may include, at various positions along the length of the pipe 215, sensors, meters, transducers, and/or other devices to determine the characteristics of the wellhead fluid flowing through pipe 215. Further, sensors, meters, transducers and/or other devices may be included at various positions within the high-pressure heat exchanger 250 and/or ORC unit 203 to determine the characteristics of the working fluid or ORC fluid flowing through the high-pressure heat exchanger 250 and/or ORC unit 203. Based on the determined characteristics of the wellhead fluid, working fluid, and/or ORC fluid and/or characteristics of other aspects of the well 200, e.g., temperature, pressure, flow, power demand and/or power storage or transmission options and/or other factors, a first heat exchanger valve 208 connected to the first pipe 215 may be opened, e.g., partially opened or fully opened.

Further, when the first heat exchanger valve 208 is opened, a second heat exchanger valve 222 connected to a second pipe 217 may be opened, e.g., partially opened or fully opened. The second heat exchanger valve 222 may allow the flow of wellhead fluid to exit the high-pressure heat exchanger 250. Based on the opening of the first heat exchanger valve 208 and second heat exchanger valve 222, a first wellhead fluid valve 210 may be adjusted. Such adjustment may occur to ensure that the production of the wellhead 202 or the production of wellhead fluid from the wellhead 202 may not be impeded or slowed based on a diversion of the flow of the wellhead fluid to the high-pressure heat exchanger 250. Downstream of the first wellhead fluid valve 210, but prior to where the diverted portion of the flow of wellhead fluid is reintroduced to the primary or bypass wellhead fluid flow, a pressure sensor 212 may be disposed, e.g., the pressure sensor 212 may be disposed along pipe 217. In another example, rather than a pressure sensor 212, a flow meter may be disposed along pipe 217, e.g., a wellhead fluid flow meter and/or a downstream flow meter. The wellhead fluid flow meter may measure the flow rate of a fluid exiting the wellhead 202. A downstream flow meter may measure the flow rate of the wellhead fluid at a point downstream of the first wellhead fluid valve 210. Such a pressure sensor 212 or flow meter may be utilized to determine whether the flow of wellhead fluid is at a pressure or flow that does not impede hydrocarbon production. In an example, where the flow is impeded to a degree that the production of hydrocarbons may be inhibited, the first wellhead fluid valve 210 may be opened further, if the first wellhead fluid valve 210 is not already fully opened. If the first wellhead fluid valve 210 is fully opened, the first heat exchanger valve's 208 and second heat exchanger valve's 222 percent open may be adjusted. Other factors may be taken into account for such determinations, such as the pressure or flow from the high-pressure heat exchanger 250, the pressure or flow at the point of a choke valve located further downstream along the second pipe 217, a pressure rating for downstream equipment, and/or the temperature of the wellhead fluid within the high-pressure heat exchanger 250. Once the flow of wellhead fluid passes through the first wellhead fluid valve 210 and/or the second heat exchanger valve 222, the wellhead fluid may flow to in-field equipment 270 for further processing or transport.

Each of the valves described herein, e.g., first heat exchanger valve 208, second heat exchanger valve 222, first wellhead fluid valve 210, and other valves illustrated in the FIGS. 2B through FIGS. 9G, may be control valves, electrically actuated valves, pneumatic valves, or other valves suitable to receive signals and open and close under, potentially, high pressure. The valves may receive signals from a controller or other source and the signals may cause the valves to move to a partially or fully opened or closed position. The signal may indicate the position that the valve may be adjusted to, e.g., a position halfway open, a position a third of the way open, a position a particular degree open, or completely open, such positions to be understood as non-limiting examples. In such examples, as the valve receives the signal indicative of a position to adjust to, the valve may begin turning to the indicated position. Such an operation may take time, depending on the valve used. To ensure proper operation and prevent damage (e.g., damage to the high-pressure heat exchanger 250, such as when pressure of the wellhead fluid exceeds a pressure rating of the high-pressure heat exchanger 250), the valve may be configured to close in a specified period of time while high-pressure fluid flows therethrough. Such a configuration may be based on a torque value of the valve, e.g., a valve with a higher torque value may close faster than that of a control valve with a lower torque value. Such a specified period of time may be 5 seconds to 10 seconds, 5 seconds to 15 seconds, 5 seconds to 20 seconds, 10 seconds to 15 seconds, 10 seconds to 20 seconds, or 15 seconds to 20 seconds. For example, if a wellhead fluid flow exceeds a pressure of 15,000 PSI, the first heat exchanger valve 208 may close within 5 seconds of the pressure sensor 214 indicating the pressure exceeding 15,000 PSI. In other embodiments, the valves may either fully open or fully close, rather than open to positions in between. In yet other examples, the valves may be manually or physically opened by operators or technicians on-site.

As illustrated in FIG. 2A, pressure sensors 204, 212, 214, 222, 207 and/or temperature sensors 206, 216, 218, 226, 218 may be disposed at various points on or along different pipes, equipment, apparatuses, and/or devices at the well. Each sensor may provide information to adjust and/or control various aspects of the wellhead fluid flow. For example, pressure sensors 204, 212 may provide pressure measurements to determine whether a flow of wellhead fluid is not impeded in relation to hydrocarbon production targets. Pressure sensors 214, 220 may provide measurements to ensure that the flow of wellhead fluid through the high-pressure heat exchanger 250 is sufficient to facilitate heat transfer from the wellhead fluid to a working fluid in a ORC loop 221 and/or that the pressure within the high-pressure heat exchanger 250 does not exceed a pressure rating of the high-pressure heat exchanger 250. In another example, temperature sensor 206 may provide data to control flow of the wellhead fluid. For example, if the flow of wellhead fluid is at a temperature sufficient to cause the working fluid to exhibit a vaporous phase change, then the first heat exchanger valve 208 and second heat exchanger valve 222 may be opened. Further, temperature sensors 216, 218, 226, 248 may provide measurements to ensure that the temperatures within the heat exchanger, of the flow of wellhead fluid, and of the flow of working fluid, are above the thresholds or within a range of thresholds, e.g., above a vaporous phase change threshold. For example, rather than or in addition to using temperature of the wellhead fluid as measured by temperature sensor 206, the temperature of the working fluid as measured by temperature sensor 226 may be utilized to determine whether to maintain an open position of an already open first heat exchanger valve 208. In such examples, the first heat exchanger valve 208 may initially be fully or partially open, e.g., prior to flow of the wellhead fluid.

In another embodiment, in addition to the first heat exchanger valve 208 and second heat exchanger valve 222, the well 200 may include a first ORC unit valve 295 and a second ORC unit valve 296. Such ORC unit valves 295, 296 may be utilized to control flow of working fluid flowing into the ORC unit 203. Further the ORC unit valves 295, 296 may be utilized when more than one high-pressure heat exchanger 250 corresponding to one or more wellheads are connected to the ORC unit 203. The ORC unit valves 295, 296 may be utilized to optimize or to enable the ORC unit 203 to meet a preselected electrical power output threshold via the flow of working fluid from one or more high-pressure heat exchangers into the ORC unit 203, as will be understood by a person skilled in the art. The flow of working fluid may be adjusted to ensure that the ORC unit 203 produces an amount of electrical power greater than or equal to a preselected electrical power output threshold, based on various factors or operating conditions (e.g., temperature of wellhead fluid flow, temperature of working fluid flow, electrical output 236 of the ORC unit 203, electrical rating of the ORC unit 203, flow and/or pressure of the wellhead fluid, and/or flow and/or pressure of the working fluid). In some examples, the ORC unit valves 295, 296 may initially be fully open or at least partially open and as various factors or operating conditions are determined, then the ORC unit valves 295, 296 for one or more heat exchangers may be adjusted to enable the ORC unit 203 to meet a preselected electrical power output threshold, as will be understood by a person skilled in the art. The preselected electrical power output threshold may be set by a user or may be a predefined value generated by a controller (e.g., controller 272) based on various factors. The various factors may include an ORC unit electrical power rating or output rating or maximum potential temperature of the wellhead fluid and/or working fluid.

As shown, several pairs of sensors may be located adjacent to one another. In other examples, those positions, for example, the pressure sensor's 204 and the temperature sensor's 206 location, may be reversed. In yet another example, each one of the sensors may provide measurements for multiple aspects of the wellhead fluid, e.g., one sensor to provide a combination of flow, pressure, temperature, composition (e.g., amount of components in the wellhead fluid, such as water, hydrocarbons, other chemicals, proppant, etc.), density, or other aspect of the wellhead fluid or working fluid. Each sensor described above may be integrated in or within the pipes or conduits of each device or component, clamped on or over pipes or conduits, and or disposed in other ways, as will be understood by those skilled in the art. Further, the determinations, adjustments, and/or other operations described above may occur or may be performed by or in a controller.

As noted, a high-pressure heat exchanger 250 may be disposed, placed, or installed at a well. The high-pressure heat exchanger 250 may be disposed nearby or at a distance from the wellhead 202. The high-pressure heat exchanger 250 may be a modular and/or mobile apparatus. In such examples, the high-pressure heat exchanger 250 may be brought or moved to a well or site (e.g., via a vehicle, such as a truck), placed at the well or site during hydrocarbon production, and then moved to another well or site at the end of hydrocarbon production. The high-pressure heat exchanger 250 may be disposed on a skid, a trailer, a flatbed truck, inside a geothermal generator unit, or inside an ORC unit 203. Once brought to a well or site, the high-pressure heat exchanger 250 may be secured to the surface at the well. The high-pressure heat exchanger 250 may be configured to withstand pressures in excess of about 5,000 PSI, about 10,000 PSI, about 15,000 PSI, and/or greater. In an example, the high-pressure heat exchanger 250 may be a high-pressure shell and tube heat exchanger, a spiral plate or coil heat exchanger, a heliflow heat exchanger, or other heat exchanger configured to withstand high pressures. In another example, portions of the high-pressure heat exchanger 250 may be configured to withstand high-pressures. For example, if a shell and tube heat exchanger is utilized, the shell and/or tubes may be configured to withstand high-pressures.

In another embodiment, at least one fluidic path of the high-pressure heat exchanger 250 may be coated or otherwise configured to reduce or prevent corrosion. In such examples, a wellhead fluid may be corrosive. To prevent damage to the high-pressure heat exchanger 250 over a period of time, the fluid path for the wellhead fluid may be configured to withstand such corrosion by including a permanent, semi-permanent, or temporary anti-corrosive coating, an injection point for anti-corrosive chemical additive injections, and/or some combination thereof. Further, at least one fluid path of the high-pressure heat exchanger 250 may be comprised of an anti-corrosive material, e.g., anti-corrosive metals or polymers. As noted, the wellhead fluid may flow into the high-pressure heat exchanger 250 at a high pressure. As the high-pressure heat exchanger 250 may operate at high pressure, the high-pressure heat exchange may include pressure relief valves to prevent failures if pressure within the high-pressure heat exchanger 250 were to exceed the pressure rating of the high-pressure heat exchanger 250. Over time, wellhead fluid flowing through the high-pressure heat exchanger 250 may cause a buildup of deposits or scaling. To prevent scaling and/or other related issues, the high-pressure heat exchanger 250 may be injected with scaling inhibitors or other chemicals or may include vibration or radio frequency induction devices.

Once the high-pressure heat exchanger 250 facilitates heat transfer from the wellhead fluid to the working fluid, the working fluid may partially, substantially, or completely change phases from a liquid to a vapor, vaporous state, gas, or gaseous state. The vapor or gas may flow to the ORC unit 203 causing an expander to rotate. The rotation may cause a generator to generate electricity, as will be further described and as will be understood by those skilled in the art. The generated electricity may be provided as an electrical output 236. The electricity generated may be provided to in-field equipment, energy storage devices, equipment at other wells, or to a grid power structure. The working fluid in the high-pressure heat exchanger may be a working fluid to carry heat. Further, the working fluid of the high-pressure heat exchanger 250 may or may not exhibit a vaporous phase change. The working fluid may carry heat to another heat exchanger 205 of the ORC unit 203. As such, heat may be transferred from the wellhead fluid to the working fluid of the high-pressure heat exchanger 250 and heat may be transferred from the working fluid of the high-pressure heat exchanger 250 to the working fluid of the ORC unit 203.

In an example, the working fluid may be a fluid with a low boiling point and/or high condensation point. In other words, a working fluid may boil at lower than typical temperatures, while condensing at higher than typical temperatures. The working fluid may be an organic working fluid. The working fluid may be one or more of pentafluoropropane, carbon dioxide, ammonia and water mixtures, tetrafluoroethane, isobutene, propane, pentane, perfluorocarbons, other hydrocarbons, a zeotropic mixture of pentafluoropentane and cyclopentane, other zeotropic mixtures, and/or other fluids or fluid mixtures. The working fluid's boiling point and condensation point may be different depending on the pressure within the ORC loop 221, e.g., the higher the pressure, the higher the boiling point.

Figure 2B:
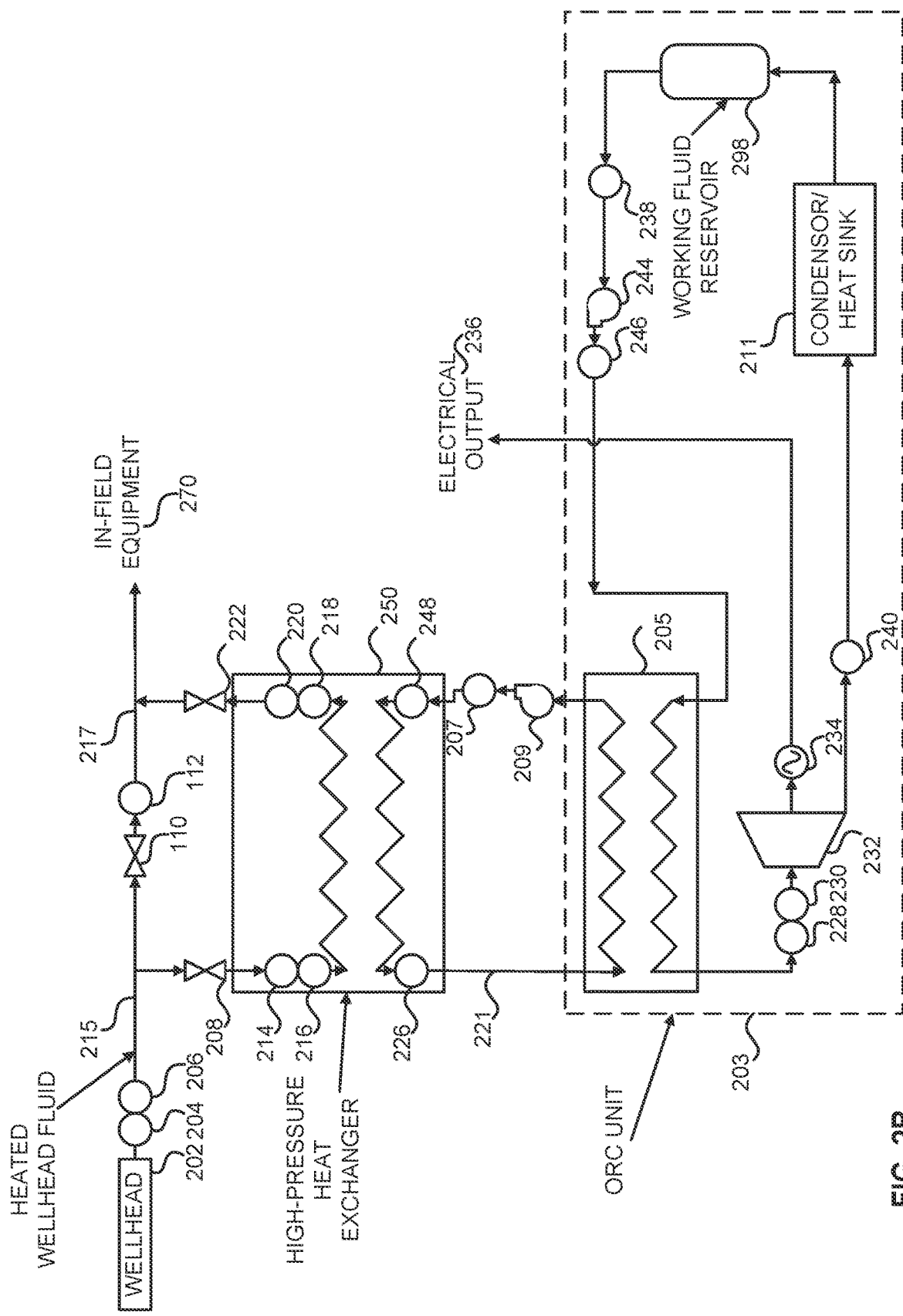

FIG. 2B illustrates an embodiment of the internal components of an ORC unit 203. FIG. 2B further illustrates several of the same components, equipment, or devices as FIG. 2A illustrates. As such, the numbers used to label FIG. 2B may be the same as those used in 2A, as those number correspond to the same component. The ORC unit 203 as noted may be a modular or mobile unit. As power demand increases, additional ORC units 203 may be added, installed, disposed, or placed at the well. The ORC units 203 may stack, connect, or integrate with each other ORC unit. In an example, the ORC unit 203 may be a modular single-pass ORC unit.

An ORC unit 203 may include a heat exchanger 205 or heater. Connections to the heat exchanger 205 or heater may pass through the exterior of the ORC unit 203. Thus, as an ORC unit 203 is brought or shipped to a well or other location, a user, technician, service person, or other person may connect pipes or hoses from a working fluid heat source (e.g., the high-pressure heat exchanger 250) to the connections on the ORC unit 203, allowing a heat source to facilitate phase change of a second working fluid in the ORC unit 203. In such examples, the working fluid flowing through ORC loop 221 may include water or other organic fluid exhibiting a higher vaporous phase change threshold than the working fluid of the ORC unit 203, to ensure proper heat transfer in heat exchanger 205. Further, the heat exchanger 205 may not be a high-pressure heat exchanger. In such examples, the high-pressure heat exchanger 250 allows for utilization of waste heat from high-pressure wellhead fluids. In another embodiment and as will be described, a high-pressure heat exchanger 250 may be included in the ORC unit 203.

Figure 2C:
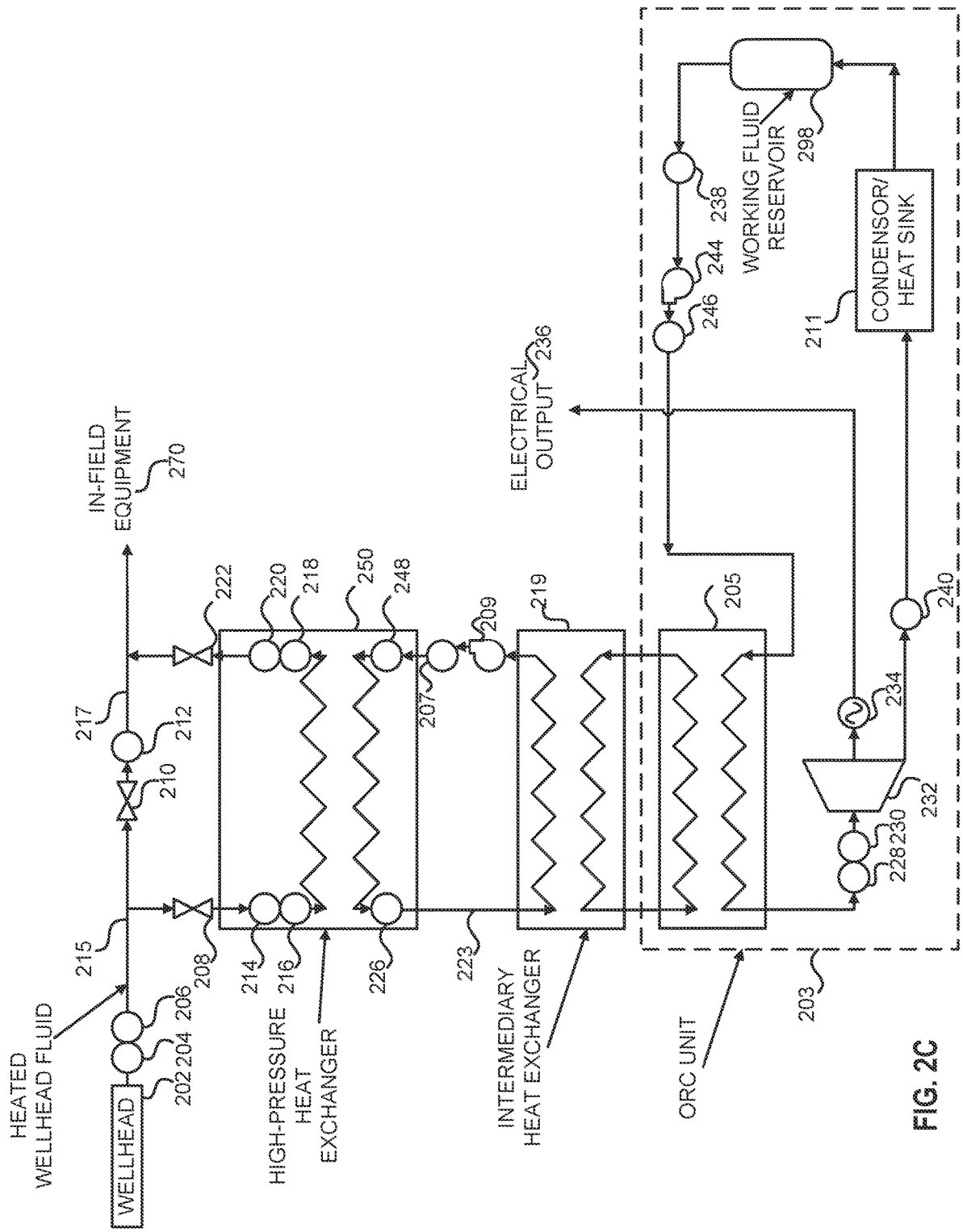

In yet another embodiment, the high-pressure heat exchanger 250 may be considered an intermediary heat exchanger or another intermediary heat exchanger (e.g., intermediary heat exchanger 219) may be disposed between the high-pressure heat exchanger 250 and the ORC unit 203 (as illustrated in FIG. 2C and described below). The working fluid flowing through the high-pressure heat exchanger 250 may be sufficient to heat another working fluid of the ORC unit 203. The working fluid of such an intermediary heat exchanger may not physically flow through any of the equipment in the ORC unit 203, except for heat exchanger 205, thereby transferring heat from the working fluid in ORC loop 221 to an ORC working fluid in a loop defined by the fluid path through the heat exchanger 205, condenser 211, expander 232, working fluid reservoir 298, and/or pump 244.

The ORC unit 203 may further include pressure sensors 228, 238, 246 and temperature sensors 230, 240 to determine whether sufficient, efficient, and/or optimal heat transfer is occurring in the heat exchanger 205. A sensor or meter may further monitor electrical power produced via the expander 232 and generator 234. Further, the ORC unit 203 may include a condenser or heat sink 211 to transfer heat from the second working fluid or working fluid of the ORC unit 203. In other words, the condenser or heat sink 211 may cool the second working fluid or working fluid of the ORC unit 203 causing the second working fluid or working fluid of the ORC unit 203 to condense or change phases from vapor to liquid. The ORC unit 203 may also include a working fluid reservoir 298 to store an amount of working fluid, e.g., in a liquid state, to ensure continuous operation of the ORC unit 203. The liquid state working fluid, whether from the working fluid reservoir 298 or directly form the condenser/heat sink 211, may be pumped, via pump 244, back to the heat exchanger 205. Further, the pressure prior to and after pumping, e.g., as measured by the pressure sensors 238, 246, may be monitored to ensure that the working fluid remains at a ORC unit or working fluid loop pressure rating.

As illustrated in FIG. 2C, the well may include an intermediary heat exchanger 219. In such examples, an ORC unit 203 may not be configured for high-pressure heat exchange. As such, an intermediary heat exchanger 219 may be disposed nearby the high-pressure heat exchanger 250, nearby the ORC unit 203, or disposed at some other point in between to alleviate such issues. The intermediary heat exchanger 219 may include a working fluid, also referred to as an intermediary or intermediate working fluid, to flow through the intermediary loop 223. The intermediary fluid may include water, a water and glycol mixture, or other organic fluid exhibiting a higher vaporous phase change threshold than the working fluid of the ORC unit 203. In an embodiment, the intermediary heat exchanger 219 may include sensors, meters, transducers and/or other devices at various positions throughout to determine characteristic of fluids flowing therein, similar to that of the high-pressure heat exchanger 250.

Figure 2D:
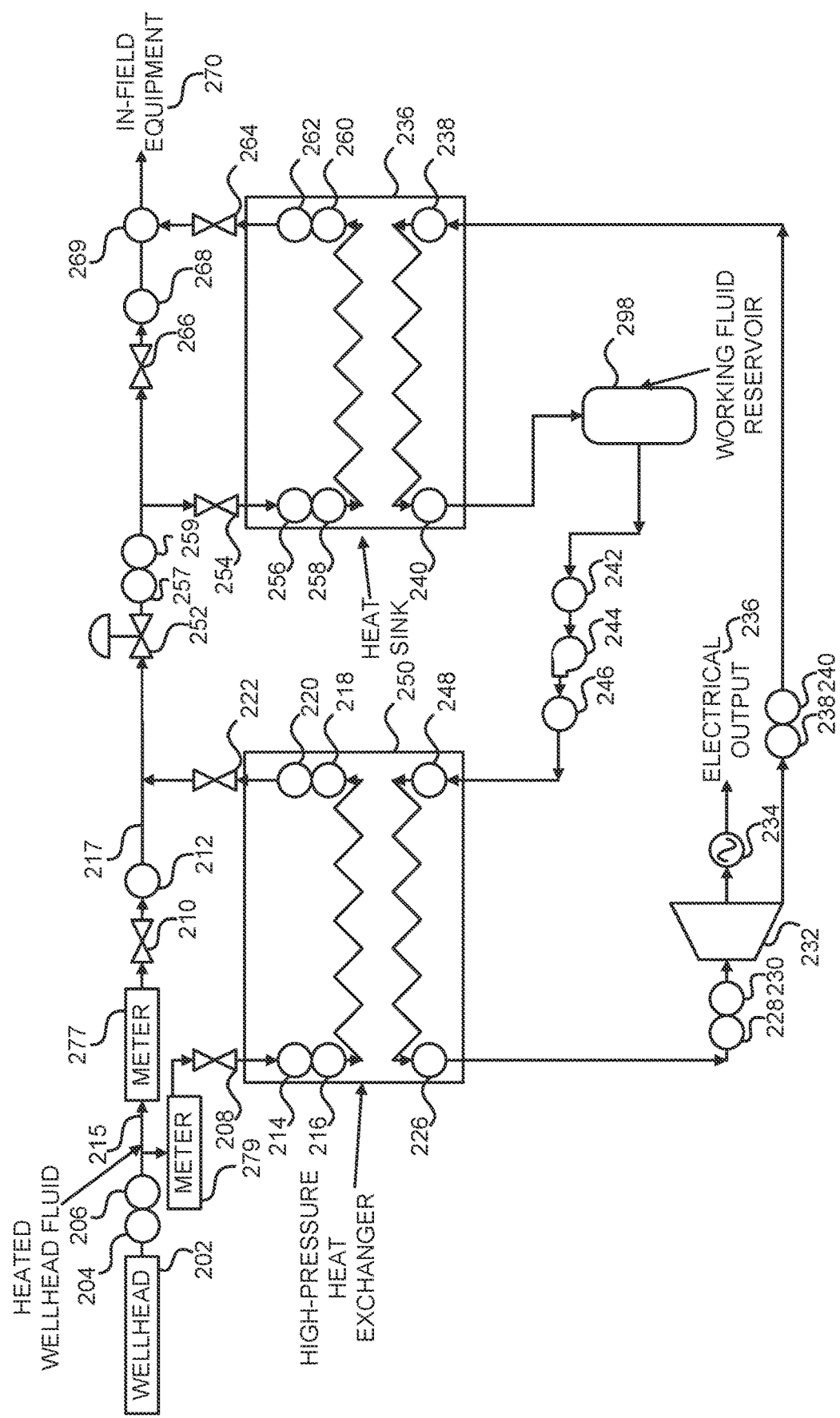

As illustrated in FIG. 2D, rather than utilizing an ORC unit 203 that may not withstand high pressure, a high-pressure ORC unit or an ORC unit with integrated high-pressure heat exchanger 250 may be utilized for geothermal power generation. In such examples, the components, equipment, and devices may be similar to those described above. In another example, such a system, as illustrated in FIG. 2D, may include a heat sink 236 utilizing a cooled flow of wellhead fluid to cool the flow of working fluid. In such examples, as the flow of wellhead fluid passes through a choke valve 252, the pressure of the flow of wellhead fluid may be reduced, e.g., for example, from about 15,000 PSI to about 1,500 PSI, from about 15,000 PSI to about 200 PSI, from about 15,000 PSI to about 100 PSI, about 15,000 PSI to about 50 PSI or lower, from about 10,000 PSI to about 200 PSI or lower, from about 5,000 PSI to about 200 PSI or lower, or from 15,000 PSI to lower than 200 PSI. In such examples, the temperature from a point prior to the choke valve 252 and after the choke valve 252, e.g., a temperature differential, may be about 100 degrees Celsius, about 75 degrees Celsius, about 50 degrees Celsius, about 40 degrees Celsius, about 30 degrees Celsius, and lower. For example, the temperature of the wellhead fluid prior to the choke valve 252 may be about 50 degrees and higher, while, after passing through the choke valve 252, the temperature, as measured by the temperature sensor 259, may be about 30 degrees Celsius, about 25 degrees Celsius, about 20 degrees Celsius, to about 0 degrees Celsius.

The system may include, as noted, a temperature sensor 259 and pressure sensor 257 to determine the temperature of the wellhead fluid after the choke valve 252. The system may include temperature sensor 240 to determine the temperature of the working fluid or ORC fluid exiting the heat sink 236 and temperature sensor 238 to determine the temperature of the working fluid or ORC fluid entering the heat sink 236. The pressure and/or temperature of the wellhead fluid may be used to determine whether the heat sink 236 may be utilized based on pressure rating of the heat sink 236 and/or a liquid phase change threshold of the working fluid. In other words, if the flow of wellhead fluid is at a temperature sufficient to cool the working fluid and/or below a pressure rating of the heat sink 236, the heat sink valve 254 may open to allow wellhead fluid to flow through the heat sink 236 to facilitate cooling of the working fluid. In another embodiment, the heat sink valve 254 may initially be fully or partially open. The temperature of the working fluid or ORC fluid may be measured as the fluid enters the heat sink 236 and exits the heat sink 236. If the temperature differential indicates that there is no change or an increase in temperature, based on the temperature of the working fluid or ORC fluid entering the heat sink 236 and then leaving the heat sink 236, then the heat sink valve 254 may be closed. Temperature sensors 238, 240, 256, 262, and pressure sensors 258, 260 may be disposed within the heat sink 236 to ensure that the temperature of the wellhead fluid is suitable for cooling the working fluid and that the pressure of wellhead fluid does not exceed the pressure rating of the heat sink 236.

FIG. 2D also illustrates two flow meters 277, 279 disposed prior to the first wellhead fluid valve 210 and first heat exchanger valve 208. Such flow meters may measure the flow of the wellhead fluid at the point where the meter is disposed. Utilizing flow measurements may allow for fine-tuning or adjustment of the open percentage or position of the valves included in the system. Such fine-tuning or adjustment may ensure that the production of hydrocarbons at the well is not impeded by the use of the high-pressure heat exchanger. Other flow meters may be disposed at various other points of the system, e.g., after the first wellhead fluid valve 210, prior to or after the choke valve 252, at a point after the heat sink 236, and/or at various other points in the system. As stated, these flow meter may be utilized to ensure proper flow wellhead fluid throughout the system. In an example, the sensors and/or meters disposed throughout the system may be temperature sensors, densitometers, density measuring sensors, pressure transducers, pressure sensors, flow meters, mass flow meters, Coriolis meters, spectrometer, other measurement sensors to determine a temperature, pressure, flow, composition, density, or other variable as will be understood by those skilled in the art, or some combination thereof. Further, the sensors and/or meters may be in fluid communication with a liquid to measure the temperature, pressure, or flow or may indirectly measure flow (e.g., an ultrasonic sensor). In other words, the sensors or meters may be a clamp-on device to measure flow indirectly (such as via ultrasound passed through the pipe to the liquid).

Figure 2E:
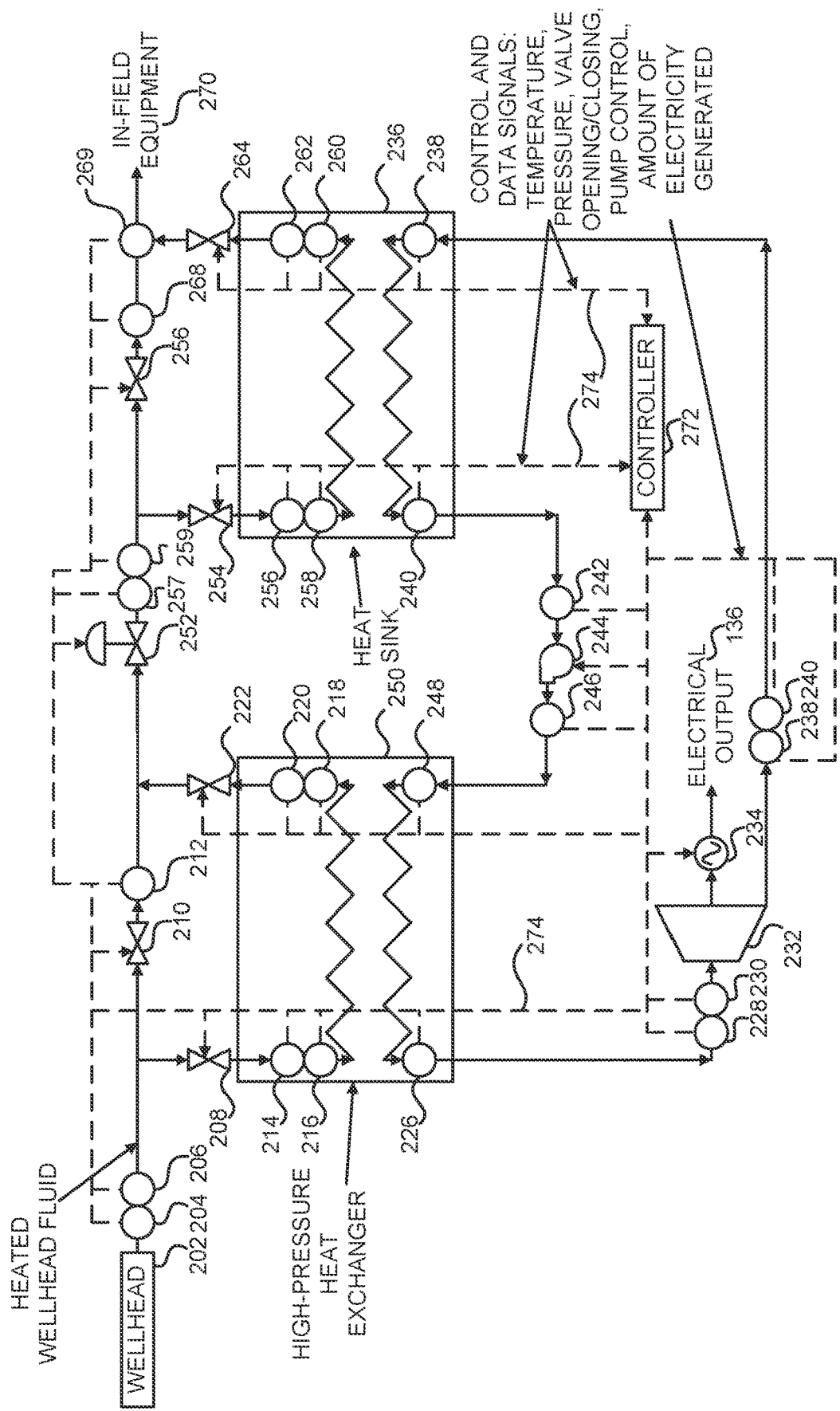

As illustrated in FIG. 2E, a controller 272 may be included at the well. The controller 272 may be utilized in any of the previous or following drawings. The controller 272 may include one or more controllers, a supervisory controller, and/or a master controller. The controller 272 may connect to all the equipment and devices shown, including additional equipment and devices not shown, and may transmit control signals, receive or request data or measurements, control pumps, monitor electricity generated, among other things (see 274). The controller 272 may, in another example, control a subset of the components shown. In another example, a controller may be included in an ORC unit (see 203 in FIGS. 2A through 2C). The controller 272 may connect to and control the controller in the ORC unit 203. The controller 272 may transmit signals to the various control valves to open and close the valves by determined amounts or percentages or fully open or close the valves. The controller 272 may further determine, via a meter or other device or sensor, an amount of electrical power generated or being generated by the generator 234 or ORC unit 203.

Figure 2F:
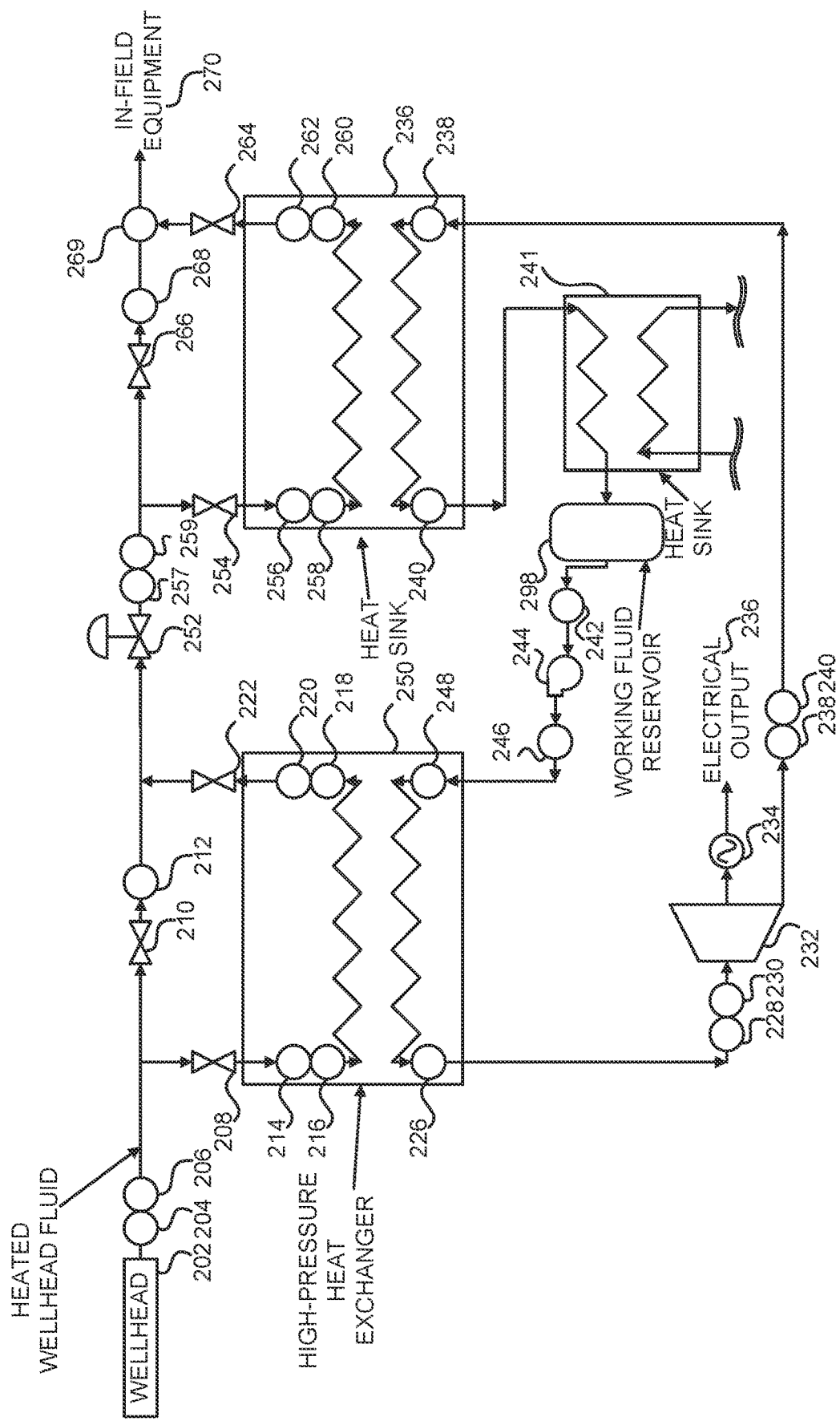
Figure 2G:
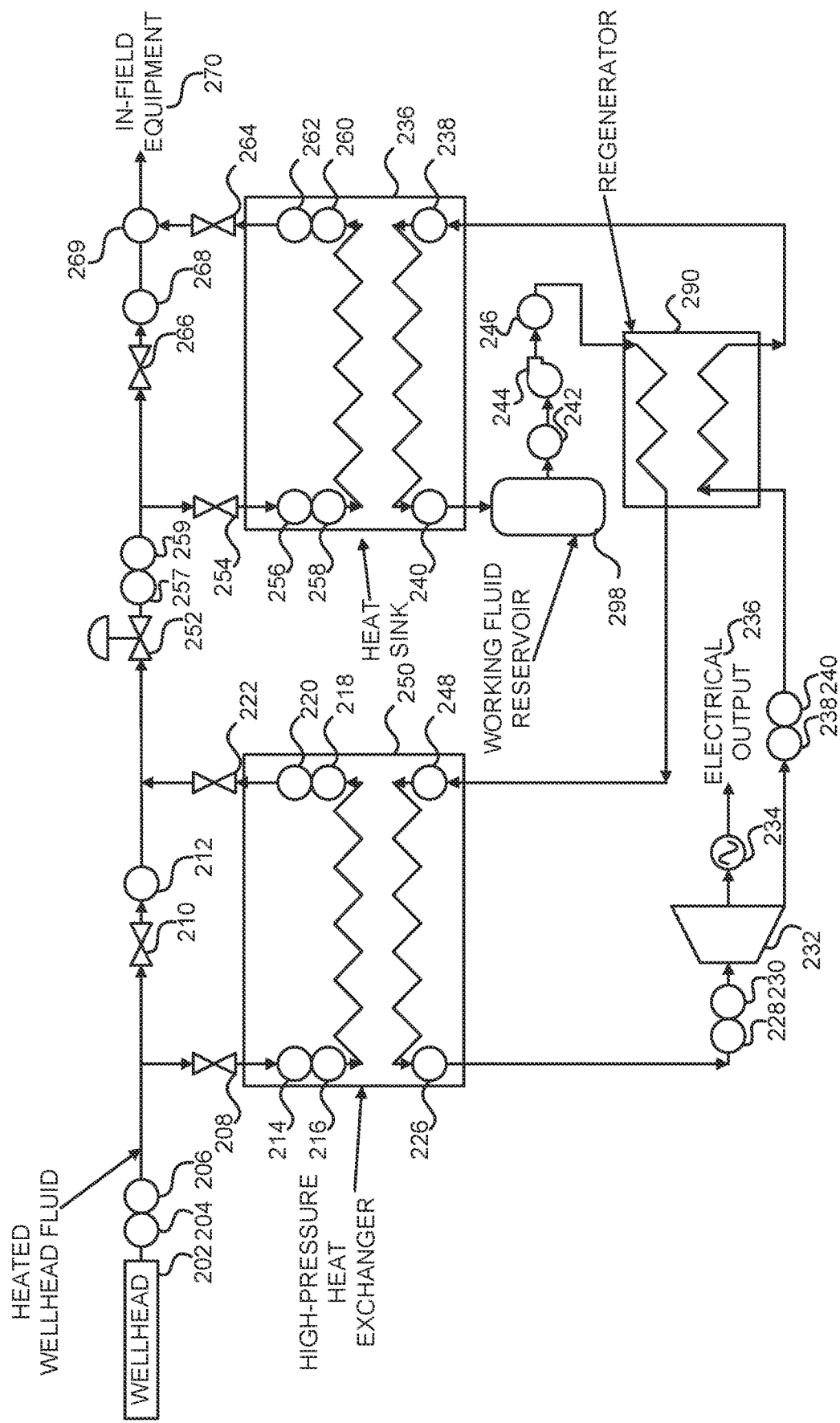

As illustrated in FIG. 2F, the system may include another heat sink 241, in the case that the cooling offered by the flow of wellhead fluid in heat sink 236 is not sufficient. In an example, the heat sink 241 may be a fin fan cooler, a heat exchanger, a condenser, any other type of heat sink, a sing-pass parallel flow heat exchanger, a 2-pass crossflow heat exchanger, a 2-pass countercurrent heat exchanger, or other type of apparatus. As illustrated in FIG. 2G, the system may include a regenerator 290. In such examples, the working fluid may flow through a first fluid path of the regenerator 290. After the working fluid is cooled by a primary heat sink (e.g., heat sink 236), the working fluid may flow back through another fluid path of the regenerator 290. As such, the heat from the first fluid path may pre-heat the working fluid, while the second fluid path may offer some level of cooling to the working fluid.

Figure 2H:
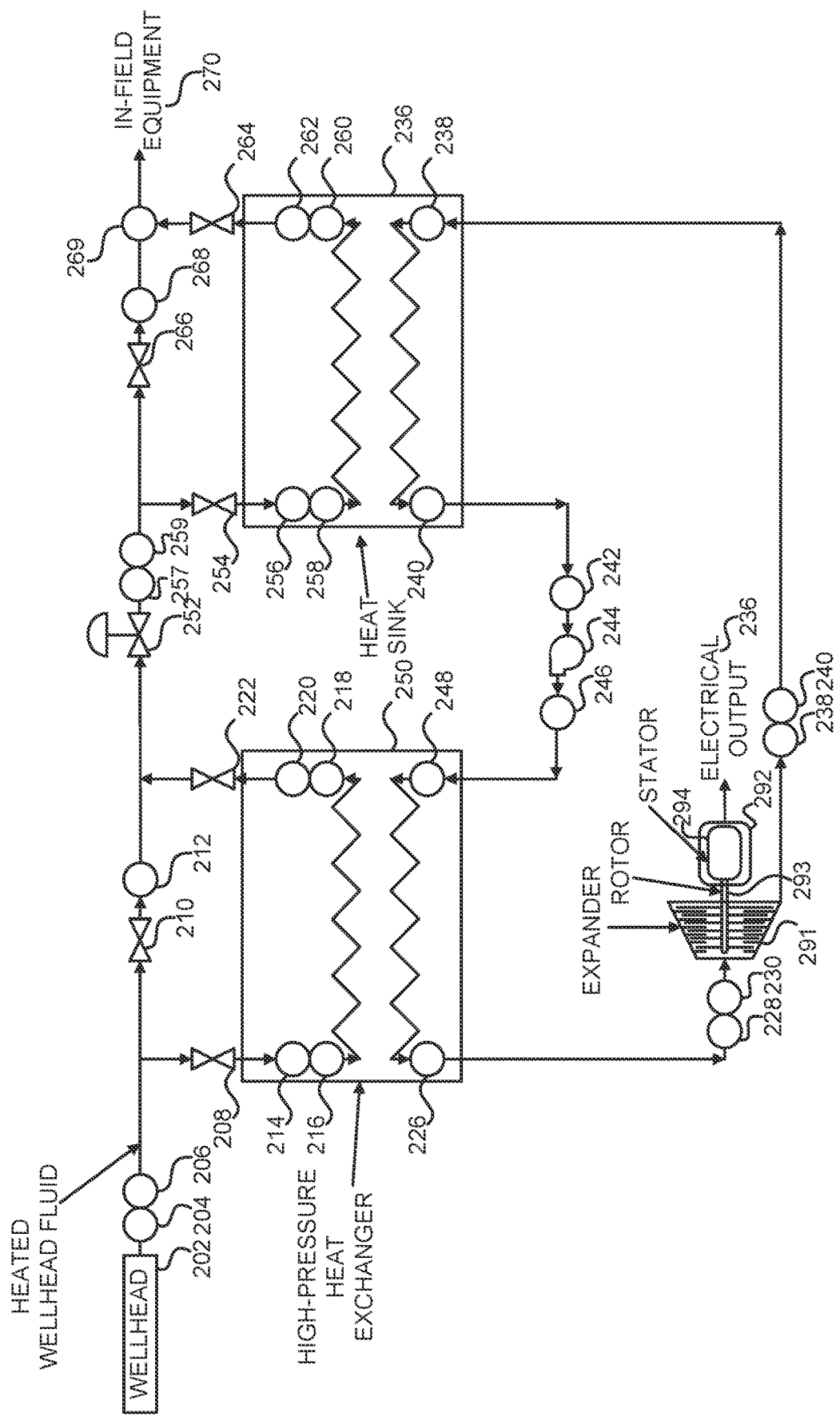

As illustrated in FIG. 2H, the system may include a gas expander 291. In an example, the gas expander 291 may be a turbine expander, positive displacement expander, scroll expander, screw expander, twin-screw expander, vane expander, piston expander, other volumetric expander, and/or any other expander suitable for an ORC operation or cycle. For example and as illustrated, the gas expander 291 may be a turbine expander. As gas flows through the turbine expander, a rotor 293 connected to the turbine expander may begin to turn, spin, or rotate. The rotor 293 may include an end with windings. The end with windings may correspond to a stator 294 including windings and a magnetic field. As the rotor 293 spins within the stator 294, electricity may be generated. Other generators may be utilized, as will be understood by those skilled in the art. The generator 293 may produce DC power, AC power, single phase power, or three phase power.

In an embodiment, rather than or in addition to utilizing a wellhead fluid from the wellhead 202 at a well 200, the high-pressure heat exchanger 250 and/or the ORC unit 203 may be utilized with another heated fluid from another source at another site or facility. The site or facility may include any site or facility producing a heated fluid that is cooled prior to further use or processing.

Figure 3A:
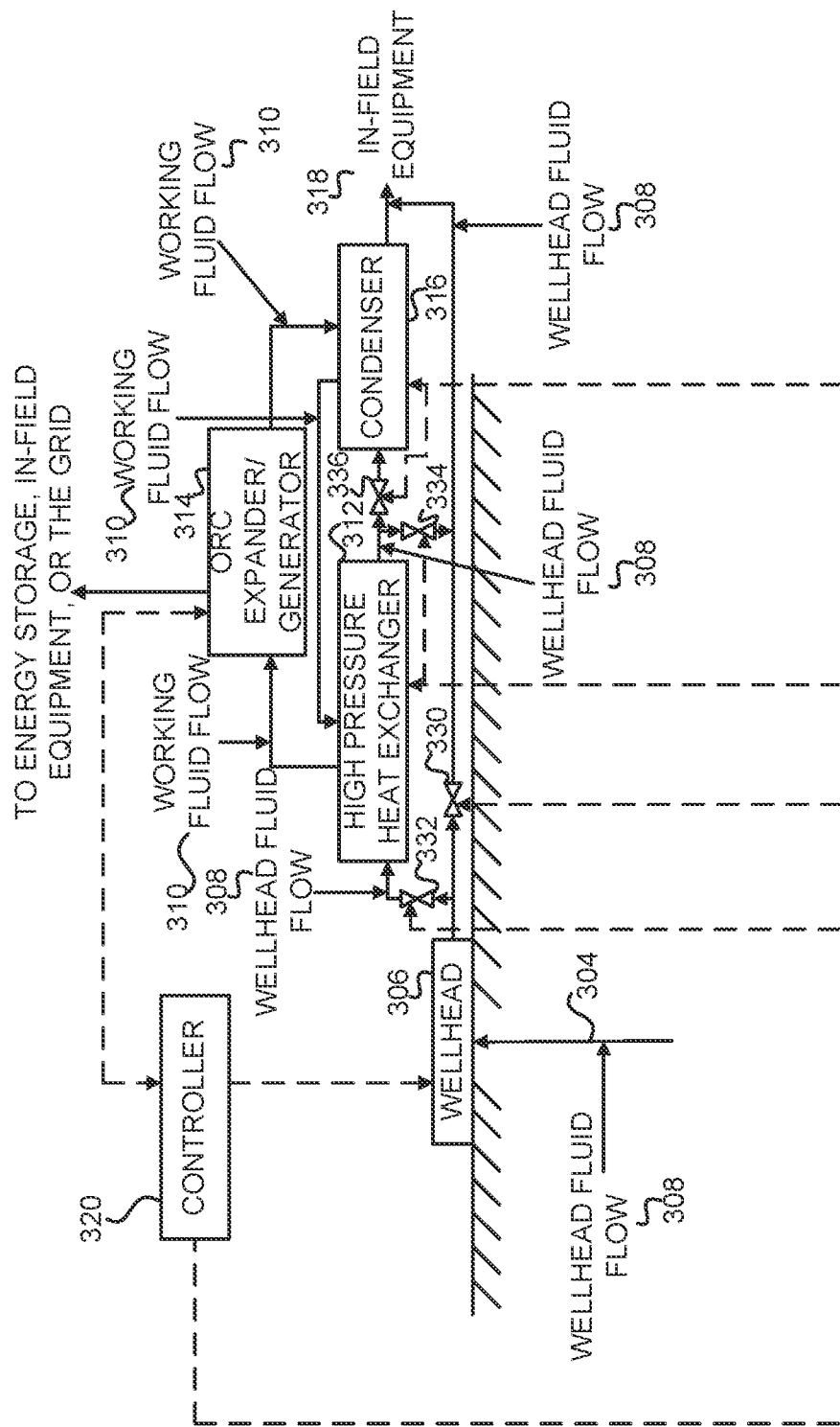
FIG. 3A and FIG. 3B are block diagrams illustrating other novel implementations of a geothermal power generation enabled well to provide electrical power to one or more of in-field equipment, equipment at other wells, energy storage devices, and the grid power structure, according to one or more embodiment of the disclosure.
Figure 3B:
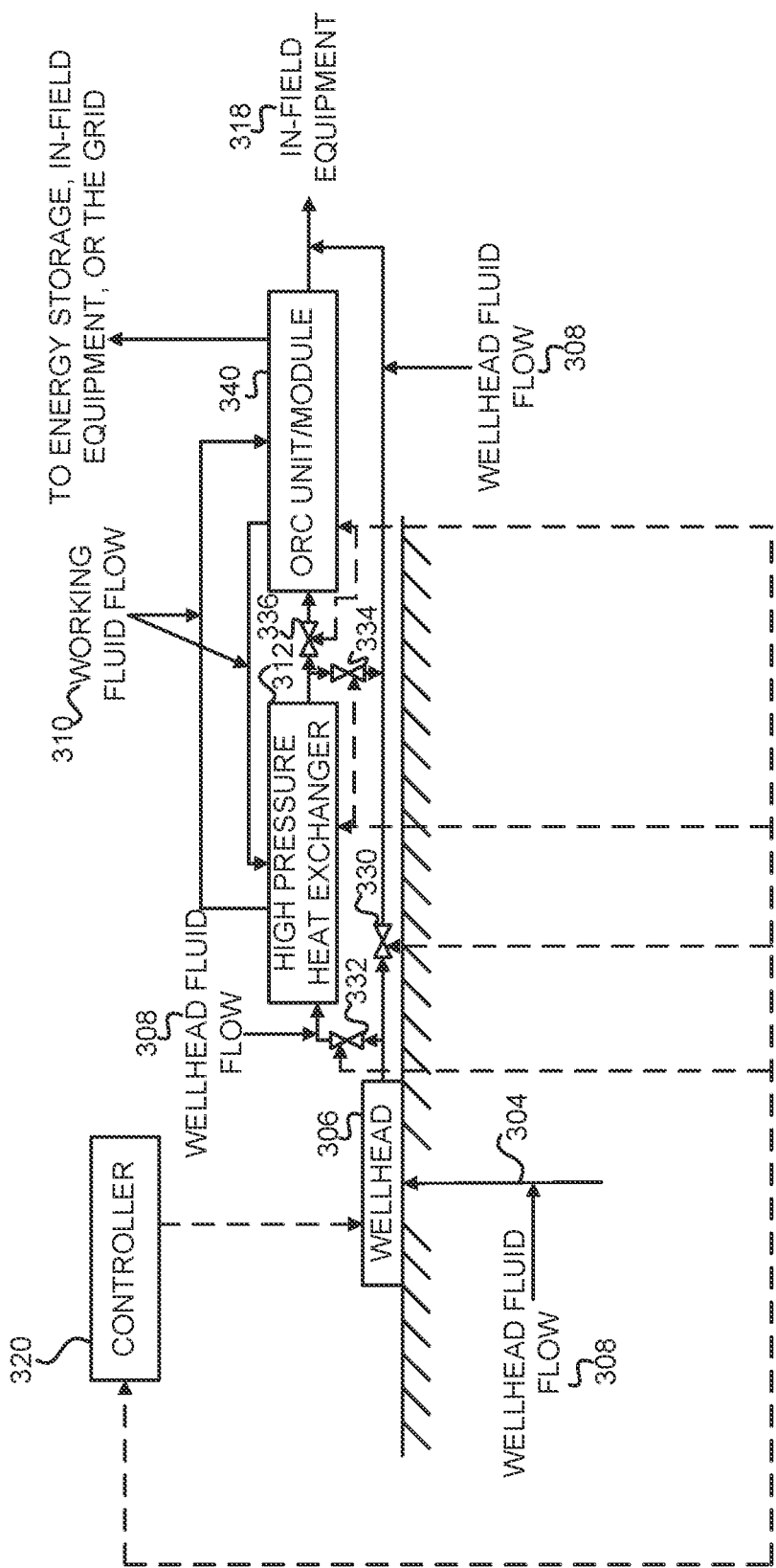

FIG. 3A and FIG. 3B are block diagrams illustrating other novel implementations of a geothermal power generation enabled well to provide electrical power to one or more of in-field equipment, equipment at other wells, energy storage devices, and the grid power structure, according to one or more embodiment of the disclosure. FIGS. 3A and 3B may represent a side-view perspective block diagram of a well and the components at the well. In an example, wellhead fluid may flow from underground 304. The wellhead fluid flow 308 may include hydrocarbons or a mixture of hydrocarbons and other fluids, e.g., water, chemicals, fluids leftover from fracturing operations, other residuals, and/or other fluids as will be understood by those skilled in the art. The wellhead fluid may flow from a wellbore. In another embodiment, another heated fluid may be utilized at another facility or site. While a wellhead fluid is used in relation to the description of FIGS. 3A and 3B, it will be understood by a person skilled in the art that other heated and/or high pressure fluids may be utilized in relation to the equipment and devices described in FIGS. 3A and 3B.

As the wellhead fluid flows from the wellhead 306, the wellhead fluid may flow to the high-pressure heat exchanger, through a bypass pipe, and/or a combination thereof based on various factors or characteristics, e.g., wellhead fluid temperature and/or pressure and/or working fluid temperature. For example, if the wellhead fluid flow 308 is above a vaporous phase change threshold for a working fluid flow 310, then valve 332 may open, at least partially, to allow the wellhead fluid flow to the high pressure heat exchanger 312.

In such examples, the wellhead fluid may continue to flow through the primary or bypass wellhead fluid pipe. As such, valve 330 may remain open, whether completely or at a certain percentage. From the high-pressure heat exchanger 312, the wellhead fluid may flow back to the primary or bypass wellhead fluid pipe, to a condenser 316 or other cooling apparatus, and/or a combination thereof. If the wellhead fluid is at a temperature to provide cooling to the working fluid flow 310, then valve 336 may open to allow wellhead fluid to flow therethrough. In such examples, the valve 334 may close to prevent wellhead fluid from flowing back. If the wellhead fluid is not at a temperature to allow for cooling of the working fluid flow 310, then valve 336 may close or remained closed and valve 334 may open or remain open. From the condenser 316 or the primary or bypass wellhead fluid pipe, the wellhead fluid may flow to in-field equipment 316, storage tanks, and/or other processing equipment at the well. The valves described above may be controlled via controller 320.

In another embodiment, rather than basing the opening and closing of valve 332 and/or valve 336 on wellhead fluid flow 308 temperature, the valve 332 and/or valve 336 may be opened or closed based on the temperature of the working fluid flow 310. For example, prior to activating the wellhead 306 (e.g., allowing wellhead fluid to flow or pumping wellhead fluid from the wellhead 306), valve 332 may be open, fully or partially. As the wellhead fluid flows through the high-pressure heat exchanger 312, the temperature of the working fluid flow 310 may be measured. Based on the working fluid flow 310 temperature, taken at continuously or at periodic intervals, and after a specified period of time, if the working fluid flow 310 does not reach a vaporous phase change temperature, then valve 332 may be closed. Further, such operations may be performed in conjunction with measuring wellhead fluid flow 308 and opening or closing valve 332 based on such measurements.

The wellhead fluid flowing through the high-pressure heat exchanger 312 may be at a temperature to facilitate heat transfer to a working fluid flow 310. The working fluid may further flow, as a vaporous state working fluid flow to an ORC expander/generator 314. The vaporous state working fluid may cause the ORC expander/generator 314 to generate electrical power to be utilized at equipment at the well (e.g., in-field equipment), energy storage device, or a grid power structure (via a transformer and power lines). The working fluid may then flow to a condenser 316 or other cooling apparatus. The condenser 316 or other cooling apparatus may facilitate cooling of the working fluid flow 310 via the wellhead fluid flow, air, another liquid, and/or other types of heat sinks or heat exchangers. The liquid state working fluid may then flow back to the high-pressure heat exchanger 312.

In another embodiment, the high-pressure heat exchanger 312 may connect to an ORC unit/module 340 or one or more ORC units or modules. The number of ORC units/modules may scale based on power to be utilized by in-field equipment, the amount or potential capacity of electricity generation at the well, and/or other factors. After production of hydrocarbons begins, additional ORC units/modules may be added at the well or existing ORC units/modules may be removed from the well.

FIG. 4A, FIG. 4B, FIG. 4C, FIG. 4D, and FIG. 4E are block diagrams illustrating novel implementations of an organic Rankin cycle (ORC) unit receiving warm and/or hot fluid from one or more heat exchangers via a supply manifold and a return manifold, according to one or more embodiments of the disclosure.

Figure 4A:
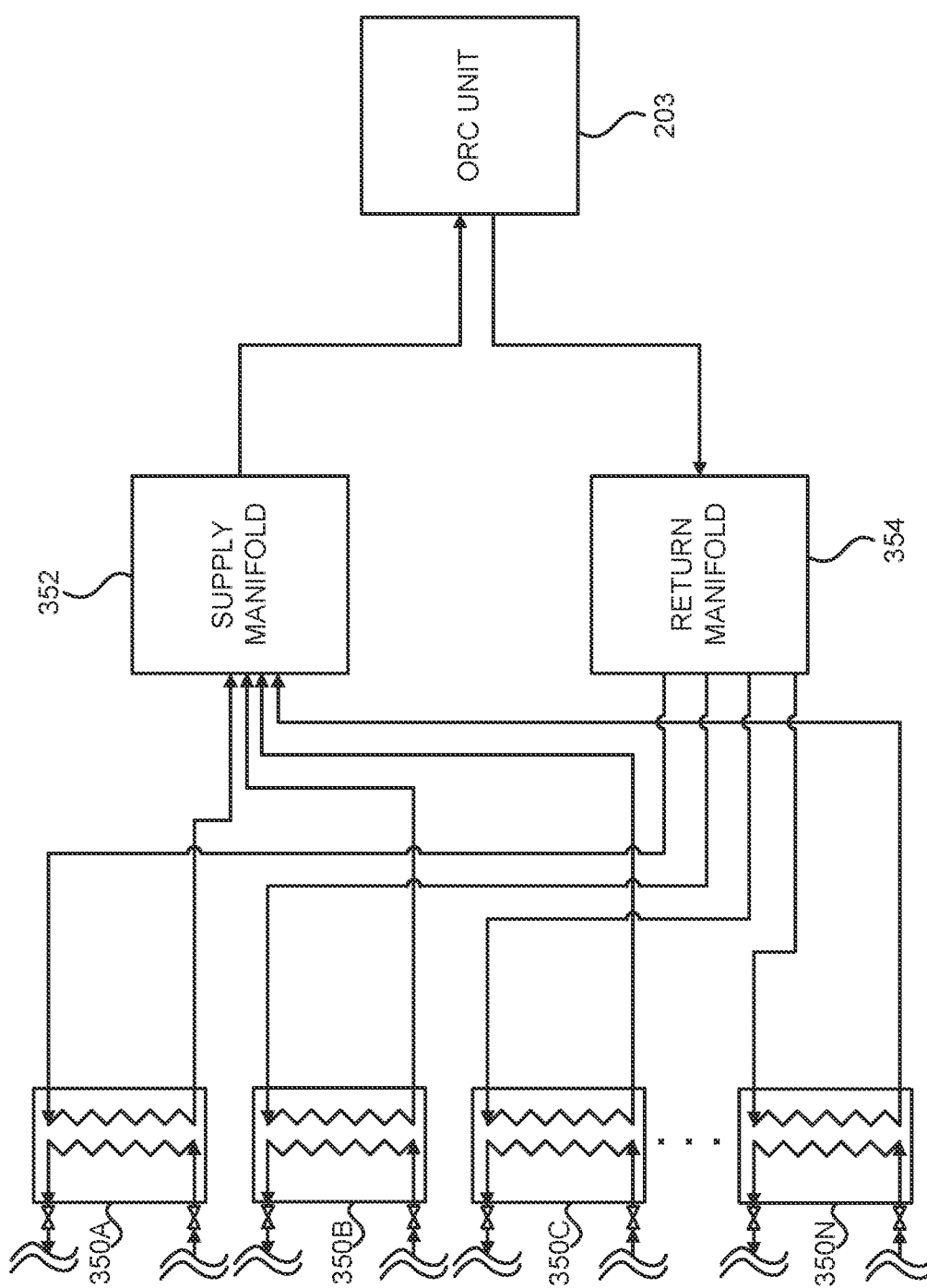

As illustrated in FIG. 4A, the site may include a supply manifold 352 and a return manifold 354. In such examples, an intermediate working fluid may coalesce or combine at each manifold (e.g., the supply manifold 352 and the return manifold 354). For example, the intermediate working fluid may flow from each of the heat exchangers 350A, 350B, 350C, and up to 350N and combine at the supply manifold 352. The intermediate working fluid may then flow through the ORC unit 203 then back to the return manifold 354, where the intermediate working fluid may then flow back to each of the heat exchangers 350A, 350B, 350C, and up to 350N.

Figure 4B:
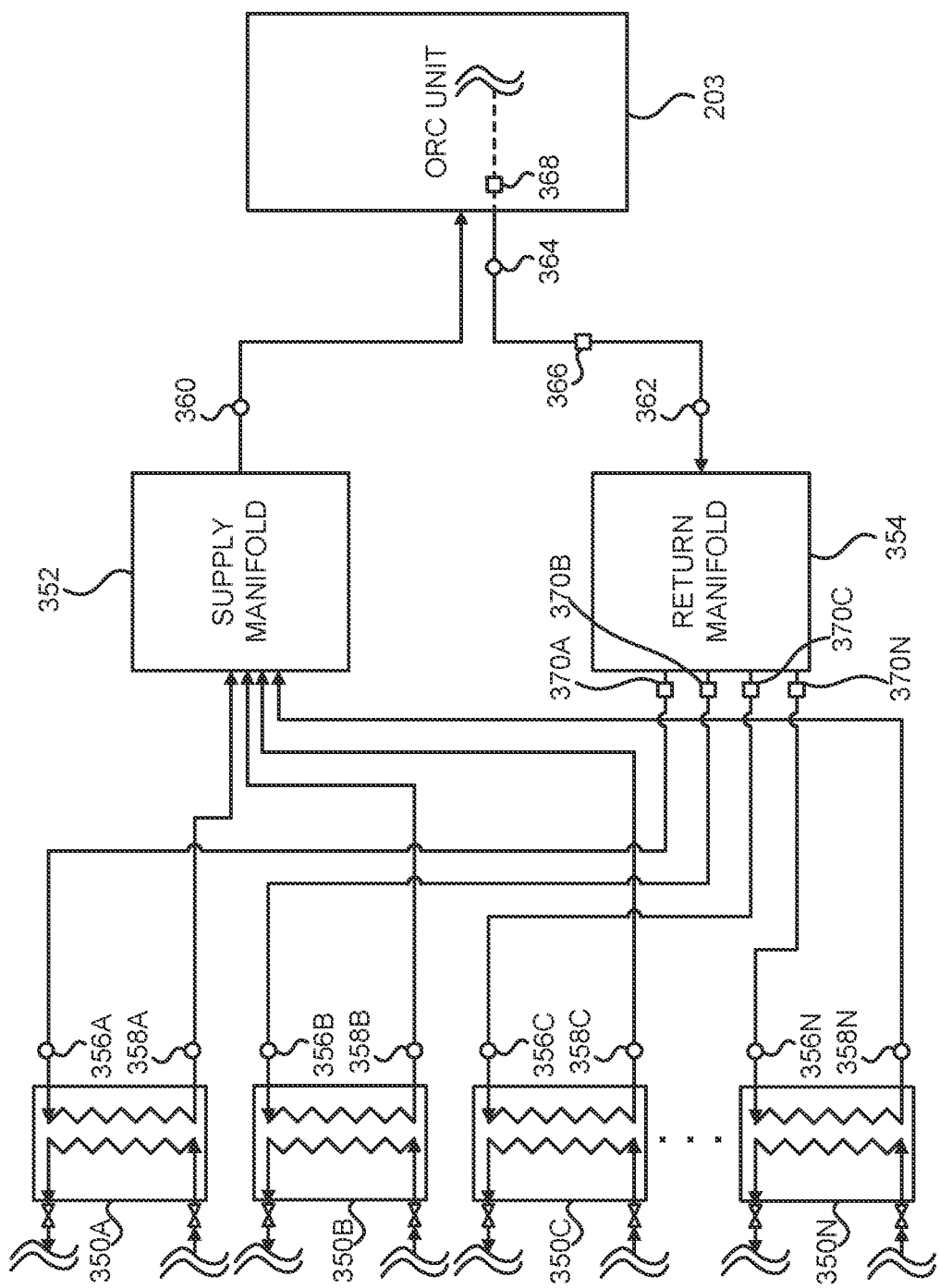

In FIG. 4B, each pipeline from the heat exchangers 350A, 350B, 350C, and up to 350N to the supply manifold 352 may include a sensor 356A, 356B, 356C, and up to 356N, such as a temperature sensor, flow meter, or other sensor to measure some characteristic of the intermediate working fluid. Each pipeline from the return manifold 354 to the heat exchangers 350A, 350B, 350C, and up to 350N may include a sensor 358A, 358B, 358C, and up to 358N, such as a temperature sensor, flow meter, or other sensor to measure some characteristic of the intermediate working fluid. Further, the pipeline positioned between the return manifold 354 and the ORC unit 203 may include one or more flow control devices 366, 368, in addition to one or more sensors 362, 364 (e.g., temperature sensors or some other suitable sensor), thereby controlling the flow of intermediate working fluid from the ORC unit 203 to the return manifold 354. Each pipeline from the return manifold 354 to the heat exchangers 350A, 350B, 350C, and up to 350N may further include a flow control device 370A, 370B, 370C, and up to 370N thereby controlling the flow of the intermediate working fluid from the return manifold 354 to each of the heat exchangers 350A, 350B, 350C, and up to 350N. Utilizing various combinations of each sensor and each flow control device, the temperature and flow of the intermediate working fluid may be concisely controlled. The pipeline from the supply manifold 352 to the ORC unit 203 can include a sensor 360 to measure temperature or some other characteristic of the working fluid. Based on the measurements or determinations of the temperature or other characteristic of the working fluid (e.g., flow, pressure, density, etc.), the flow control devices 370A, 370B, 370C, and up to 370N may adjust the amount of working fluid flowing to each of the one or more heat exchangers 350A, 350B, 350C, and up to 350N ensuring that the proper amount of working fluid flows to each of the one or more exchangers 350A, 350B, 350C, and up to 350N. For example, one of the one or more heat exchangers 350A, 350B, 350C, and up to 350N may not be producing heat for use in the ORC unit 203. In such examples, the flow control device associated with that particular heat exchanger may prevent further flow of working fluid to the that heat exchanger.

Figure 4C:
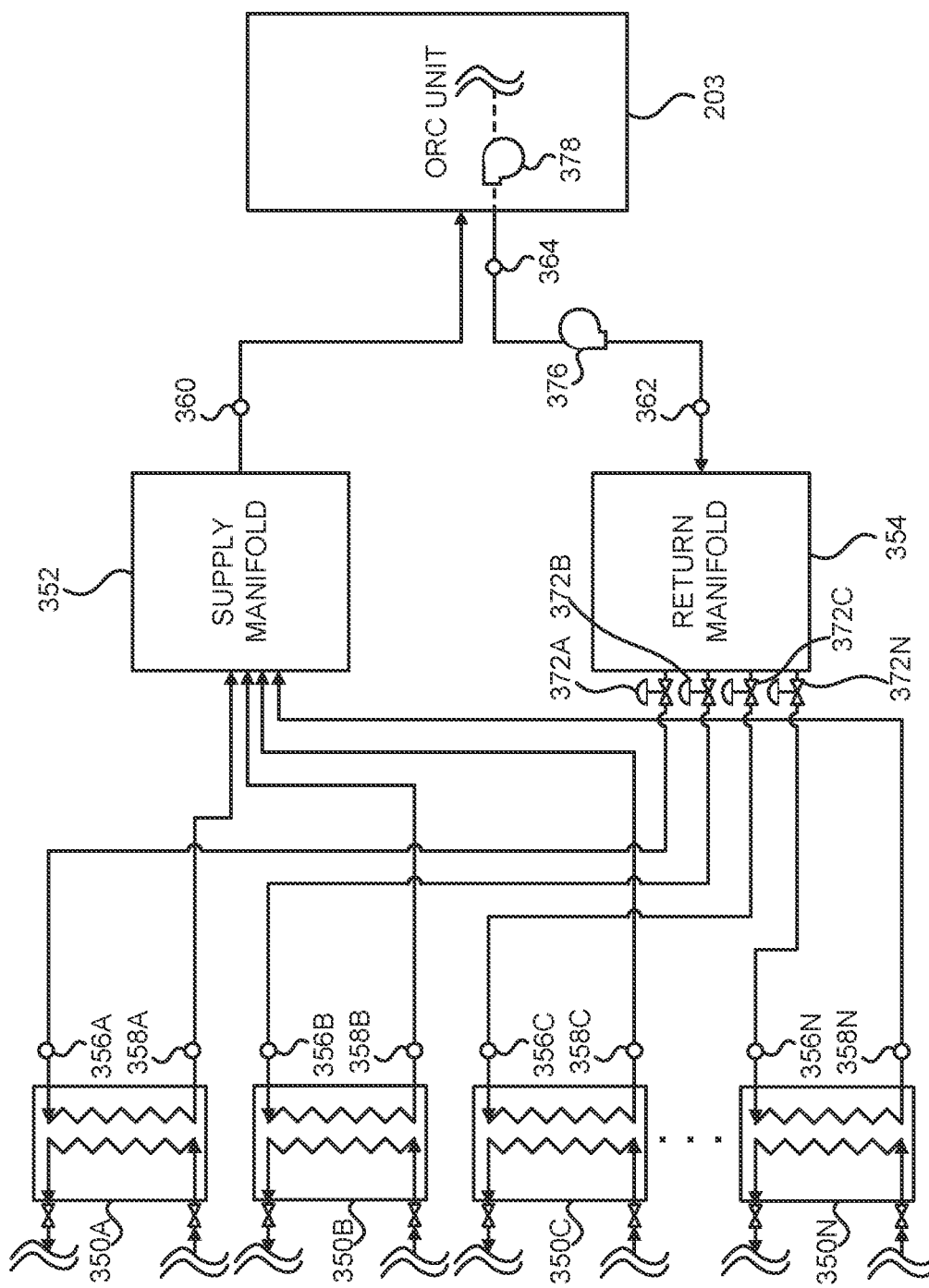
Figure 4D:
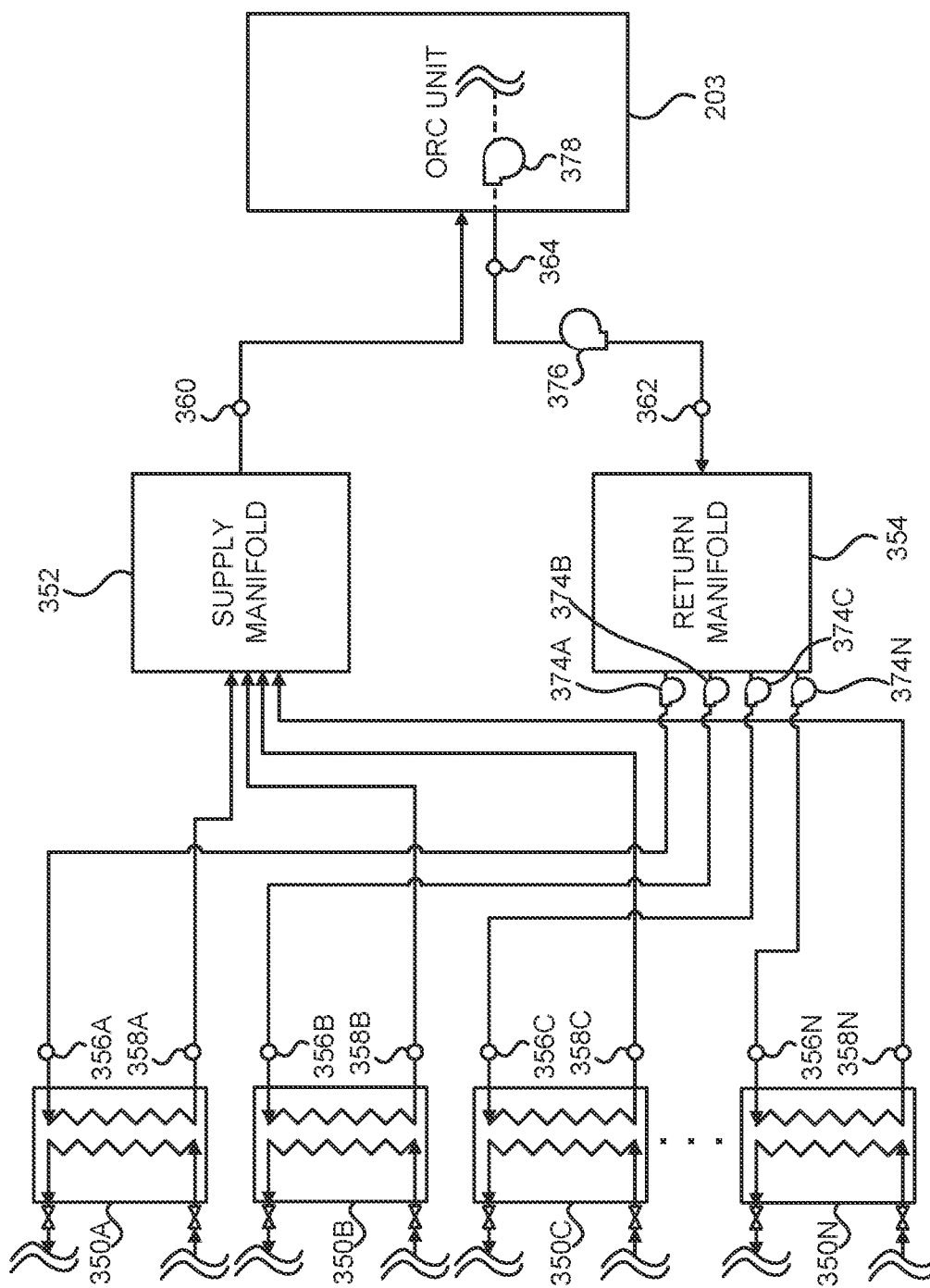

In FIG. 4C, the flow control devices positioned between the return manifold 354 and each of the one or more heat exchangers 350A, 350B, 350C, and up to 350N may be control valves 372A, 372B, 372C, and up to 372N. The flow control devices between the return manifold 354 and the ORC unit 203 may be a pump 376, while the flow control device within the ORC unit 203 may be a pump 378. In FIG. 4D, the flow control devices used throughout the site may be pumps 374A, 374B, 374C, and up to 374N or variable speed pumps. In FIG. 4E, the flow control devices may include some combination of one or more control valves 372A, 372B and/or one or more pumps 374C, 374N. In an embodiment, the one or more flow control devices 370A, 370B, 370C, and up to 370N may include one or more of a fixed speed pump, a variable speed drive pump, a control valve, an actuated valve, or other suitable device to control flow of a fluid.

In another embodiment, the site may include a warm supply manifold and a warm return manifold, for controlling the flow of warm working fluid from warm water heat exchangers to a warm fluid intake/outtake of the ORC unit. The site may also include a hot supply manifold and a hot return manifold, for controlling the flow of hot working fluid from hot water heat exchangers to a hot fluid intake/outtake of the ORC unit.

In such embodiments, the flow of working fluid to any of the heat exchangers (e.g., heat exchangers 350A, 350B, 350C, and up to 350N, warm water heat exchangers, and/or hot water heat exchangers) may be controlled via the flow control devices to manage or adjust the temperature of the working fluid. For example, the total percentage of working fluid flowing to each heat exchanger, for example heat exchangers 350A, 350B, 350C, and up to 350N, may initially be equal. As the temperature of the heated fluid flowing through a particular heat exchanger rises or falls, the percentage or amount of working fluid flowing to a particular heat exchanger may be increased or decreased to raise or lower, respectively, the heat transferred from the heated fluid to the working fluid. For example, to increase the electrical output of an ORC unit 203, the overall temperature of the working fluid may be increased. To accomplish this, larger percentages of working fluid may be transported to heat exchangers with hotter fluid, while lesser percentages of working fluid may be transported to heat exchangers with cooler fluid.

Figure 5A:
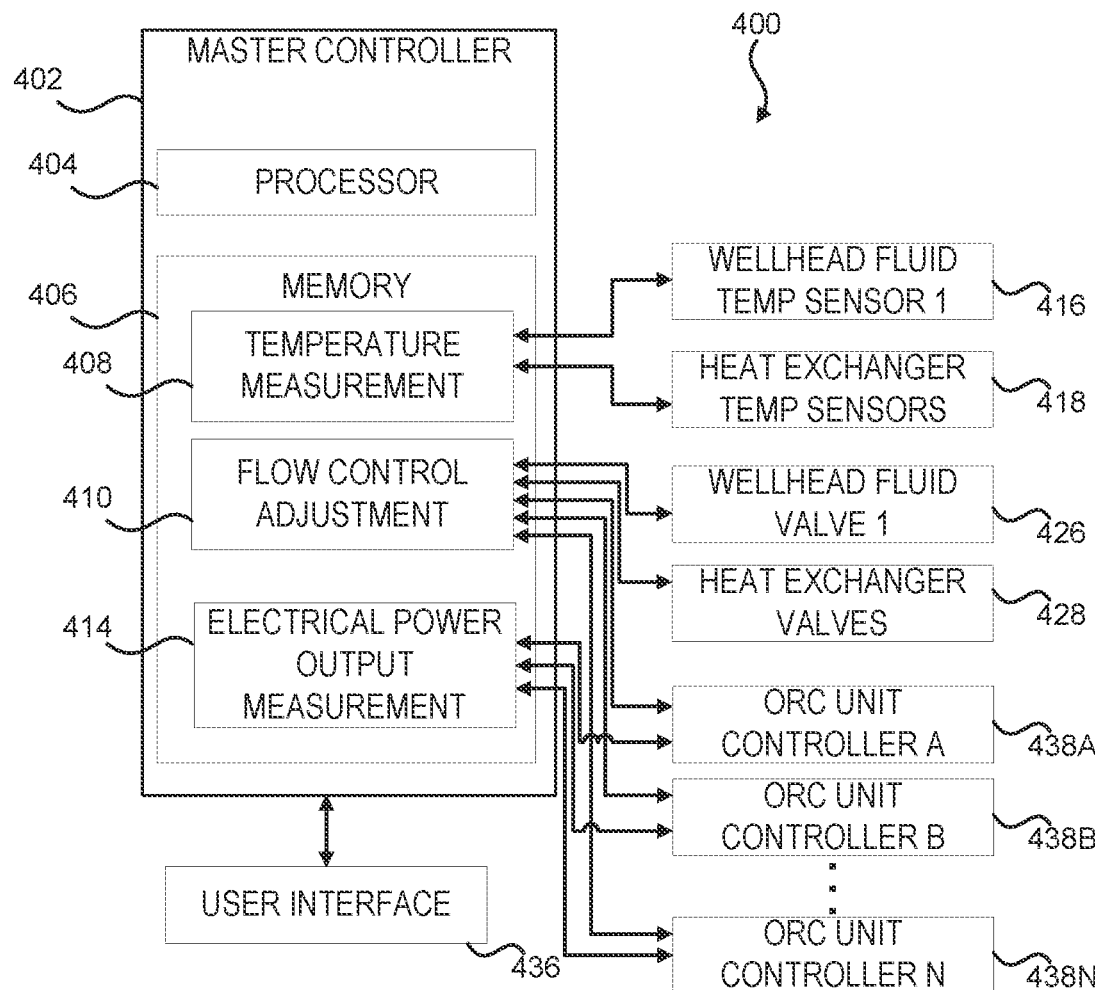
FIG. 5A, FIG. 5B, and FIG. 5C are simplified diagrams illustrating a control system for managing geothermal power production at a well, according to one or more embodiment of the disclosure.
Figure 5B:
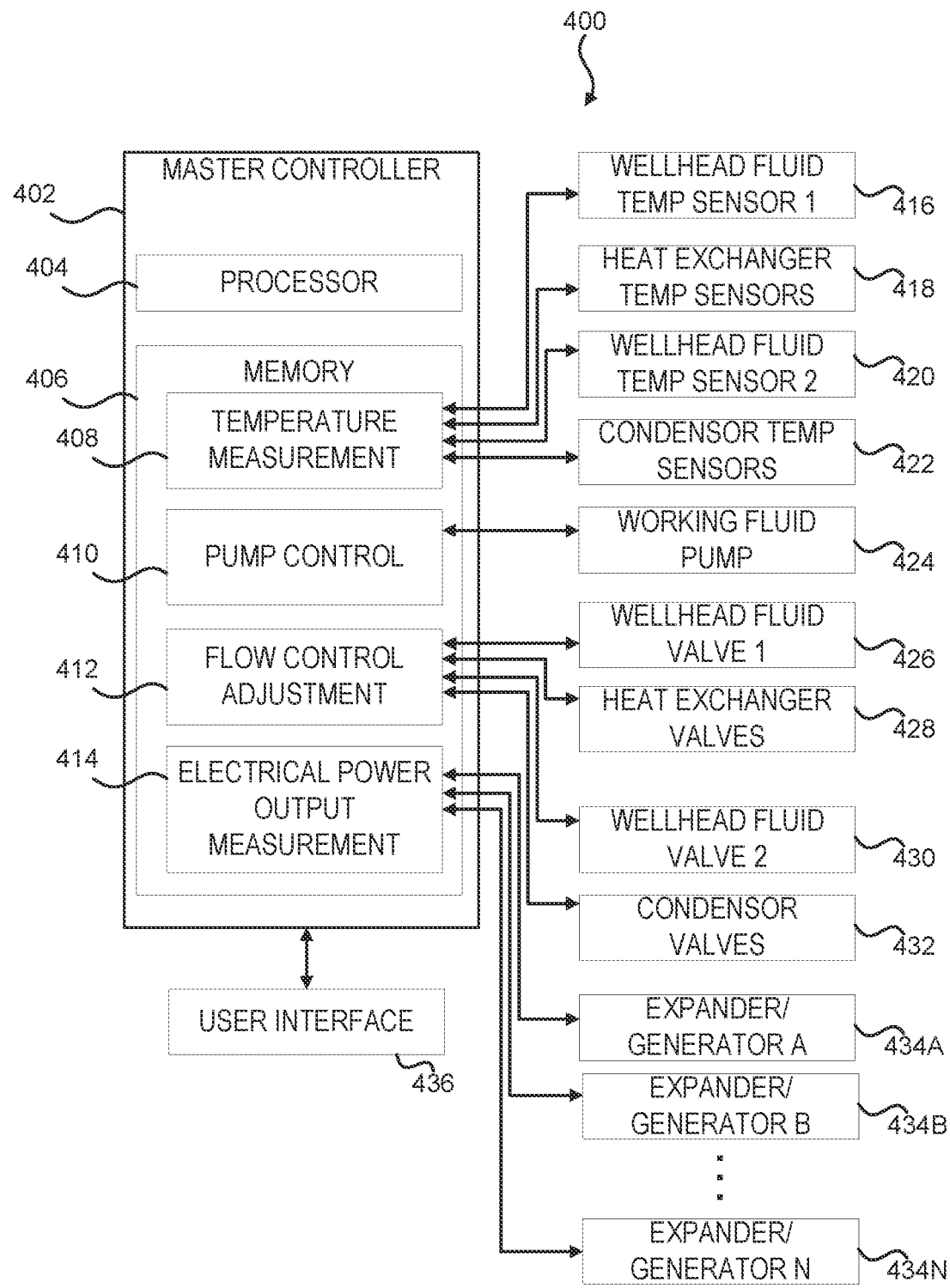
Figure 5C:
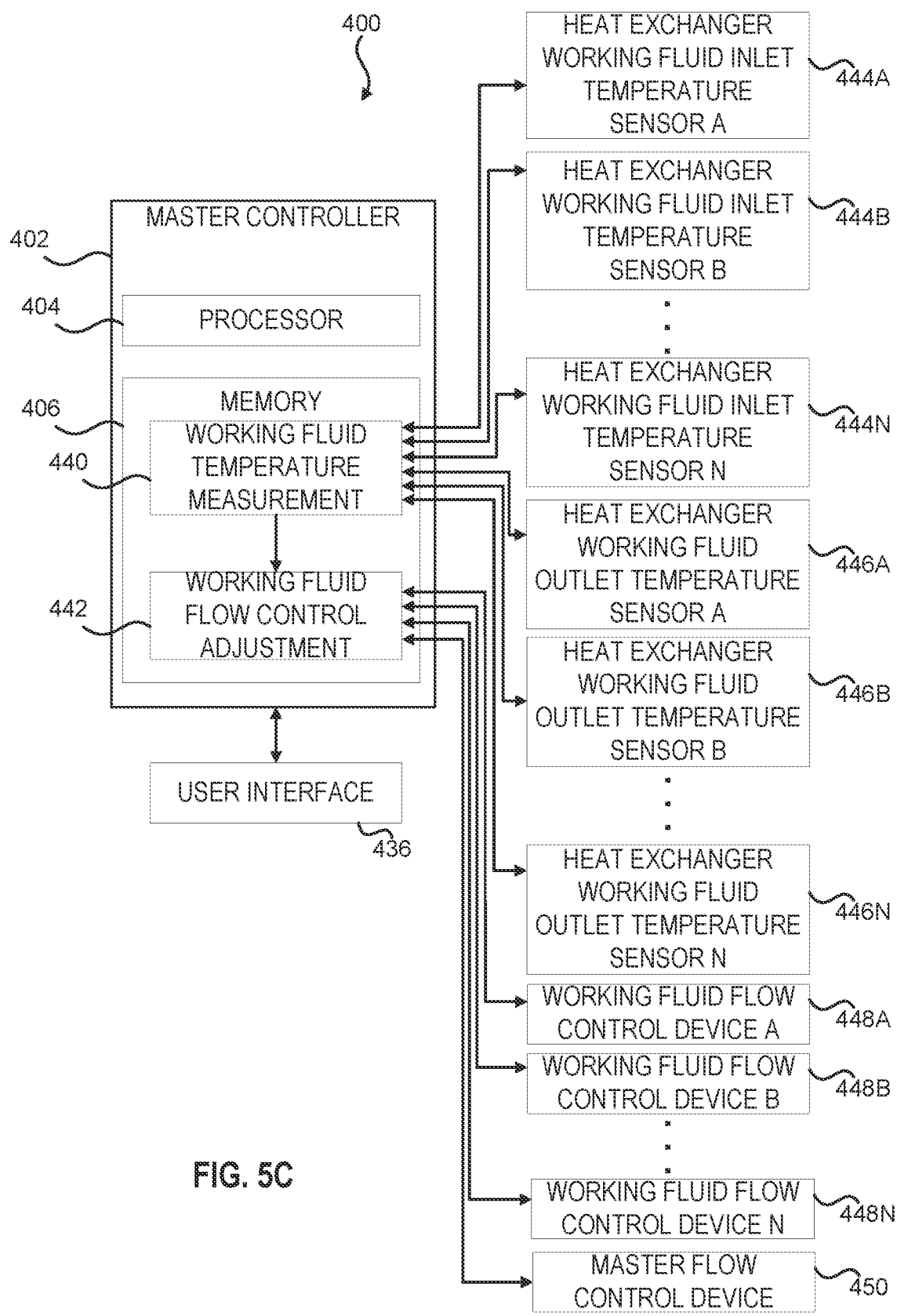

FIG. 5A, FIG. 5B, and FIG. 5C are simplified diagrams illustrating a control system for managing the geothermal power production at a well, according to one or more embodiment of the disclosure. A master controller 402 may manage the operations of geothermal power generation at a wellhead during hydrocarbon production. The master controller 402 may be one or more controllers, a supervisory controller, programmable logic controller (PLC), a computing device (such as a laptop, desktop computing device, and/or a server), an edge server, a cloud based computing device, and/or other suitable devices. The master controller 402 may be located at or near the well. The master controller 402 may be located remote from the well or site. The master controller 402, as noted, may be more than one controller. In such cases, the master controller 402 may be located near or at various wells and/or at other off-site locations. The master controller 402 may include a processor 404, or one or more processors, and memory 406. The memory 406 may include instructions. In an example, the memory 406 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 406 may store or include instructions executable by the processor 404. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

The master controller 402 may include instructions 408 to measure temperature at various points or locations of the system (e.g., as illustrated in, for example, FIG. 2E). For example, temperature may be measured at a wellhead fluid temperature sensor 1 416, heat exchanger temperature sensors 418, wellhead fluid temperature sensor 2 420, condenser temperature sensors 422, and/or at various other points in the system 400. Other characteristics may be measured as well, such as flow, density, pressure, composition, or other characteristics related to the wellhead fluid and/or working fluid.

Utilizing the characteristics noted above, the master controller 402 may control various aspects of the system 400. For example, the master controller 402 may include flow control adjustment instructions 412. The system 400 may include one or more valves placed in various locations (For example, but not limited to, FIGS. 2A through 2H). Valves of the system 400 may include a wellhead fluid valve 1 426, heat exchanger valves 428, wellhead fluid valve 2 430, and condenser valves 432. As noted other valves may be included in the system and controlled by the master controller 402. The valves may operate to adjust flow based on a number of factors. Such factors may include temperature of a wellhead fluid, flow rate of the wellhead fluid, temperature of the working fluid, flow rate of the working fluid, pressure of the wellhead fluid at various points in the system, pressure of the working fluid at various points in the system, and/or some combination thereof.

In an example, the system 400 may include a user interface 436, e.g., such as a monitor, display, computing device, smartphones, tablets, and other similar devices as will be understood by those skilled in the art. A user may view data, enter thresholds or limits, monitor status of the equipment, and perform other various tasks in relation to the equipment at the well. For example, a specific flow rate may be set for hydrocarbon production. As a wellhead begins producing hydrocarbons (e.g., wellhead fluids begin flowing from a wellhead), the master controller 402 may monitor flow rate and compare the flow rate to the threshold either set by a user or pre-set in the master controller 402. If the master controller 402 determines that the heat exchanger valves 428 (e.g., via flow control adjustment instructions 412) should be open or are open and that the flow of wellhead fluid is higher or lower than the threshold, the master controller 402 may adjust the appropriate valves, e.g., wellhead fluid valve 426 and/or heat exchanger valves 428. The valve associated with the primary or bypass wellhead fluid pipe, e.g., wellhead fluid valve 426, may open or close by varying degrees based on such determinations.

In another example, the master controller 402 may include instructions 410 to control a pump for the ORC unit, e.g., working fluid pump 424. If heat exchanger valves 428 and condenser valves 432 are closed, the master controller 402 may transmit a signal to shut down or cease operation of the working fluid pump 424, if the working fluid pump 424 is operating. The master controller 402 may further transmit a signal, based on the heat exchanger valves 428 being open, to initiate or start operations of the working fluid pump 424. The working fluid pump 424 may be a fixed pressure pump or a variable frequency pump. The master controller 402 may further include instructions 414 to monitor the power output from an ORC unit or from expanders/generators 434 (e.g., expander/generator A 434A, expander/generator B 434B, and/or up to expander/generator N 434N). If the system 400 utilizes ORC units, the master controller 402 may determine the electrical power generated or output based on an output from, for example, ORC unit controller A 438A, ORC unit controller B 438B, and/or up to ORC unit controller N 438N. If the power output drops to an un-economical or unsustainable level or electrical power generation ceases completely while the heat exchanger valves 428 are open, the master controller 402 may transmit signals to close the heat exchanger valves 428. In another example, the master controller 402 may monitor electrical power output from other wells. The master controller 402 may monitor or meter the amount of electrical power being utilized at each of the wells and/or the amount of electrical power being generated at each of the wells. If an excess of electrical power exists, the master controller 402 may transmit signals causing the excess energy at any particular well to be stored in energy storage devices, transmitted to the grid, and/or transmitted to another well. If a deficit of electrical power exists, the master controller 402 may transmit a signal causing other wells to transmit electrical power to the well experiencing an electrical power deficit. In another example, the metered electrical power may be utilized for commercial trade, to determine a cost of the electricity generated, and/or for use in determining emissions or emission reductions through use of an alternate energy source (e.g., geothermal power).

In another example, the master controller 402 may include instructions to maximize energy output from an ORC unit. In such examples, the ORC unit may be connected to a plurality of high-pressure heat exchangers. Further, each of the high-pressure heat exchangers may connect to one or more wellheads. As a wellhead produces a wellhead fluid, the pressure and temperature of the wellhead fluid may vary, over time, as well as based on the location of the wellhead. The master controller 402 may determine the temperature of the wellhead fluid at each high-pressure heat exchanger and/or the temperature of the working fluid in each high-pressure heat exchanger. Based on these determinations, the master controller 402 may open/close valves associated with one or more particular high-pressure heat exchangers to ensure the most efficient heat transfer. Further, the master controller 402 may determine the amount of electrical power output from the ORC unit. Based on a power rating of the ORC unit (e.g., the maximum power output the ORC unit is able to produce) and/or the amount of electrical power output from the ORC unit, the master controller 402 may adjust valves associated with the one or more particular high-pressure heat exchangers to thereby increase electrical power output. Additional ORC units may be utilized and electrical power output for each may be optimized or efficiently generated. The master controller 402 may determine, for each ORC unit, the optimal amount or efficient amount of heated working fluid flowing from each high-pressure heat exchanger to ensure the highest amount of electrical power possible is generated per ORC unit or that each ORC unit meets a preselected electrical power output threshold. In such examples, each ORC unit may be connected to each high-pressure heat exchanger and the master controller 402 may determine which set of valves to open/close based on such an optimization or electrical power output threshold.

In another example, the master controller 402 may include failover instructions or instructions to be executed to effectively reduce or prevent risk. The failover instructions may execute in the event of ORC unit and/or high-pressure heat exchanger failure or if an ORC unit and/or high-pressure heat exchanger experiences an issue requiring maintenance. For example, the ORC unit and/or high-pressure heat exchanger may have various sensors or meters. Such sensors or meters, when providing measurement to the master controller 402, may indicate a failure in the ORC unit and/or high-pressure heat exchanger. In another example, the master controller 402 may include pre-determined parameters that indicate failures. If the master controller 402 receives such indications, the master controller 402 may open, if not already open, the wellhead fluid valve 1 426 and wellhead fluid valve 2 430. After the wellhead fluid valve 1 426 and wellhead fluid valve 2 430 are opened, the master controller 402 may close the heat exchanger valves 428, the condenser valves 432, or any other valve associated with the flow of fluid to the ORC unit and/or high-pressure heat exchanger. In such examples, the master controller 402 may prevent further use of the ORC unit and/or high-pressure heat exchanger until the issue or failure indicated is resolved. Such a resolution may be indicated by a user via the user interface 436 or based on measurements from sensors and/or meters.

In another example, the master controller 402 may, as noted, determine an amount of electrical power output by an ORC unit. The master controller 402 may additionally determine different characteristics of the electrical power output. For example, the master controller 402 may monitor the output voltage and frequency. Further, the master controller 402 may include pre-set or predetermined thresholds, limits, or parameters in relation to the monitored characteristics of the electrical power output. Further still, the master controller 402 may connect to a breaker or switchgear. In the event that the master controller 402 detects that an ORC unit exceeds any of the thresholds, limits, and/or parameters, the master controller 402 may transmit a signal to the breaker or switchgear to break the circuit (e.g., the flow of electricity from the ORC unit to a source) and may shut down the ORC unit (e.g., closing valves preventing further flow to the ORC unit, as described above).

In another example, as shown in FIG. 5C, the master controller 402 may include instructions 440 to measure the working fluid temperature via one or more heat exchanger working fluid inlet temperature sensor 444A, 444B, up to 4440N and/or one or more heat exchanger working fluid inlet temperature sensor 446A, 446B, up to 446N. The master controller 402 may include instructions 442 to adjust the flow of working fluid to any one of the one or more heat exchangers based on the measured temperatures. The flow of the working fluid may be adjusted by the master controller 402, as noted, based on various temperature measurements of the working fluid, via one or more working fluid flow control devices 448A, 448B, up to 448N and/or a master flow control device 450.

Figure 6:
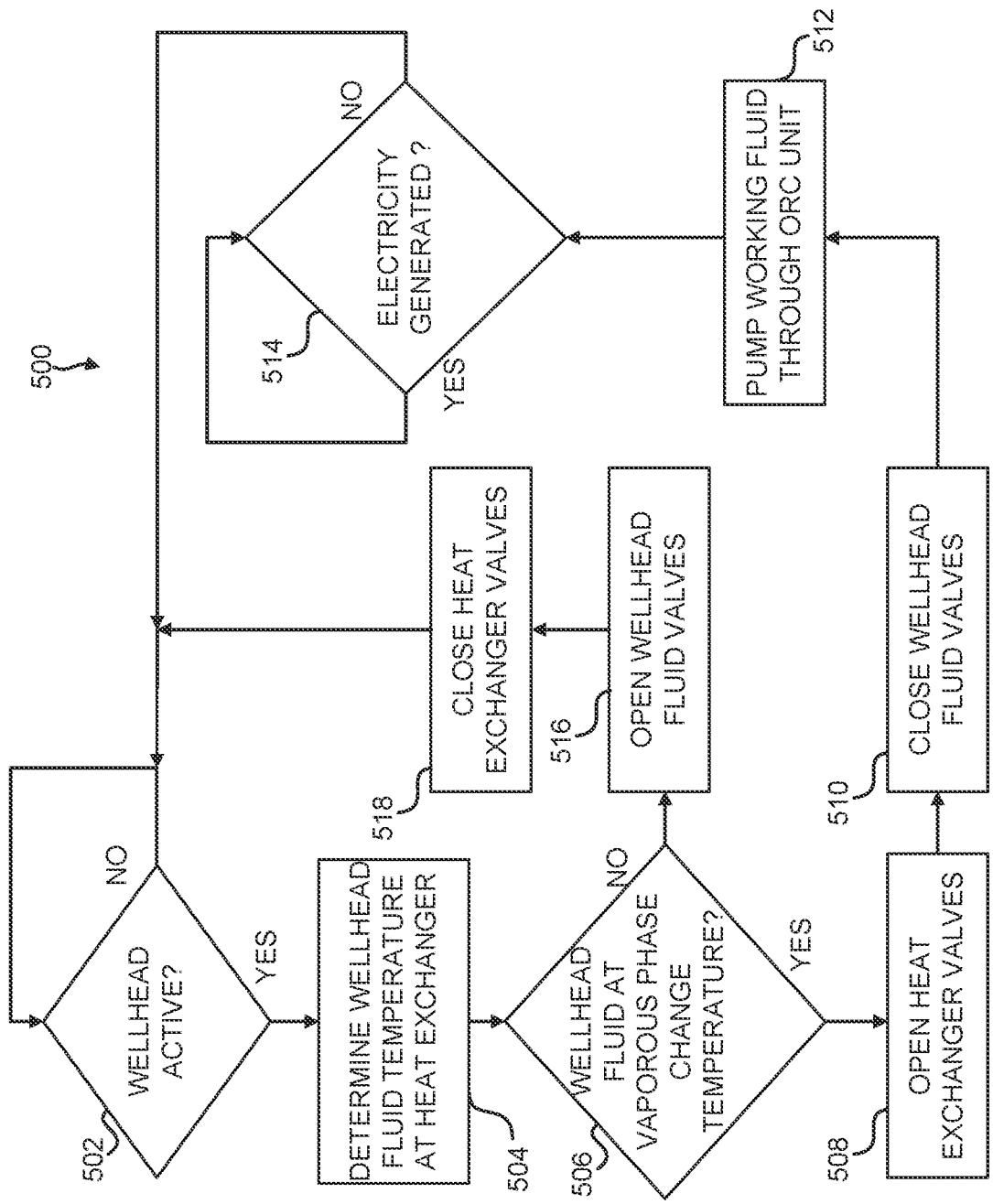
FIG. 6 is a flow diagram of geothermal power generation in which, when a wellhead fluid is at or above a vaporous phase change temperature, heat exchanger valves may be opened to allow wellhead fluid to flow therethrough, thereby facilitating heating of a working fluid for use in an organic Rankine cycle (ORC) unit, according to one or more embodiment of the disclosure.

FIG. 6 is a flow diagram of geothermal power generation in which, when a wellhead fluid is at or above a vaporous phase change temperature threshold, heat exchanger valves may be opened to allow wellhead fluid to flow therethrough, thereby facilitating heating of a working fluid for use in a ORC unit, according to one or more embodiment of the disclosure. The method is detailed with reference to the master controller 402 and system 400 of FIGS. 5A through 5C. Unless otherwise specified, the actions of method 500 may be completed within the master controller 402. Specifically, method 500 may be included in one or more programs, protocols, or instructions loaded into the memory of the master controller 402 and executed on the processor or one or more processors of the master controller 402. The order in which the operations are described is not intended to be construed as a limitation, and any number of the described blocks may be combined in any order and/or in parallel to implement the methods.

At block 502, the master controller 402 may determine whether the wellhead is active. Such a determination may be made based on sensors located at or near the wellhead, e.g., a pressure sensor indicating a pressure or a flow meter indicating a flow of a wellhead fluid or hydrocarbon stream from the wellhead. In other examples, a user may indicate, via the user interface 436, that the wellhead is active. If the wellhead is not active, the master controller 402 may wait for a specified period of time and make such a determination after the period of time. In an example, the master controller 402 may continuously check for wellhead activity.

At block 504, in response to wellhead activity or during hydrocarbon production, the master controller 402 may determine a wellhead fluid temperature. The wellhead fluid temperature may be measured by a wellhead fluid temperature sensor 1 416 disposed at or near the wellhead. The wellhead fluid temperature sensor 1 416 may be disposed on or in a pipe. In an example, various other temperature sensors may be disposed at other points in the system 400, e.g., heat exchanger temperature sensor 418, wellhead fluid temperature sensor 2 420, condenser temperature sensor 422, and/or other temperature sensors. The temperature measurements provided by such sensors may be utilized by the master controller 402 to determine which valves to open or close.

At block 506, the master controller 402 may determine whether the wellhead fluid is at or above a vaporous phase change temperature threshold of a working fluid. In such examples, the vaporous phase change temperature may be based on the working fluid of the ORC unit. For example, for pentafluoropropane the vaporous phase change temperature or boiling point may be 15.14 degrees Celsius. In another example, or factors may be taken into account when determining whether to open heat exchanger valves 428. For example, whether the pressure is within operating range of a high-pressure heat exchanger, whether the flow rate at a primary or bypass pipeline is sufficient to prevent impedance of hydrocarbon production, whether power generation costs are offset by power generation needs, among other factors.

At block 508, if the wellhead fluid is at or above the vaporous phase change temperature, the master controller 402 may transmit a signal to heat exchanger valves 428 to open to a specified degree. In an example, the heat exchanger valves 428 may be may be fully opened or partially opened. The degree to which the heat exchanger valves 428 opens may depend on the temperature of the wellhead fluid, the flow rate of the wellhead fluid, and/or the pressure of the wellhead fluid.

At block 510, the master controller 402 may close wellhead fluid valves (e.g., wellhead fluid valve 1 426) to divert a portion of the flow of wellhead fluids to the high-pressure heat exchanger. The wellhead fluid valves (e.g., wellhead fluid valve 1 426) may close partially or completely, depending on various factors, such as heat exchanger flow capacity, current flow rate, current pressure, current temperature, among other factors. Once the wellhead fluid valves (e.g., wellhead fluid valve 1 426) are closed, at block 512, a working fluid pump 424 of the ORC unit may begin pumping the working fluid through the ORC loop. At block 514, the master controller 402 may determine whether electricity is being generated. If not, the master controller 402 may check if the wellhead is still active and, if the wellhead is still active, the master controller 402 may adjust the valves (e.g., wellhead fluid valve 1 426 and heat exchanger valves 428) as appropriate (e.g., increasing flow through the heat exchanger to facilitate an increase in heat transfer).

At block 516, if the wellhead fluid is lower than the vaporous phase change temperature, the master controller 402 may open or check if the wellhead fluid valves (e.g., wellhead fluid valve 1 426) are open. Further, the wellhead fluid valves may already be open to a degree and, at block 516, may open further or fully open, depending on desired wellhead fluid flow. In an example, the wellhead fluid valve (e.g., wellhead fluid valve 1 426) may be used, with or without a separate choke valve, to choke or partially choke the wellhead fluid flow. Further, once the wellhead fluid valves are open, at block 518, the master controller 402 may close the heat exchanger valves 428 fully or partially in some cases.

Figure 7:
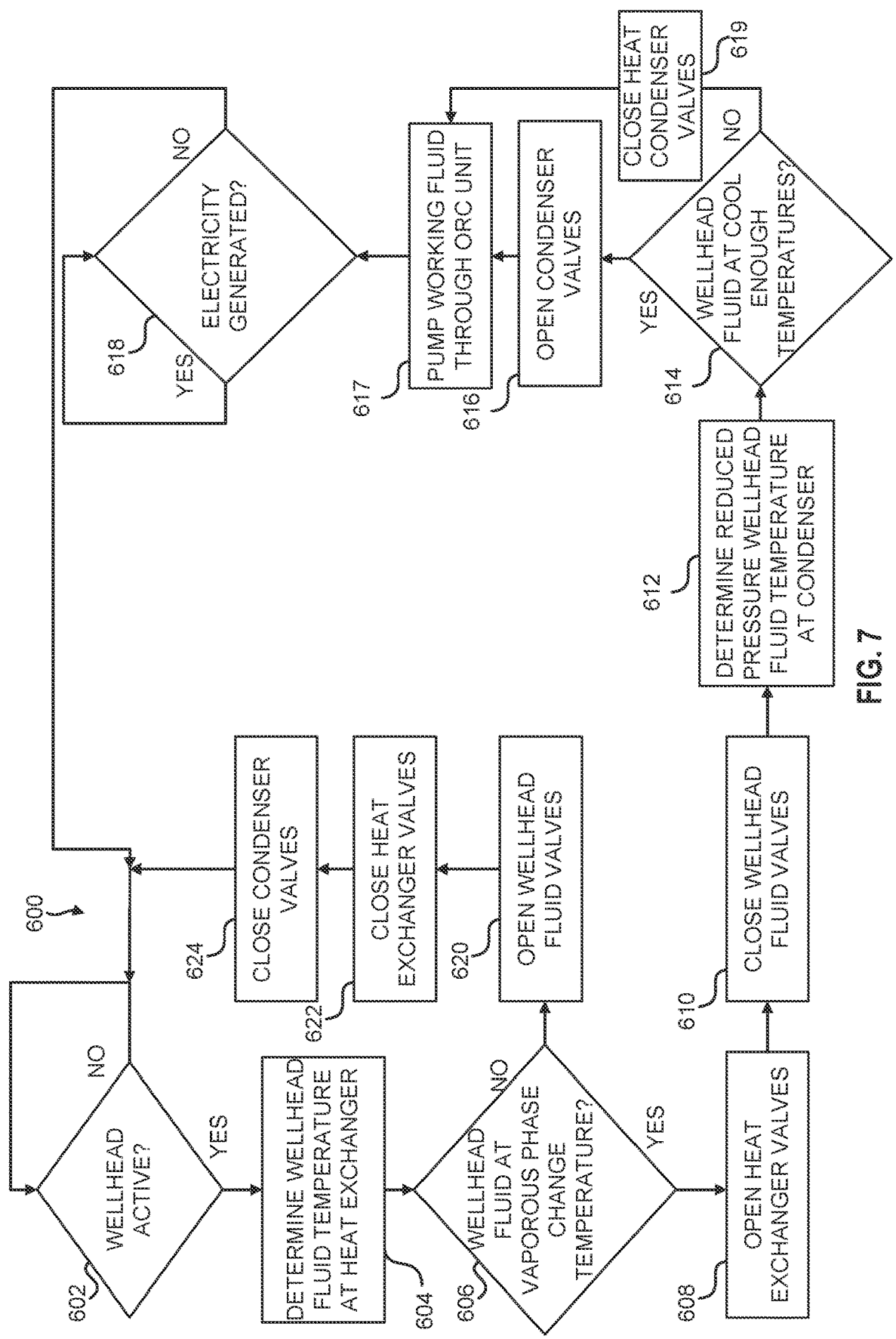
FIG. 7 is another flow diagram of geothermal power generation in which, when a wellhead fluid is at or above a vaporous phase change temperature, heat exchanger valves may be opened to allow wellhead fluid to flow therethrough, thereby facilitating heating of a working fluid for use in a ORC unit, according to one or more embodiment of the disclosure.

FIG. 7 is another flow diagram of geothermal power generation in which, when a wellhead fluid is at or above a vaporous phase change temperature, heat exchanger valves may be opened to allow wellhead fluid to flow therethrough, thereby facilitating heating of a working fluid for use in a ORC unit, according to one or more embodiment of the disclosure. The method is detailed with reference to the master controller 402 and system 400 of FIGS. 4A and 4B. Unless otherwise specified, the actions of method 600 may be completed within the master controller 402. Specifically, method 600 may be included in one or more programs, protocols, or instructions loaded into the memory of the master controller 402 and executed on the processor or one or more processors of the master controller 402. The order in which the operations are described is not intended to be construed as a limitation, and any number of the described blocks may be combined in any order and/or in parallel to implement the methods.

Blocks 602 through 610 correspond to blocks 502 through 610, as described above. Once it has been determined that the heat exchanger valves 428 should be open and after the heat exchanger valves 428 open, wellhead fluid may flow through the heat exchanger and/or the primary or bypass wellhead fluid pipe to a choke valve. The choke valve may reduce the pressure of the wellhead fluid and, thus, reduce the temperature of the wellhead fluid. At block 612, the master controller 402 may determine the reduced pressure wellhead fluid temperature at or near a condenser or heat sink valve based on a measurement from the condenser temperature sensors 422. The master controller 402 may, at block 614, determine whether the wellhead fluid is at cool enough temperatures to facilitate cooling of a working fluid flow. The working fluid may have a condensation point or a temperature at which the working fluid changes phase from a vapor to a liquid. Such a temperature may be utilized as the threshold for such determinations.

At block 616, if the temperature is cool enough, the master controller 402 may open the condenser valves 432, allowing wellhead fluid to flow through the condenser or other cooling apparatus. At block 617 the master controller 402 may transmit a signal to the working fluid pump 424 to start or begin pumping working fluid through an ORC loop. In another example, at block 619, if the temperature of the working fluid is not cool enough to facilitate cooling of the working fluid to any degree, the master controller 402 may close the condenser valves 432. In another example, the master controller 402 may determine the temperature of the reduced pressure wellhead fluid flow and whether the temperature of the reduced pressure wellhead fluid flow, in conjunction with a primary or secondary cooler, may cool the working fluid to a point. The master controller 402, in such examples, may consider the temperature of the working fluid entering the condenser and the temperature of the reduced pressure wellhead fluid flow at or near the condenser valve 432.

As noted and described above, the master controller 402 may, at block 618, determine whether electric power is generated. In another example, if the wellhead temperature is not high enough to produce geothermal power, the master controller 402 may, at block 620, open the wellhead fluid valves. At block 622, the master controller 402 may close, if the heat exchanger valves 428 are open, the heat exchanger valves 428. Finally, at block 624, the master controller 402 may close condenser valves 432.

Figure 8A:
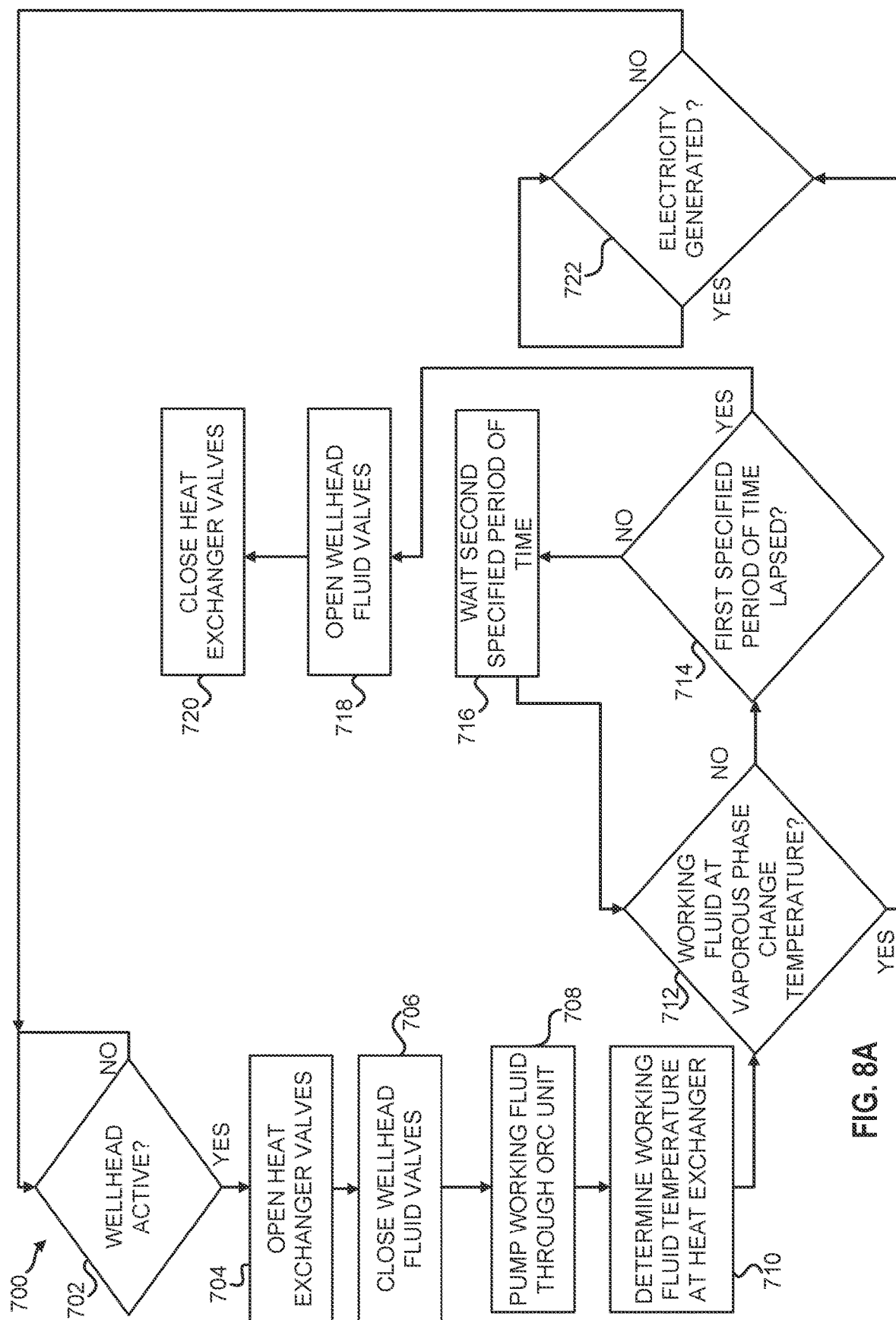
FIG. 8A is a flow diagram of geothermal power generation in which, when an ORC fluid is at or above a vaporous phase change temperature, heat exchanger valves may remain open to allow wellhead fluid to flow therethrough, thereby facilitating heating of a working fluid for use in an ORC unit, according to one or more embodiment of the disclosure.

FIG. 8A is a flow diagram of geothermal power generation in which, when a working fluid or ORC fluid is at or above a vaporous phase change temperature threshold, heat exchanger valves may remain open to allow wellhead fluid to flow therethrough, thereby facilitating heating of the working fluid or ORC fluid for use in an ORC unit, according to one or more embodiment of the disclosure. The method is detailed with reference to the master controller 402 and system 400 of FIGS. 4A and 4B. Unless otherwise specified, the actions of method 700 may be completed within the master controller 402. Specifically, method 700 may be included in one or more programs, protocols, or instructions loaded into the memory of the master controller 402 and executed on the processor or one or more processors of the master controller 402. The order in which the operations are described is not intended to be construed as a limitation, and any number of the described blocks may be combined in any order and/or in parallel to implement the methods.

At block 702, the master controller 402 may determine whether the wellhead is active. Such a determination may be made based on sensors located at or near the wellhead, e.g., a pressure sensor indicating a pressure or a flow meter indicating a flow of a wellhead fluid or hydrocarbon stream from the wellhead. In other examples, a user may indicate, via the user interface 436, that the wellhead is active. If the wellhead is not active, the master controller 402 may wait for a specified period of time and make such a determination after the specified period of time. In an example, the master controller 402 may continuously check for wellhead activity.

At block 704, in response to wellhead activity or during hydrocarbon production, the master controller 402 may open heat exchanger valves 428. At block 706, the master controller 402 may close wellhead fluid valve 1 426, at least partially. At block 708, when the heat exchanger valves 428 is open and wellhead fluid valve 1 426 is fully or partially closed, working fluid or ORC fluid may be pumped through the ORC unit.

At block 710, the master controller 402 may measure the temperature of the working fluid or ORC fluid. At block 712, the master controller 402 may determine whether the wellhead fluid is at or above a vaporous phase change temperature threshold. In such examples, the vaporous phase change may include when the working fluid or ORC fluid changes from a liquid to a vapor or gas. For example, for pentafluoropropane the vaporous phase change temperature or boiling point may be 15.14 degrees Celsius. In another example, other factors may be taken into account when determining whether to maintain an open percentage of the heat exchanger valves 428. For example, whether the pressure is within operating range of a high-pressure heat exchanger, whether the flow rate at a primary or bypass pipeline is sufficient to prevent impedance of hydrocarbon production, whether power generation costs are offset by power generation needs, among other factors.

At block 712, if the working fluid or ORC fluid is at or above the vaporous phase change temperature, the master controller 402 may determine whether electricity is generated at the ORC unit. If electricity is not generated, the master controller 402 may check, at block 702, whether the wellhead is active and perform the operations of method 700 again.

If the working fluid or ORC fluid, at block 712 is not at a vaporous phase change temperature, then, at block 714, the master controller 402 may first determine whether a first specified period of time has lapsed. The first period of time may be period of time of sufficient length to determine whether or not the working fluid or ORC fluid may reach a vaporous phase change state. Such a first specified period of time may be about an hour or more, two hours, three hours, four hours, or some other length of time during wellhead activity.

If the first specified period of time has not lapsed, at block 716, the master controller 402 may wait a second specified period of time before measuring the temperature of the working fluid or ORC fluid The second specified period of time may be less than the first specified period of time.

If the first specified period of time has lapsed, then the master controller 402 may have determined that, based on the temperature of the working fluid or ORC fluid, that the wellhead fluid may not reach temperatures sufficient to cause a vaporous phase change of the working fluid or ORC fluid. As such, at block 718, the master controller may close the open wellhead fluid valves and, at block 720, close the heat exchanger valves 428.

Figure 8B:
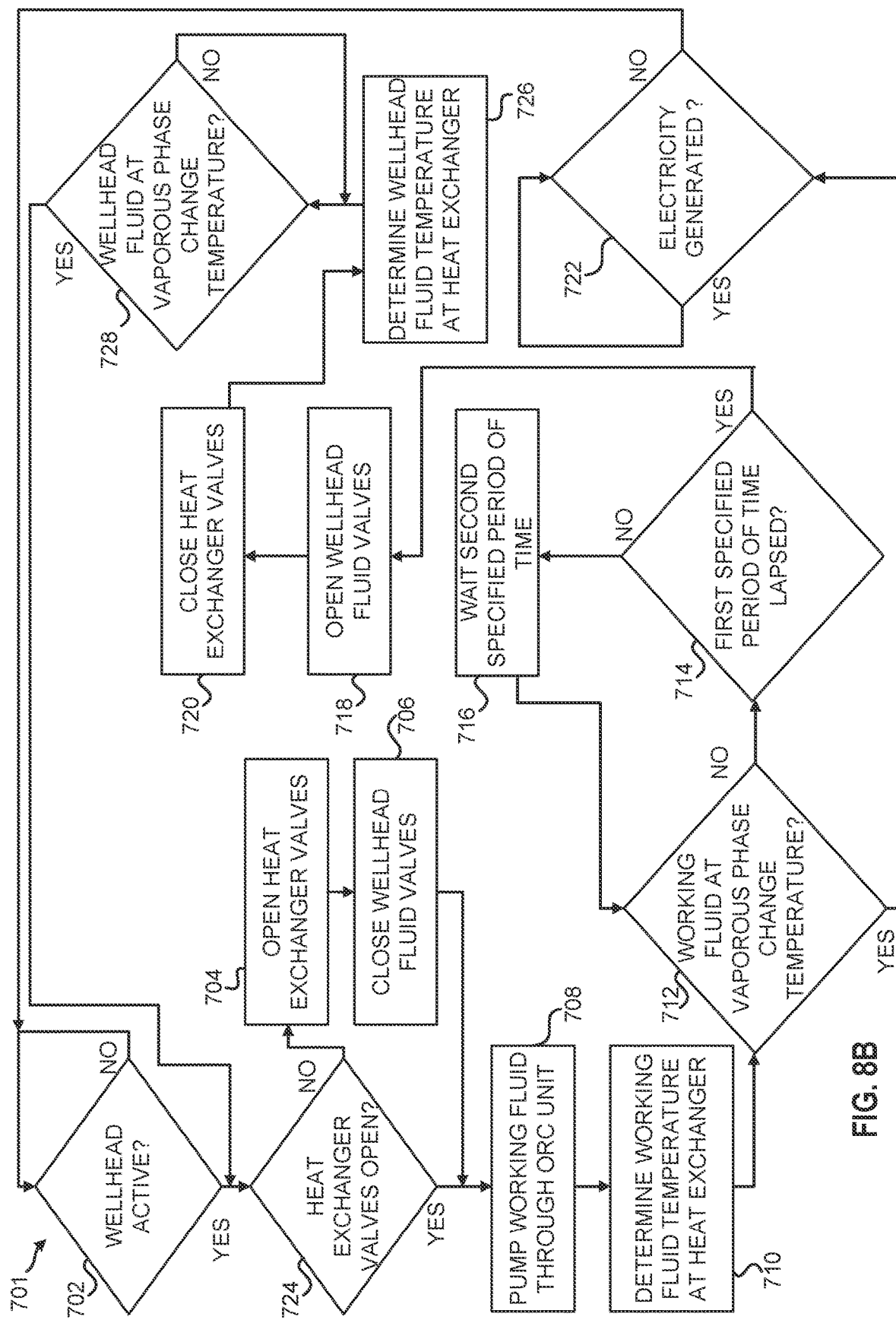
FIG. 8B is another flow diagram of geothermal power generation in which, when an ORC fluid is at or above a vaporous phase change temperature, heat exchanger valves may remain open to allow wellhead fluid to flow therethrough, thereby facilitating heating of a working fluid for use in an ORC unit, according to one or more embodiment of the disclosure.

FIG. 8B is another flow diagram of geothermal power generation in which, when a working fluid or ORC fluid is at or above a vaporous phase change temperature threshold, heat exchanger valves may remain open to allow wellhead fluid to flow therethrough, thereby facilitating heating of the working fluid or ORC fluid for use in an ORC unit, according to one or more embodiment of the disclosure. The method is detailed with reference to the master controller 402 and system 400 of FIGS. 4A and 4B. Unless otherwise specified, the actions of method 701 may be completed within the master controller 402. Specifically, method 701 may be included in one or more programs, protocols, or instructions loaded into the memory of the master controller 402 and executed on the processor or one or more processors of the master controller 402. The order in which the operations are described is not intended to be construed as a limitation, and any number of the described blocks may be combined in any order and/or in parallel to implement the methods.

Blocks for FIG. 8B may perform the same functions as described for blocks of FIG. 8A. As such, those blocks include the same numbers, such as block 702 through block 722. In addition to those operations, at block 724 the master controller 402 may check whether the heat exchanger vales may be open. If they are not the master controller 402 may open the heat exchanger valves and close, at least partially, the wellhead fluid valves. If the heat exchanger valves are open, the master controller 402 may not change or adjust any of the valves open percentage, but rather continue to or start pumping the working fluid or ORC unit through the ORC unit.

In addition, after the master controller 402 closes the heat exchanger valves at block 720, the master controller 402 may determine, at block 726, the wellhead fluid temperature at the heat exchanger. At block 728, the master controller may determine whether the wellhead fluid is at a vaporous phase change temperature of the working fluid or ORC fluid. If the wellhead fluid temperature is less than such a value, the master controller 402 may wait and measure the temperature again after a period of time. If the wellhead fluid temperature is greater than or equal to such a value, the master controller 402 may perform the operations of method 701 starting at block 724 again.

Figure 9:
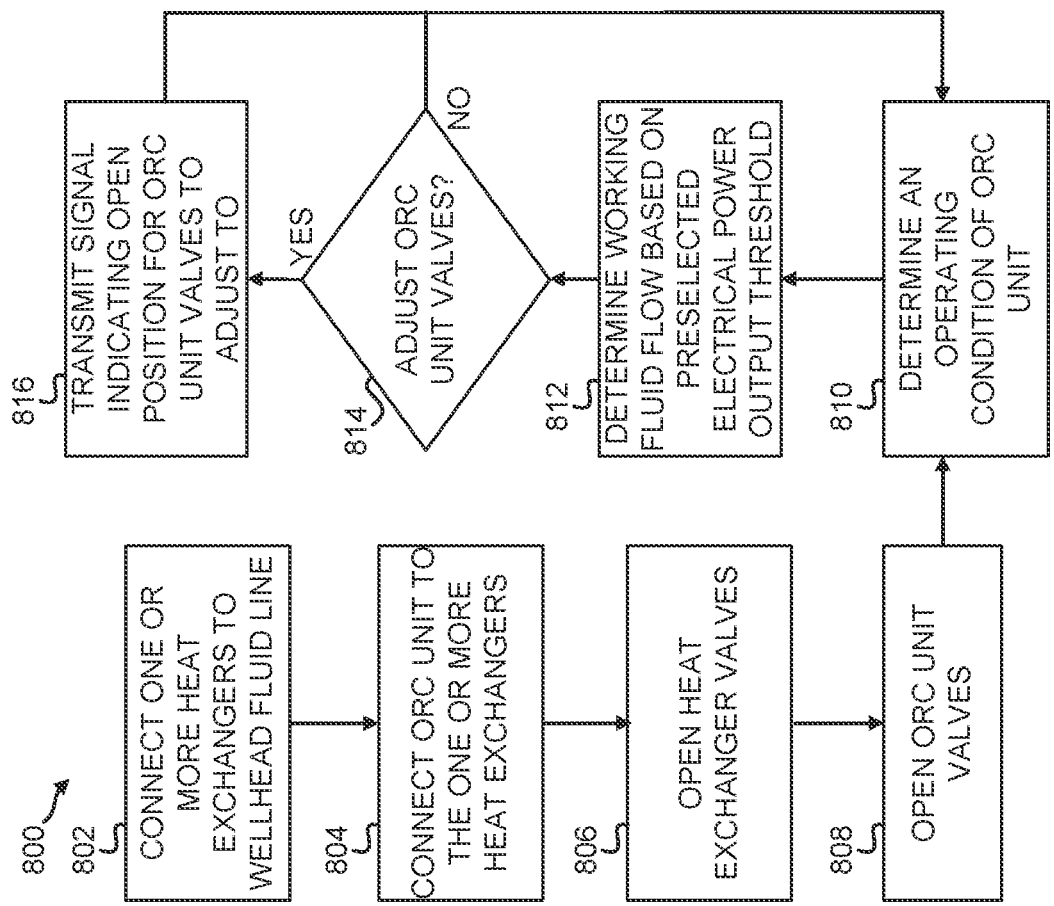
FIG. 9 is a flow diagram of geothermal power generation in which a working fluid flow is determined based on a preselected electrical power output threshold, according to one or more embodiment of the disclosure.

FIG. 9 is a flow diagram of geothermal power generation in which a working fluid flow is determined based on a preselected electrical power output threshold, according to one or more embodiment of the disclosure. The method is detailed with reference to the master controller 402 and system 400 of FIGS. 4A and 4B. Unless otherwise specified, the actions of method 800 may be completed within the master controller 402. Specifically, method 800 may be included in one or more programs, protocols, or instructions loaded into the memory of the master controller 402 and executed on the processor or one or more processors of the master controller 402. The order in which the operations are described is not intended to be construed as a limitation, and any number of the described blocks may be combined in any order and/or in parallel to implement the methods.

At block 802, each of one or more heat exchangers may be connected to one or more wellhead fluid lines. Each of the one or more wellhead fluid lines may correspond to a wellhead. At block 804, an ORC unit may be connected to the one or more heat exchangers. In another example, the system 400 may include one or more ORC units and each of the one or more ORC units may connect to one or more heat exchangers or two or more heat exchangers.

At block 806, heat exchanger valves positioned between the one or more heat exchangers and the one or more wellhead fluid lines may be opened. Once opened, the heat exchanger valves may allow for continuous diversion of the flow of wellhead fluid through the heat exchanger. The flow of wellhead fluid through the heat exchanger may facilitate transfer of heat from the flow of wellhead fluid to a flow of working fluid or intermediate working fluid.

At block 808, ORC unit valves may be opened. The ORC unit valves may initially be fully opened or partially opened. The ORC unit valves, when open, may allow for working fluid from each of the heat exchangers to flow into the ORC unit. Each working fluid flow may be combined and may pass through the ORC unit.

At block 810, the master controller 402 may determine one or more operating conditions of the ORC unit and/or the system 400. The one or more operating conditions may include the flow rate and/or pressure of working fluid flowing through each of the one or more heat exchangers, the flow rate and/or pressure of wellhead fluid flowing through each of the one or more heat exchangers or at any other point downstream of the wellhead, the temperature of the working fluid in each of the one or more heat exchangers, the temperature of wellhead fluid at each of the one or more heat exchangers, the temperature of the combined working fluid flow at the ORC unit, the electrical power output from the ORC unit, and/or the open position of each of the valves included in the system 400.

At block 812, based on the determined operating conditions, the master controller 402 may determine an optimal or efficient working fluid flow of the ORC unit. The optimal or efficient working fluid flow may depend on the temperature of the combined working fluid flowing to the ORC unit. The other operating conditions, described above, may be utilized to determine the optimal or efficient working fluid flow. The optimal or efficient working fluid flow may comprise the combined flow of working fluid flowing into the ORC unit to thereby produce a maximum amount of electrical power possible or to enable the ORC unit to meet a preselected electrical power output threshold. The optimal or efficient working fluid flow may be at a temperature sufficient to produce such an amount of electrical power (e.g., a temperature greater than or equal to the boiling point of the working fluid within the ORC unit). The optimal or efficient working fluid flow may be indicated by the master controller 402 as one or more open positions for each of the ORC unit valves and/or heat exchanger valves.

At block 814, the master controller 402 may, based on a determined optimal or efficient working fluid flow, determine whether to adjust the one or more ORC unit valves. Other valves within the system 400 may be adjusted based on the optimal or efficient working fluid flow, such as one or more heat exchanger valves and/or one or more wellhead fluid valves. If it is determined that the ORC unit valves or any other valves are to be adjusted, the master controller 402, at block 816, may transmit a signal to the valve to be adjusted indicating a new open position or closed position for the valve to adjust to. After the signal is transmitted, the valve may automatically adjust to the position indicated. If the valve is not to be adjusted or after the valves have been adjusted, the master controller 402 may determine operating conditions again. In an example, the master controller 402 may wait for a period of time, allowing the system to adjust to the new temperatures and flow rates or to reach equilibrium, prior to determining the operating conditions.

Figure 10A:
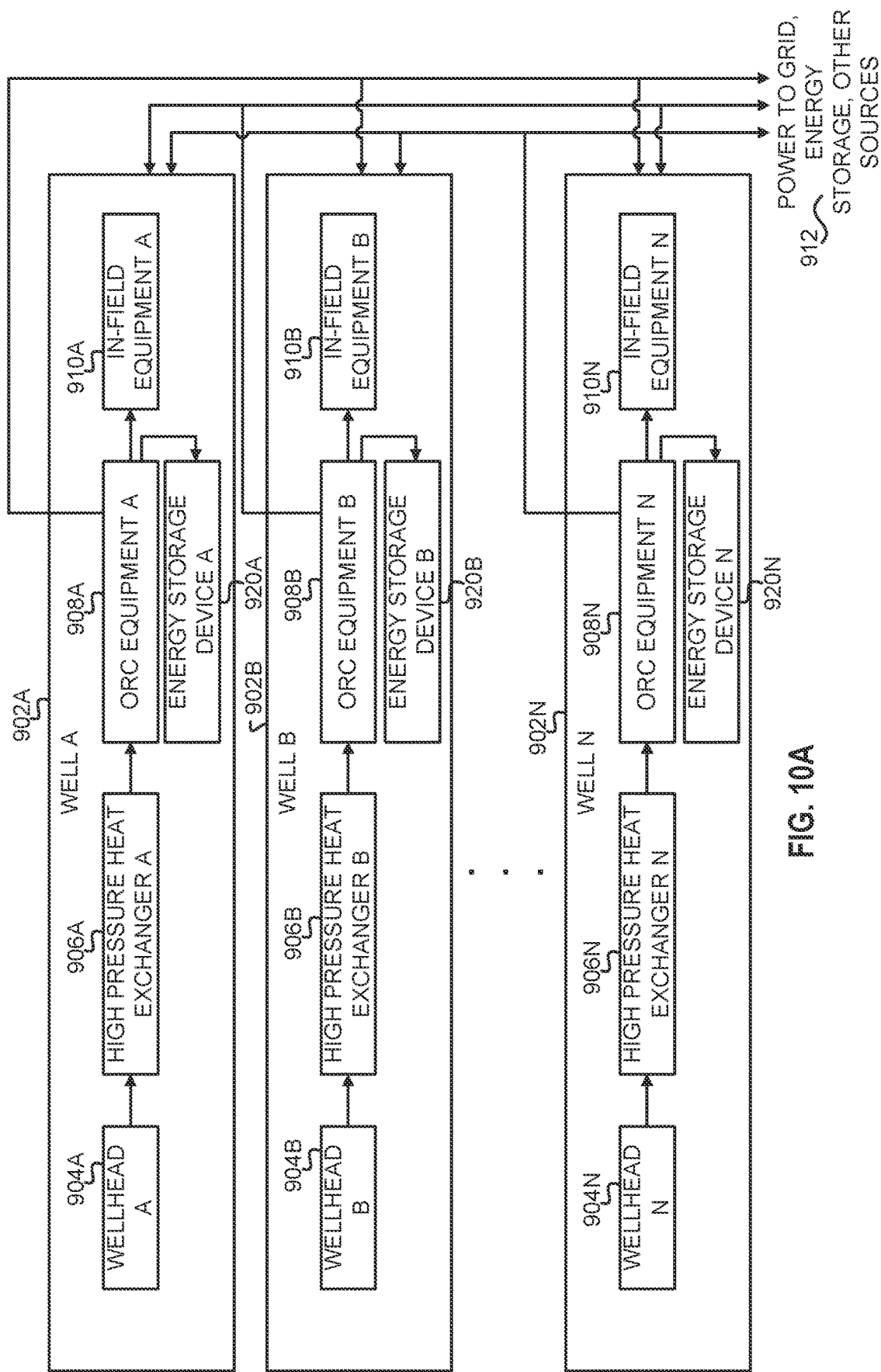
FIG. 10A, FIG. 10B, FIG. 10C, FIG. 10D, FIG. 10E, FIG. 10F, and FIG. 10G are block diagrams illustrating novel implementations of one or more geothermal power generation enabled wells to provide electrical power to one or more of in-field equipment, equipment at one of the other wells, energy storage devices, and the grid power structure, according to one or more embodiment of the disclosure.

FIG. 10A, FIG. 10B, FIG. 10C, FIG. 10D, FIG. 10E, FIG. 10F, and FIG. 10G are block diagrams illustrating novel implementations of one or more geothermal power generation enabled wells to provide electrical power to one or more of in-field equipment, equipment at one of the other wells, energy storage devices, and the grid power structure, according to one or more embodiment of the disclosure. As illustrated in FIG. 10A, various wells 902A, 902B, up to 902N may be positioned in proximity to one another. For example, one well (e.g., well A 902A may be located at a distance of over about 1 mile, about 5 miles, about 10 miles, about 25 miles, or more to another well (e.g., well B 902B or well N 902N). Each well 902A, 902B, 902N may include various in-field equipment 910A, 910B, 910N. Each well 902A, 902B, 902N may include one or more wellheads 904A, 904B, 904N. Each wellhead 904A, 904B, 904N may connect to a high-pressure heat exchanger 906A, 906B, 906N and the high-pressure heat exchanger 906A, 906B, 906N may connect to ORC equipment 908A, 908B, 908N. The ORC equipment 908A, 908B, 908N may generate electrical power. The electrical power may be provided to the in-field equipment 910A, 910B, 910N. A surplus of electrical power may be provided to an energy storage device 920A, 920B, 920N. The ORC equipment 908A, 908B, 908N may also transmit electrical power energy to other wells, energy storage devices, or to a grid power structure 912.

Figure 10B:
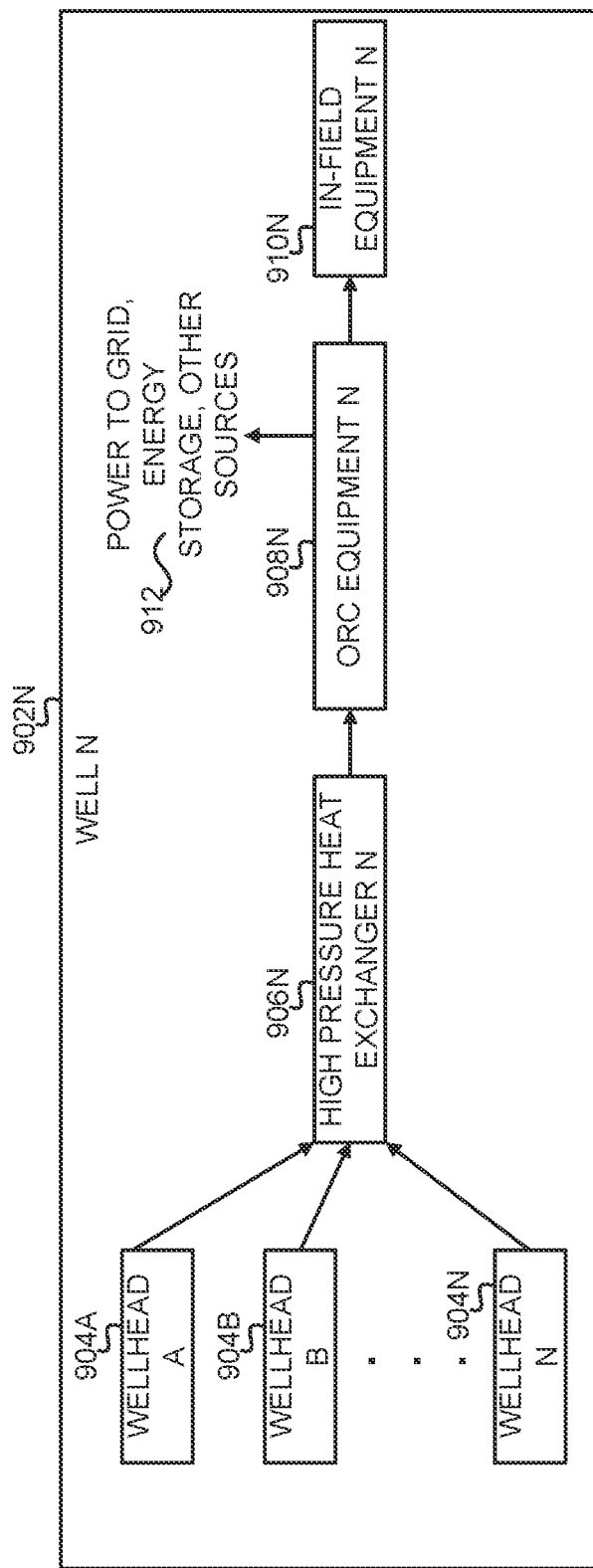

As noted and as illustrated in FIG. 10B, the high-pressure heat exchanger N 906N may connect to one or more wellheads 904A, 904B, 904N. For example, a well N 902 may include 1, 2, 3, or more wellheads (e.g., wellhead A 904A, wellhead B 904B, and/or up to wellhead N 904N). All of the wellheads 904A, 904B, 904N may connect to one high pressure heat exchanger N 906N. In another example, a well N 902N may include one or more high-pressure heat exchangers, as illustrated in FIG. 10D and FIG. 10E. In such examples, the wellheads 904A, 904B, 904N may connect to one or more of the high-pressure heat exchangers.

Figure 10C:
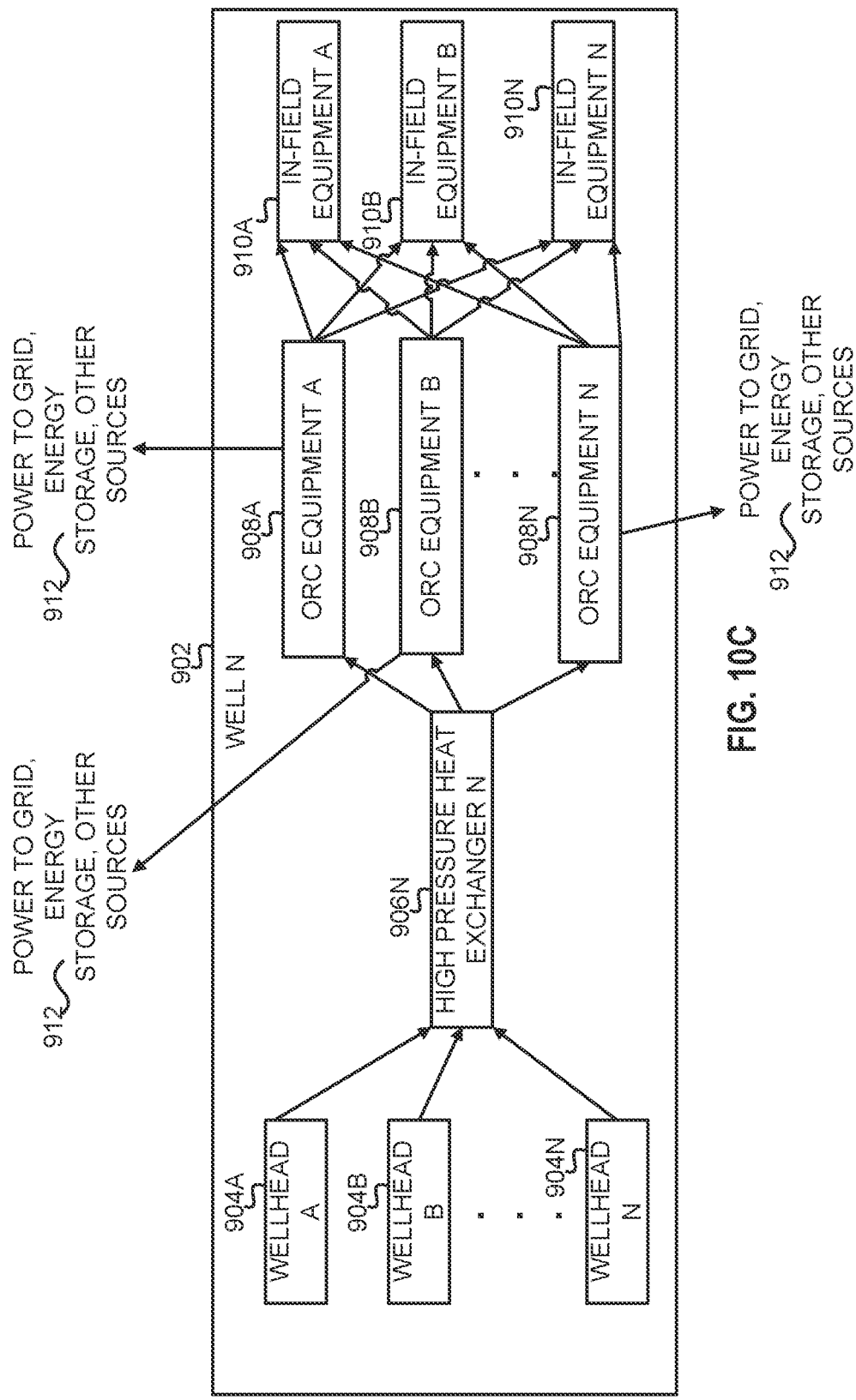
Figure 10D:
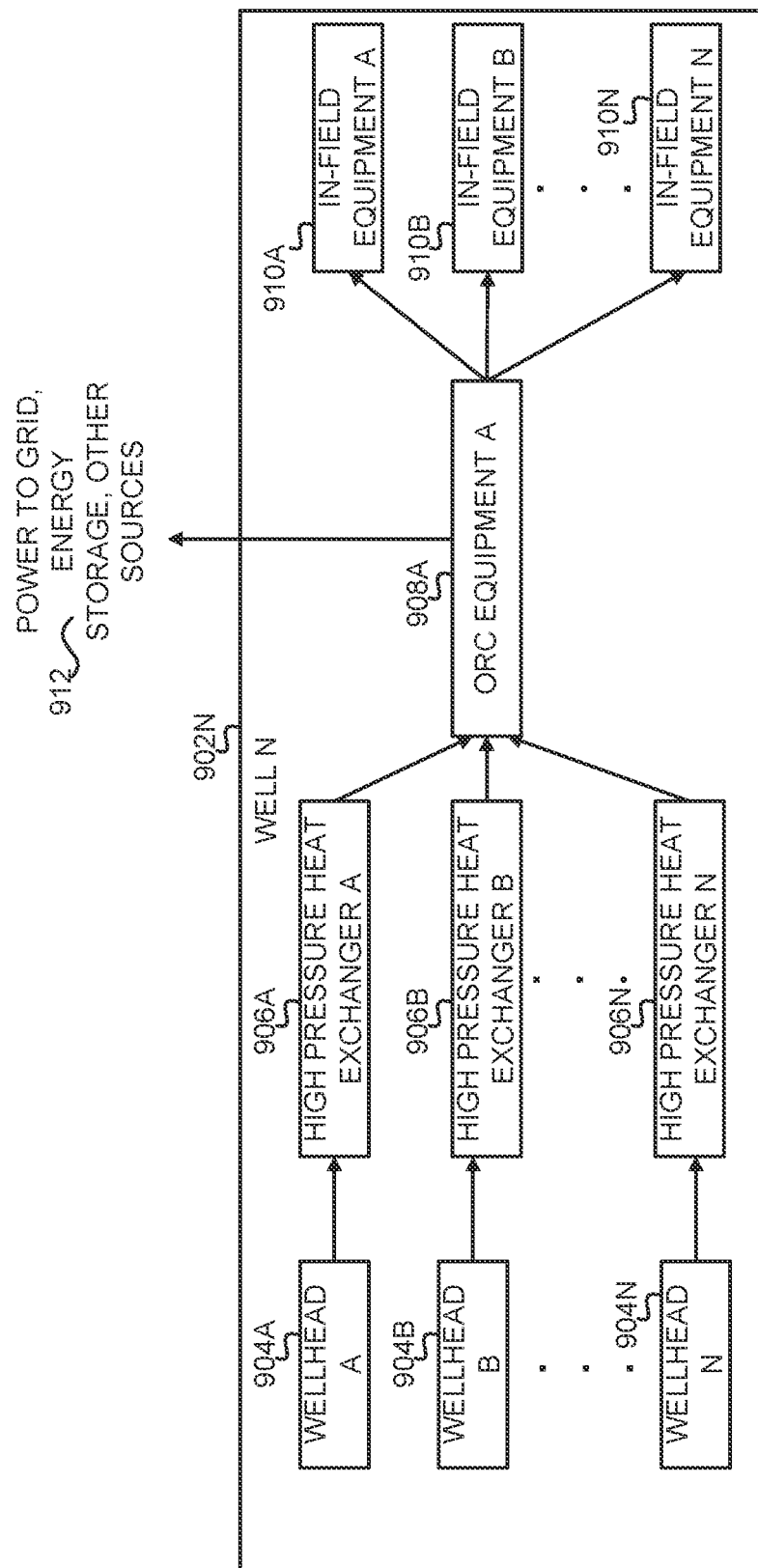
Figure 10E:
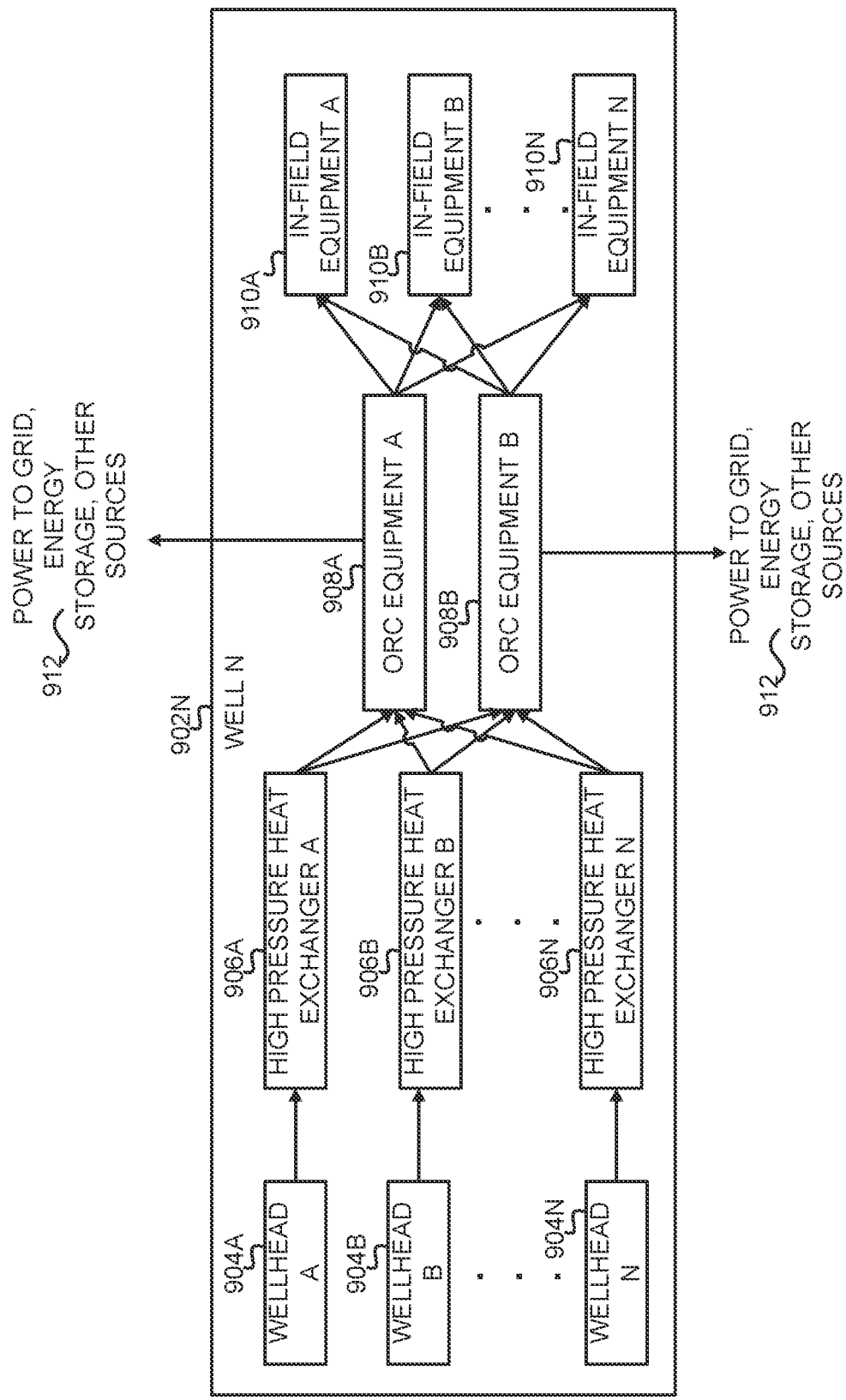

As described and as illustrated in FIG. 10C, the well N 902N may include one or more wellheads (e.g., wellhead A 904A, wellhead B 904B, and/or up to wellhead N 904N), one or more sets of ORC equipment (e.g., ORC equipment A 908A, ORC equipment B 908B, and/or up to ORC equipment N 908N), and one or more sets of in-field equipment (e.g., in-field equipment A 910A, in-field equipment B 910B, and/or up to in-field equipment N 910N). As noted, a well N 902N may include one high-pressure heat exchanger, as illustrated in in FIG. 10D and FIG. 10E. The well 902 may further include additional high-pressure heat exchangers 906.

As illustrated in FIGS. 10D and 10E, a well N 902N may include one or more wellheads (e.g., wellhead A 904A, wellhead B 904B, and/or up to wellhead N 904N). Each of the one or more wellheads 904A, 904B, 904N may correspond to a high-pressure heat exchanger (e.g., heat exchanger A 906A, heat exchanger B 906B, and/or up to heat exchanger N 906N). In other examples, two or more high-pressure heat exchangers may correspond to a particular wellhead, while in other examples, two or more wellheads may correspond to a high-pressure heat exchanger. Further, a well N 902N may include one ORC equipment A 908A or unit, as illustrated in FIG. 10D. A well N 902N may include two ORC equipment (e.g., ORC equipment A 908A and ORC equipment B 908B) or units or, in some cases, more. In such examples, each ORC equipment 908A, 908B may connect to each of the high-pressure heat exchangers 906A, 906B, 906N. As wellhead fluid flows from a wellhead 904A, 904B, 904N, the temperature and pressure may vary based on a number of factors (e.g., production, type of fluids, distance from the high-pressure heat exchanger, among other factors).

Figure 10F:
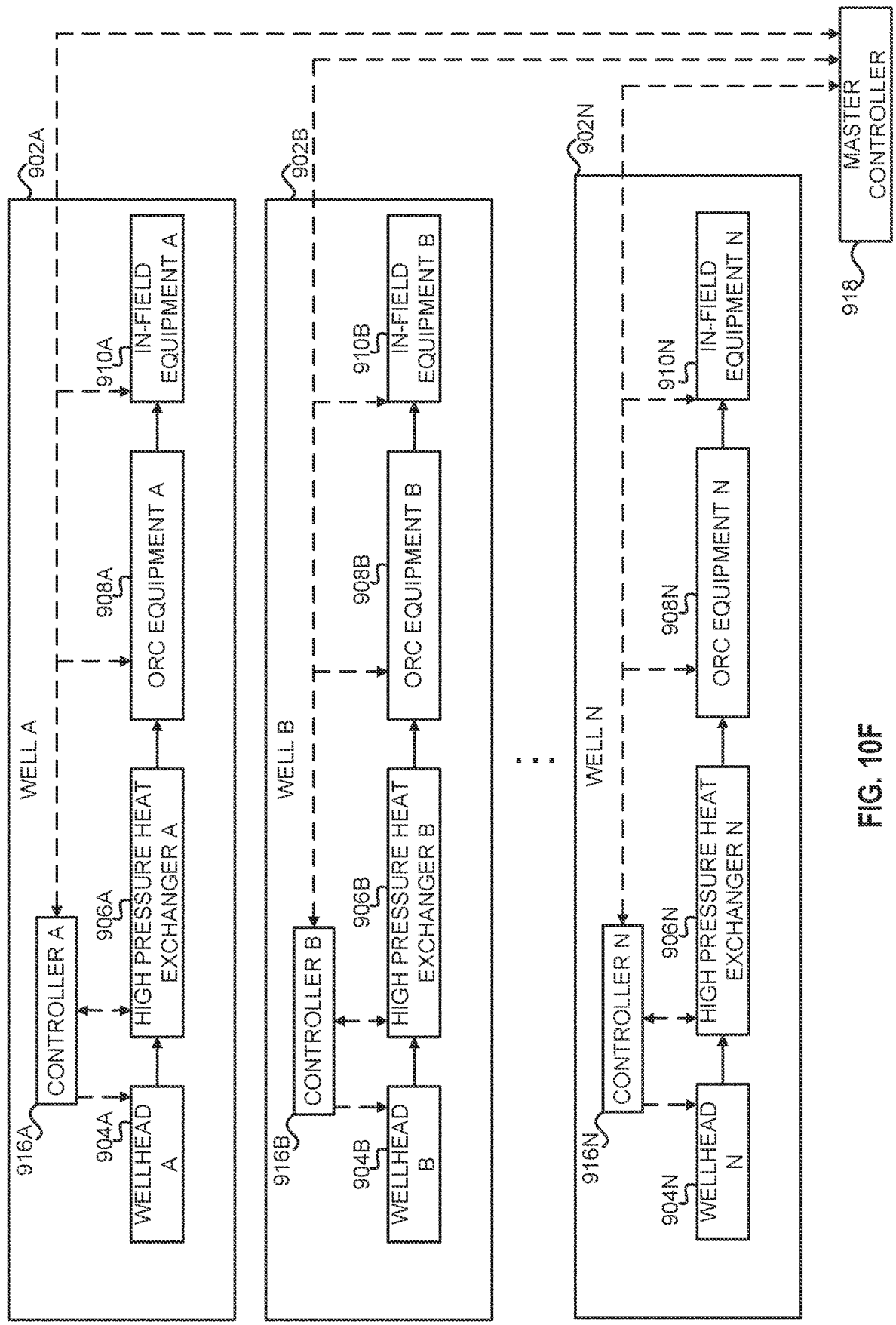
Figure 10G:
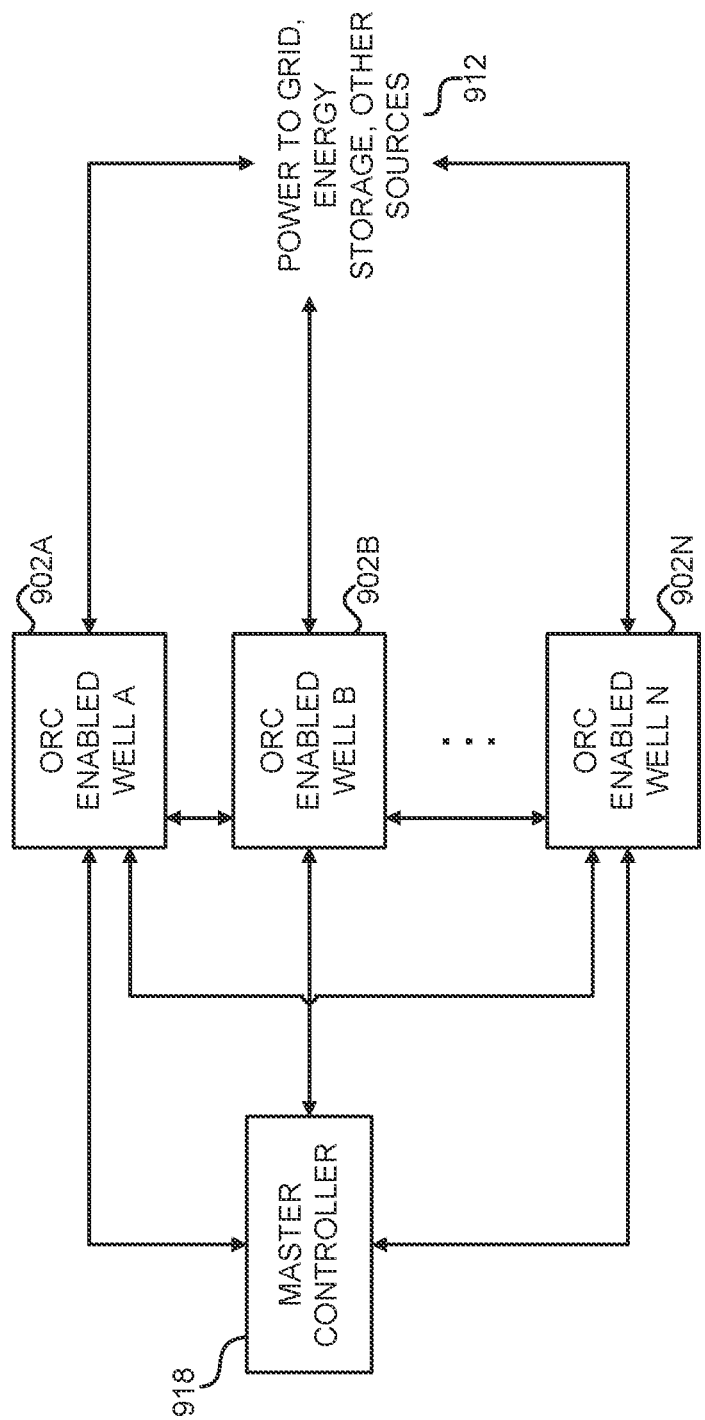

As such, a working fluid of a particular high-pressure heat exchanger 906A, 906B, 906N may be heated to a degree sufficient, insufficient, or more than sufficient to cause the working fluid of the ORC equipment 908A, 908B to exhibit a vaporous phase change. Since the temperature of the wellhead fluid varies, a controller (e.g., controller 916A, 916B, up to 916N or master controller 918, as illustrated in FIG. 10F) may determine the temperature of working fluid at each high-pressure heat exchanger 906 and determine the most efficient and/or optimal combination to be utilized for generating the most electrical power or for generating an amount of electrical power to meet a preselected electrical power output threshold at the ORC equipment 908A, 908B. The electrical power output by the ORC equipment 908A, 908B may be measured by, for example, an electrical power meter or other device suitable to determine electrical power output. The controller may also determine the temperature of the combination of working fluid or intermediate working fluid entering the ORC equipment 908A, 908B, via, for example, one or more temperature sensors positioned at or near an inlet of the ORC equipment 908A, 908B. The inlet may allow working fluid or intermediate working fluid to flow into the ORC equipment 908A, 908B. The controller may determine the most efficient and/or optimal combination or amount of working fluid or intermediate working fluid from the one or more high-pressure heat exchangers 906A, 906B, 906N based on a variety of factors noted above. For example, the most efficient and/or optimal combination or amount may be based on wellhead fluid temperature from each of the one or more wellheads 904A, 904B, 904N, the working fluid or intermediate working fluid temperature at each of the high-pressure heat exchangers 906A, 906B, 906N, and/or electrical power output (e.g., a measurement indicative of the electrical power generated) by the ORC equipment 908A, 908B. Other factors may include flow rate and pressure of each of the high-pressure heat exchangers 906A, 906B, 906N, current open positions high-pressure heat exchanger valves, and/or current open positions of other valves included at the well N 902N.

For example, if high-pressure heat exchanger A 906A includes a working fluid at a temperature slightly less than a temperature to cause vaporous phase change, then valves providing working fluid or intermediate working fluid from the high-pressure heat exchanger A 906A to the ORC equipment 908A, 908B may be closed. In another example, if high-pressure heat exchanger B 906B is providing working fluid at a temperature well above a temperature to cause vaporous phase change, then valves providing working fluid or intermediate working fluid from high-pressure heat exchanger B 906B to ORC equipment A 908A and/or to ORC equipment B 908B may be adjusted to positions such that a greater portion of the working fluid or intermediate working fluid is transported to ORC equipment A 908A and/or to ORC equipment B 908B.

In yet another example, all valves for allowing flow of working fluid or intermediate working fluid to the ORC equipment A 908A and/or ORC equipment B 908B may be, at least, in a partially open position. The temperature of the wellhead fluid and/or working fluid of each heat exchanger 906A, 906B, 906N may be determined or measured. Further, the electrical power output of the ORC equipment A 908A and/or ORC equipment B 908B may be determined. The positions of each valve for allowing flow of working fluid or intermediate working fluid to the ORC equipment A 908A and/or ORC equipment B 908B may be adjusted to different partially open positions, fully opened positions, or fully closed positions. Such valve adjustments may be based on maximization of the resultant temperature and heat delivered to the ORC equipment A 908A and/or ORC equipment B 908B once the combined working fluid flows into the ORC equipment 908 A 908A and/or ORC equipment B 908B. The valve adjustments may be based on, rather than or in addition to other factors, the maximization of the electrical power output from the ORC equipment A 908A and/or ORC equipment B 908B.Valve adjustments may further be based on wellhead fluid temperature and/or some combination of the factors described herein.

As noted and described above and as illustrated in FIG. 10F, a controller (e.g., controller A 916A, controller B 916B, and/or up to controller N 916N) may be included at one or more of the wells 902A, 902B, 902N. The controller 916A, 916B, 916N may control and monitor various aspects of the well 902A, 902B, 902N. The controller 916A, 916B, 916N of each well 902A, 902B, 902N may connect to a master controller 918, the master controller 918 may control the operations of the ORC equipment 908A, 908B, 908N, as well as other equipment (e.g., valves and/or pumps) at each of the wells 902A, 902B, 902N. As described above and illustrated in FIG. 10G, the master controller 918 may connect to one or more wellheads 904A, 904B, 904N. The ORC enabled wells 902A, 902B, 902N may provide power to one or more of in-field equipment at the ORC enabled well 902A, 902B, 902N, to an energy storage device, and/or a grid structure device (see 912).

This application is a continuation of U.S. Non-Provisional application Ser. No. 17/682,126, filed Feb. 28, 2022, titled "SYSTEMS AND METHODS FOR GENERATION OF ELECTRICAL POWER IN AN ORGANIC RANKINE CYCLE OPERATION," which is a continuation of U.S. Non-Provisional application Ser. No. 17/494,936, filed Oct. 6, 2021, titled "SYSTEMS AND METHODS FOR GENERATION OF ELECTRICAL POWER IN AN ORGANIC RANKINE CYCLE OPERATION," now U.S. Pat. No. 11,293,414, issued Apr. 5, 2022, which is a continuation-in-part of U.S. Non-Provisional application Ser. No. 17/305,296, filed Jul. 2, 2021, titled "CONTROLLER FOR CONTROLLING GENERATION OF GEOTHERMAL POWER IN AN ORGANIC RANKINE CYCLE OPERATION DURING HYDORCARBON PRODUCTION," now U.S. Pat. No. 11,255,315, issued Feb. 22, 2022, which claims priority to and the benefit of U.S. Provisional Application No. 63/200,908, filed Apr. 2, 2021, titled "SYSTEMS AND METHODS FOR GENERATING GEOTHERMAL POWER DURING HYDROCARBON PRODUCTION," the disclosures of which are incorporated herein by reference in their entirety.

In the drawings and specification, several embodiments of systems and methods to provide geothermal power in the vicinity of a wellhead during hydrocarbon production have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A controller to control an organic Rankine cycle (ORC) process having an ORC unit, the controller including a processor and a non-transitory machine-readable storage medium with instructions stored thereon, the controller comprising:
an input in signal communication with a working fluid temperature sensor positioned to provide a temperature measurement of a flow of a working fluid from one or more heat exchangers to a supply manifold;
an input/output in signal communication with a heated fluid valve, a heat exchanger valve, and a flow control device, the instructions being, when executed by the processor, operable to:
transmit a signal to the heat exchanger valve, thereby to cause the heat exchanger valve to open so as to allow diversion of the flow of the heated fluid to one or more heat exchangers and facilitate transfer of heat from the flow of the heated fluid to the working fluid through the one or more heat exchangers, the heat transferred to the working fluid positioned to cause generation of electrical power in an ORC unit, and
when a temperature measurement of the working fluid from the first input is less than a threshold:
transmit a signal to the heated fluid valve, thereby to cause a position of the heated fluid valve to adjust, transmit a signal to the heat exchanger valve, thereby to cause a position of the heat exchanger valve to adjust, and transmit a signal to the flow control device, thereby to cause a rate of the flow of the working fluid to adjust.

2. The controller of claim 1, wherein the rate of the flow of the working fluid adjusts the temperature of the heated fluid.

3. The controller of claim 2, wherein an increase in the rate of the working fluid decreases the temperature of the heated fluid, and wherein a decrease in the rate of the working fluid increases the temperature of the heated fluid.

4. The controller of claim 1, wherein the working fluid comprises an intermediate working fluid.

5. The controller of claim 1, wherein the fluid flows to one or more choke valves, thereby to reduce the pressured of the working fluid, and wherein the temperature sensor is positioned at or near one or more of (a) a condenser, or (b) a heat sink valve, and wherein the controller further determines a reduced pressure wellhead fluid temperature at or near one or more of (a) the condenser, or (b) the heat sink valve.

6. The controller of claim 5, wherein the controller further determines that the selected temperature is below the selected threshold, operates to open the heat exchanger valve, thereby to allow fluid to flow to the condenser, and operates to transmit a signal to a pump, thereby to pump the working fluid through the ORC unit.

7. The controller of claim 1, wherein the controller further determines that the working fluid is at or above a vaporous phase change temperature threshold, and the controller further is operable to allow the heat exchanger valve to remain open, thereby to allow the working fluid to flow therethrough and facilitate heating of the working fluid.

8. The controller of claim 1, wherein the controller further operates to determine whether a wellhead is active responsive to one or more sensors positioned at or near the wellhead.

9. The controller of claim 8, wherein the one or more sensors comprises one or more of (a) a pressure sensor or (b) a flow meter.

10. A controller to control an organic Rankine cycle (ORC) process having an ORC unit, the controller including a processor and a non-transitory machine-readable storage medium with instructions stored thereon, the controller comprising:
an input in signal communication with a working fluid temperature sensor positioned to provide a temperature measurement of a flow of an intermediate working fluid from one or more heat exchangers to a supply manifold; and
an input/output in signal communication with a heated fluid valve, a heat exchanger valve, and a flow control device, the instructions being, when executed by the processor, operable to:
(a) transmit a communication signal to the heat exchanger valve, thereby to cause the heat exchanger valve to open so as to allow diversion of the flow of the heated fluid to one or more heat exchangers and facilitate transfer of heat from the flow of the heated fluid to the intermediate working fluid through the one or more heat exchangers, the heat transferred to the intermediate working fluid being positioned to cause generation of electrical power in an ORC unit, and
(b) when a temperature measurement of the working fluid from the first input is less than a selected temperature threshold: (1) transmit a signal to the heated fluid valve, thereby to cause a position of the heated fluid valve to adjust, (2) transmit a signal to the heat exchanger valve, thereby to cause a position of the heat exchanger valve to adjust, and (3) transmit a signal to the flow control device, thereby to cause a rate of the flow of the intermediate working fluid to adjust, the rate of flow of the intermediate working fluid operable to adjust the temperature of the heated fluid.

11. The controller of claim 8, wherein an increase in the rate of the intermediate working fluid decreases the temperature of the heated fluid, and wherein a decrease in the rate of the intermediate working fluid increases the temperature of the heated fluid.

12. The controller of claim 8, wherein the intermediate fluid flows to one or more choke valves, thereby to reduce the pressured of the working fluid, and wherein the temperature sensor is positioned at or near one or more of (a) a condenser, or (b) a heat sink valve, and wherein the controller determines a reduced pressure wellhead fluid temperature at or near one or more of (a) the condenser, or (b) the heat sink valve.

13. The controller of claim 10, wherein the controller further determines that the selected temperature is below the selected threshold, operates to open the heat exchanger valve, thereby to allow fluid to flow to the condenser, and operates to transmit a signal to a pump, thereby to pump the intermediate working fluid through the ORC unit.

14. The controller of claim 8, wherein the controller further determines that the intermediate working fluid is at or above a vaporous phase change temperature threshold, and wherein the controller further is operable to allow the heat exchanger valve to remain open, thereby to allow the intermediate working fluid to flow therethrough and facilitate heating of the intermediate working fluid.

15. The controller of claim 8, wherein the controller further operates to determine whether a wellhead is active responsive to one or more sensors positioned at or near the wellhead.

16. The controller of claim 15, wherein the one or more sensors comprises one or more of: (a) a pressure sensor, or (b) a flow meter.

17. A controller to control an organic Rankine cycle (ORC) process having an ORC unit, the controller including a processor and a non-transitory machine-readable storage medium with instructions stored thereon, the controller comprising:
an input in signal communication with a working fluid temperature sensor positioned to provide a temperature measurement of a flow of an intermediate working fluid from one or more heat exchangers; and
an input/output in signal communication with a heated fluid valve, a heat exchanger valve, and a flow control device, the instructions being, when executed by the processor, operable to:
(a) transmit a communication signal to the heat exchanger valve, thereby to cause the heat exchanger valve to open so as to allow diversion of the flow of the heated fluid to one or more heat exchangers and facilitate transfer of heat from the flow of the heated fluid to the intermediate working fluid through the one or more heat exchangers, the heat transferred to the intermediate working fluid being positioned to cause generation of electrical power in an ORC unit, and
(b) when a temperature measurement of the working fluid from the first input is less than a selected temperature threshold: (1) transmit a signal to the heated fluid valve, thereby to cause a position of the heated fluid valve to adjust, (2) transmit a signal to the heat exchanger valve, thereby to cause a position of the heat exchanger valve to adjust, and (3) transmit a signal to the flow control device, thereby to cause a rate of the flow of the intermediate working fluid to adjust, the rate of flow of the intermediate working fluid operable to adjust the temperature of the heated fluid.

18. The controller of claim 17, wherein an increase in the rate of the intermediate working fluid decreases the temperature of the heated fluid, and wherein a decrease in the rate of the intermediate working fluid increases the temperature of the heated fluid.

19. The controller of claim 18, wherein the intermediate fluid flows to one or more choke valves, thereby to reduce the pressured of the working fluid, and wherein the temperature sensor is positioned at or near one or more of (a) a condenser, or (b) a heat sink valve, and wherein the controller determines a reduced pressure wellhead fluid temperature at or near one or more of (a) the condenser, or (b) the heat sink valve.

20. The controller of claim 19, wherein the controller further determines that the selected temperature is below the selected threshold, operates to open the heat exchanger valve, thereby to allow fluid to flow to the condenser, and operates to transmit a signal to a pump, thereby to pump the intermediate working fluid through the ORC unit.

21. The controller of claim 20, wherein the controller determines that the intermediate working fluid is at or above a vaporous phase change temperature threshold, and the controller further is operable to allow the heat exchanger valve to remain open, thereby to allow the intermediate working fluid to flow therethrough and facilitate heating of the intermediate working fluid.

22. The controller of claim 17, wherein the controller further operates to determine whether a wellhead is active responsive to one or more sensors positioned at or near the wellhead.

23. The controller of claim 22, wherein the one or more sensors comprises one or more of: (a) a pressure sensor, or (b) a flow meter.

* * * * *